(12) United States Patent
Goto et al.

(10) Patent No.: US 8,701,131 B2
(45) Date of Patent: Apr. 15, 2014

(54) DISC CONVEYING DEVICE

(75) Inventors: Naofumi Goto, Kanagawa (JP); Takeshi Kubo, Kanagawa (JP); Takeharu Takasawa, Kanagawa (JP); Akira Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 67 days.

(21) Appl. No.: 13/562,499

(22) Filed: Jul. 31, 2012

(65) Prior Publication Data
US 2013/0061254 A1  Mar. 7, 2013

(30) Foreign Application Priority Data

Sep. 7, 2011 (JP) ................................. 2011-195520

(51) Int. Cl.
*G11B 17/04* (2006.01)
(52) U.S. Cl.
USPC ....................................................... 720/615
(58) Field of Classification Search
USPC ....................................................... 720/615
See application file for complete search history.

(56) References Cited

U.S. PATENT DOCUMENTS 6,396,795 B2 * 5/2002 Nakamura et al. ............ 720/615
7,971,211 B2 * 6/2011 Tokita et al. .................. 720/615
8,281,327 B2 * 10/2012 Goto et al. .................... 720/615

FOREIGN PATENT DOCUMENTS

| JP | 11-328799 A | 11/1999 |
| JP | 3640174 B2 | 1/2005 |
| JP | 3690300 B2 | 6/2005 |

* cited by examiner

*Primary Examiner* — Mark Blouin
(74) *Attorney, Agent, or Firm* — Wolf, Greenfield & Sacks, P.C.

(57) ABSTRACT

A disc conveying device includes a pair of rails positioned on opposite sides across a disc-shaped recording medium transported in the lead-in direction or ejecting direction in a direction orthogonal to a center axis direction, and extending in the direction of the conveyed disc-shaped recording medium; link arms that are turnably supported to a base chassis, are turnable as to the pair of rails, and move in parallel in a direction of separating the rails from the peripheral face of the disc-shaped recording medium; conveying rollers that convey the disc-shaped recording medium by being supported by the rails, and touch the peripheral face of the disc-shaped recording medium with at least one conveying roller rotating; and an ejecting lever that is turnable as to at least one of the rails, by which turning the peripheral face of the disc-shaped recording medium is pressed, and the disc-shaped recording medium is conveyed.

15 Claims, 75 Drawing Sheets

DISC CONVEYING DEVICE

BACKGROUND

The present disclosure relates to the technical field of a disc conveying device, and particularly relates to the technical field wherein a disc-shaped recording medium, which is conveyed by a conveying roller supported by rails, is ejected by an ejecting lever, which is supported by rails, being pressed, whereby the ejected amount of disc-shaped recording medium is increased while ensuring simplicity of the mechanism thereof.

There are disc conveying devices that convey disc-shaped recording medium on which image data and audio data are recorded. For example, there is such a disc conveying device wherein a pair of driving belts is disposed on opposite sides, sandwiching the disc-shaped recording medium, and the disc-shaped recording medium is conveyed by having the driving belts pressed against the peripheral face of the disc-shaped recording medium so as to feed the disc (e.g., Japanese Unexamined Patent Application Publication No. 11-328799).

Also, there is a disc conveying device wherein multiple feeding rollers are disposed on opposite sides, sandwiching the disc-shaped recording medium, and the feeding rollers press against, and cause to rotate, the peripheral face of the disc-shaped recording medium, thereby conveying the disc-shaped recording medium (e.g., Japanese Patent No. 3640174 and Japanese Patent No. 3690300).

SUMMARY

Now, with a disc conveying device that handles a disc-shaped recording medium as described above, a large conveying distance disc-shaped recording medium has to be secured to securely convey the disc-shaped recording medium to the conveying position, ensuring conveying distance. For example, in the case of ejecting the disc-shaped recording medium and storing in a disc cartridge, the disc-shaped recording medium has to be conveyed until the entire disc-shaped recording medium is inserted into the disc cartridge.

However, in a disc conveying device disclosed in Japanese Unexamined Patent Application Publication No. 11-328799, the disc-shaped recording medium is held between a pair of belts from both sides, between a state wherein the center of the disc-shaped recording medium is positioned between one edge of the belts and a state wherein the center of the disc-shaped recording medium is positioned between the other edge of the belts.

Accordingly, since the conveying distance of the disc-shaped recording medium is the same distance as the length of the pair of belts, sufficient conveying distance for the disc-shaped recording medium is not secured.

Also, in disc conveying devices disclosed in Japanese Patent No. 3640174 and Japanese Patent No. 3690300, the conveying distance of the disc-shaped recording medium is a distance wherein contact with the feeding roller is secured, whereby sufficient conveying distance for the disc-shaped recording medium is not secured.

In this case, conveying the disc-shaped recording medium with a separate feeding mechanism following the conveying by the conveying mechanism which has a driving belt and feeding rollers may be considered, but if a separate feeding mechanism from the conveying mechanism such as driving belt and feeding rollers is used, the mechanism provided to the disc conveying device becomes that much more complex.

It has been found desirable to provide a disc conveying device which increases the ejected amount of the disc-shaped recording medium while ensuring simplicity of the mechanism thereof.

A disc conveying device according to an embodiment of the present disclosure includes: a pair of rails positioned on opposite sides across a disc-shaped recording medium transported in the lead-in direction or ejecting direction in a direction orthogonal to a center axis direction, and extending in the direction of the conveyed disc-shaped recording medium; a plurality of link arms that are turnably supported to a base chassis, are turnable as to the pair of rails, and move in parallel in a direction of separating the pair or rails from the peripheral face of the disc-shaped recording medium; conveying rollers that convey the disc-shaped recording medium by being supported by the rails, and touch the peripheral face of the disc-shaped recording medium with at least one conveying roller rotating; and an ejecting lever that is turnable as to at least one of the rails, by which turning the peripheral face of the disc-shaped recording medium is pressed, and the disc-shaped recording medium is conveyed.

According to this configuration, with the disc conveying device, the disc-shaped recording medium is conveyed by conveying rollers supported by rails, and the disc-shaped recording medium is ejected by an ejecting lever which turns as to the rail.

The ejecting lever preferably further includes a pressing roller that presses the peripheral face of the disc-shaped recording medium. By providing the ejecting lever with the pressing roller that presses the peripheral face of the disc-shaped recording medium, the pressing roller comes into sliding contact with the peripheral face of the disc-shaped recording medium, thereby conveying the disc-shaped recording medium.

The disc conveying device preferably further includes a storage to retract and store the ejecting lever from the conveying path of the disc-shaped recording medium, when the ejecting lever is not pressing the disc-shaped recording medium. By providing a storage to retract and store the ejecting lever from the conveying path when the ejecting lever is not pressing the disc-shaped recording medium, the disc-shaped recording medium does not touch the ejecting lever.

The pressing roller preferably functions as the conveying roller to convey the disc-shaped recording medium when the ejecting lever is in a state of being stored in the storage. By the pressing roller functioning as the conveying roller to convey the disc-shaped recording medium when the ejecting lever is in a state of being stored in the storage, two functions, of a function to eject the disc-shaped recording medium with a pressing roller and a function to convey the disc-shaped recording medium, are executed.

The storage is preferably attached to the rail. By attaching the storage to the rail, dedicated space for disposing the storage does not have to be provided.

The storage preferably further includes a lever guiding face that guides the stored ejecting lever and a disc guiding face that guides the conveyed disc-shaped recording medium. By providing a lever guiding face that guides the stored ejecting lever and a disc guiding face that guides the conveyed disc-shaped recording medium, the ejecting lever is guided by the lever guiding face and stored in the storage, and the disc-shaped recording medium is guided by the disc guiding face when being conveyed.

The disc conveying device preferably further includes a biasing spring that biases the ejecting lever in the direction to be stored in the storage. By providing a biasing spring that biases the ejecting lever in the direction to be stored in the storage, when the ejecting lever is stored in the storage, turning force is applied in the direction of the ejecting lever to be stored in the storage.

The ejecting lever is preferably turnably supported by the link arm. By the ejecting lever being turnably supported by the link arm, the link arm and ejecting lever are turnable as to the rails.

The disc conveying device preferably further includes a cam engaging portion on the ejecting lever, and an operating cam portion wherein a cam engaging portion of the ejecting lever is slidably engaged with the base chassis and the ejecting lever is turned on a predetermined path. By providing a cam engaging portion on the ejecting lever, and providing an operating cam portion wherein a cam engaging portion of the ejecting lever is slidably engaged with the base chassis and the ejecting lever is turned on a predetermined path, the cam engaging portion is slid against the operating cam portion when the ejecting lever is turned.

The disc conveying device preferably further includes a spring member that biases the pair of rails so that the conveying roller approaches the peripheral face of the disc-shaped recording medium. By providing a spring member that biases the pair of rails so that the conveying roller approaches the peripheral face of the disc-shaped recording medium, the conveying roller is pressed to the peripheral face of the disc-shaped recording medium by the biasing force of the spring member at the time of conveying the disc-shaped recording medium.

The pair of rails synchronously are preferably moved in parallel in the direction of mutually separating. By causing the pair of rails synchronously to be moved in parallel in the direction of mutually separating, the disc-shaped recording medium can be conveyed along a path that is in a straight line.

The disc conveying device preferably further includes stoppers, each touching a respective rail of the pair of rails moved in the direction of separating from the peripheral face of the disc-shaped recording medium, thereby restricting the movement of the pair of rails. By providing stoppers, each touching a respective rail of the pair of rails moved in the direction of separating from the peripheral face of the disc-shaped recording medium, thereby restricting the movement of the pair of rails, the movement of the pair of rails in the direction of mutually separating is restricted by the stoppers.

The disc conveying device preferably further includes side sliders that move in the same direction as the conveying direction of the disc-shaped recording medium, according to the conveying position of the disc-shaped recording medium; the side sliders further including the stoppers. By providing side sliders that move in the same direction as the conveying direction of the disc-shaped recording medium, according to the conveying position of the disc-shaped recording medium, the side sliders further including the stoppers, the movement of the pair of rails in the direction of mutually separating is restricted by the side sliders.

The disc conveying device preferably further includes multiple stopper engaging pieces on the rails that touch the stoppers according to the movement position of the side sliders. By proving multiple stopper engaging pieces on the rails that touch the stoppers according to the movement position of the side sliders, the movement of the pair of rails is restricted in different positions, according to the position of the side sliders.

The contact positions of the stopper engaging pieces and the stopper are preferably in different positions in the moving direction of the rails. By positioning the stopper engaging pieces and the stopper in different positions in the moving direction of the rails, the stopper makes contact with the stopper engaging piece according to the position of the side slider, and the movement of the pair of rails is restricted in different positions.

A disc conveying device according to an embodiment of the present disclosure includes: a pair of rails positioned on opposite sides across a disc-shaped recording medium transported in the lead-in direction or ejecting direction in a direction orthogonal to a center axis direction, and extending in the direction of the conveyed disc-shaped recording medium; a plurality of link arms that are turnably supported to a base chassis, are turnable as to the pair of rails, and move in parallel in a direction of separating the pair or rails from the peripheral face of the disc-shaped recording medium; conveying rollers that convey the disc-shaped recording medium by being supported by the rails, and touch the peripheral face of the disc-shaped recording medium with at least one conveying roller rotating; and an ejecting lever that is turnable as to at least one of the rails, by which turning the peripheral face of the disc-shaped recording medium is pressed, and the disc-shaped recording medium is conveyed.

Accordingly, by ejecting the disc-shaped recording medium with the ejecting lever that is turnable as to the rails, a dedicated mechanism to convey the disc-shaped recording medium does not have to be provided, and the ejected amount of disc-shaped recording mediums can be increased while insuring simplicity of the mechanism.

The ejecting lever may include a pressing roller that presses the peripheral face of the disc-shaped recording medium. Accordingly, the pressing roller comes into sliding contact with the peripheral face of the disc-shaped recording medium, thereby securing smooth conveying operations of the disc-shaped recording medium.

A storage may be provided to retract and store the ejecting lever from the conveying path of the disc-shaped recording medium, when the ejecting lever is not pressing the disc-shaped recording medium. Accordingly, the ejecting lever does not obstruct the conveying operations of the disc-shaped recording medium, whereby smooth conveying operations of the disc-shaped recording medium can be performed.

The pressing roller may function as the conveying roller to convey the disc-shaped recording medium when the ejecting lever is in a state of being stored in the storage. Accordingly, two functions are executed, which are a function to eject the disc-shaped recording medium with a pressing roller and a function to convey the disc-shaped recording medium, whereby the functionality of the ejecting lever is improved and the number of parts is reduced.

The storage may be attached to the rail. Accordingly, dedicated space for disposing the storage does not have to be provided, and the disc conveying device can be reduced in size due to the space reduction, and contact of the disc-shaped recording medium and the storage during conveying of the disc-shaped recording medium can be suppressed.

The storage may include a lever guiding face that guides the stored ejecting lever and a disc guiding face that guides the conveyed disc-shaped recording medium. Accordingly, the ejecting lever and the disc-shaped recording medium are securely guided and the ejecting lever is securely stored in the storage, while smoothly conveying the disc-shaped recording medium.

The disc conveying device may include a biasing spring that biases the ejecting lever in the direction to be stored in the storage. Accordingly, when the ejecting lever is stored in the storage, turning force is applied to the ejecting lever in the direction of storing in the storage, whereby the ejecting lever can be securely stored in the storage, while suppressing the ejecting lever from unnecessarily exiting the storage when a vibration or the like occurs.

The ejecting lever may be turnably supported by the link arm. Accordingly, the link arm and ejecting lever are turnable as to the rails, whereby the freedom of the turning path of the ejecting lever can be improved in that amount, whereby the ejecting amount of disc-shaped recording mediums from the disc conveying device can be increased.

The disc conveying device may include a cam engaging portion on the ejecting lever, and an operating cam portion wherein a cam engaging portion of the ejecting lever is slidably engaged with the base chassis and the ejecting lever is turned on a predetermined path. Accordingly, the freedom of the turning path of the ejecting lever can be improved.

The disc conveying device may include a spring member that biases the pair of rails so that the conveying roller approaches the peripheral face of the disc-shaped recording medium. Accordingly, the conveying roller is pressed to the peripheral face of the disc-shaped recording medium by the biasing force of the spring member at the time of conveying the disc-shaped recording medium, whereby friction between the peripheral face of the disc-shaped recording medium and the conveying roller increases, and the disc-shaped recording medium can be securely conveyed.

The pair of rails may be synchronously moved in parallel in the direction of mutually separating. Accordingly, the disc-shaped recording medium can be conveyed along a path that is in a straight line, whereby conveying operations of the disc-shaped recording medium can be readily performed, while shortening the conveying distance of the disc-shaped recording medium and miniaturizing the disc conveying device.

The disc conveying device may include stoppers, each touching a respective rail of the pair of rails moved in the direction of separating from the peripheral face of the disc-shaped recording medium, thereby restricting the movement of the pair of rails. Accordingly, the movement of the pair of rails in the direction of mutually separating is restricted by the stoppers, whereby excessive movement of the turning arm is restricted, and smooth operations of the pair of rails can be secured.

The disc conveying device may include side sliders that move in the same direction as the conveying direction of the disc-shaped recording medium, according to the conveying position of the disc-shaped recording medium; the side sliders further including the stoppers. Accordingly, dedicated members to provide the stoppers do not have to be made, and the number of parts can therefore be reduced.

The disc conveying device may include multiple stopper engaging pieces on the rails that touch the stoppers according to the movement position of the side sliders. Accordingly, the movement of the pair of rails is restricted, each in appropriate positions, according to the position of the side sliders, and operations from each position of the pair of rails can be smoothly started.

The contact positions of the stopper engaging pieces and the stopper may be in different positions in the moving direction of the rails. Accordingly, movement of the pair of rails at the various positions can be readily restricted.

DETAILED DESCRIPTION OF EMBODIMENTS

Figure 1:
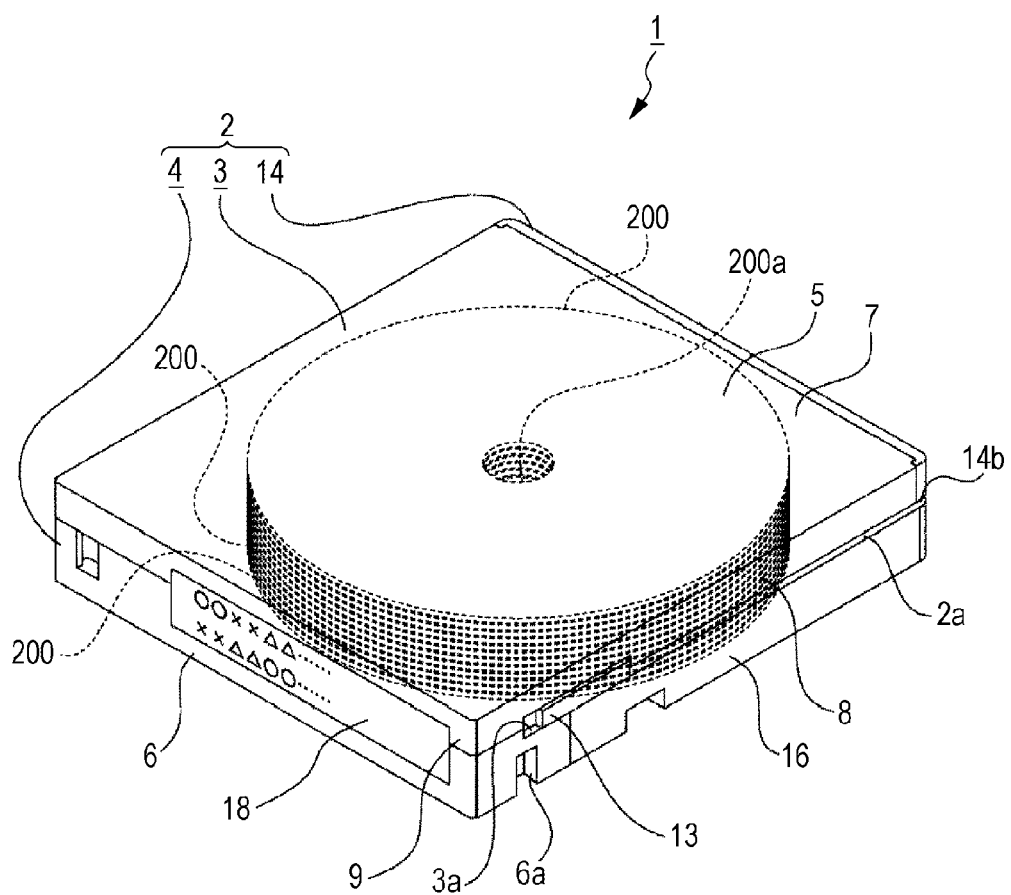
FIG. 1 is a perspective view of a disc cartridge in which a disc-shaped storage medium that is conveyed by the disc conveying device is stored, and illustrates an embodiment of a disc conveying device according to the present disclosure, together with FIGS. 2 through 75.

Embodiments of a disc conveying device of the present technology will be described below with reference to the appended diagrams. The disc conveying device has a function to convey a disc-shaped storage medium between disc cartridges in a disc storage system.

In the descriptions below, the direction in which the disc-shaped recording medium is conveyed from the disc cartridge toward the disc conveying device is the rear (lead-in direction), the direction in which the disc-shaped recording medium is conveyed from the disc conveying device towards the disc cartridge is the front (ejecting direction), the right and left directions are indicated in a state when viewed from the rear, and indicate the directions of front/back, up/down, and left/right.

Note that the front/back, up/down, and left/right directions below are to facilitate description, and embodiments of the present technology are not limited to these directions.
Configuration of Disc Cartridge First, a configuration of a disc cartridge used in a disc storage system will be described (see FIGS. 1 through 4). A disc cartridge 1 is made up of various principal parts disposed within a case unit 2, and the case unit 2 has a first shell 3 and second shell 4. Multiple disc-shaped mediums 200 and the like can be stored within the case unit 2 in the vertical direction equidistantly.

Figure 2:
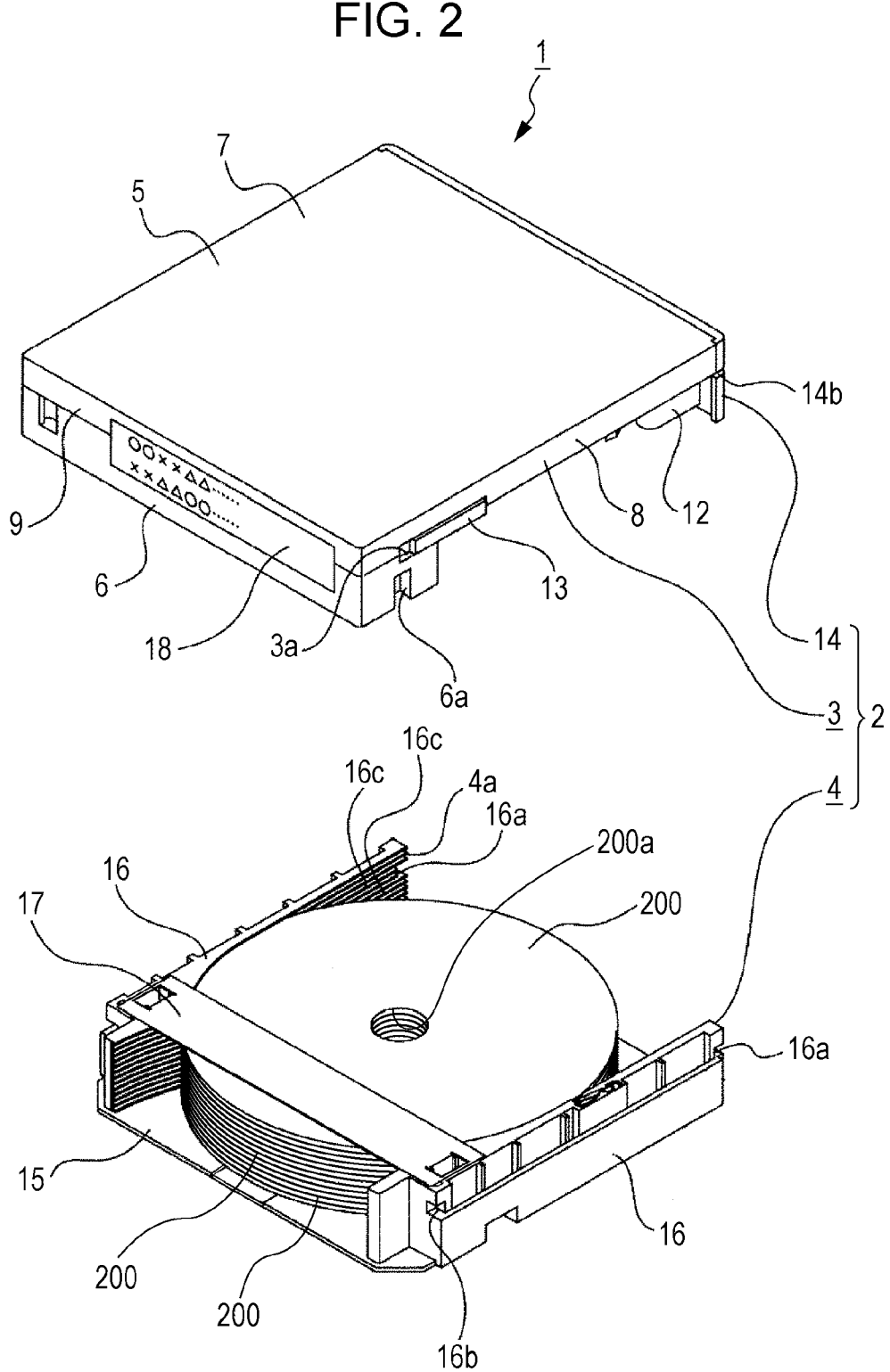
FIG. 2 is a perspective view of the disc cartridge illustrating a state of having a first shell and second shell separated.
Figure 3:
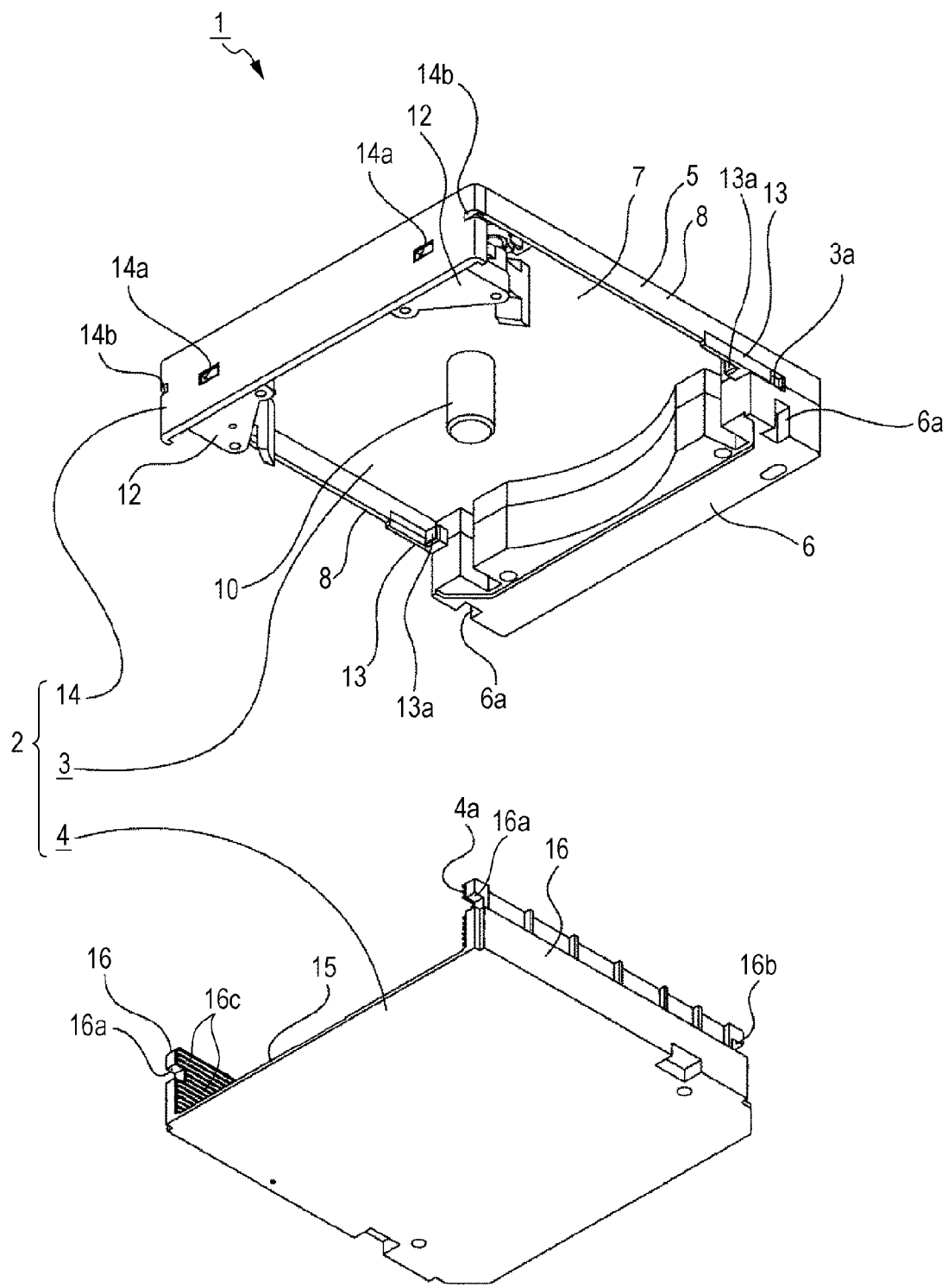
FIG. 3 is a perspective view of the disc cartridge illustrating a state of having a first shell and second shell separated, as seen from a different direction than in FIG. 2.

The first shell 3 and second shell 4 can be joined or separated in the vertical direction, for example (see FIGS. 1 through 3). Note that in the case that the case unit 2 is in an erected state, the first shell 3 and second shell 4 are joined or separated in the left/right direction. The first shell 3 is made up of a base unit 5 and a supporting base 6 attached to the rear edge portion of the base 5, which are joined in the vertical direction.

The base unit 5 has a base face portion 7 that faces the vertical direction, side face portions 8 that protrude downward from each of left and right edge portions of the base face portion 7, and a rear face portion 9 that protrudes downward from the rear edge portion of the base face portion 7.

A round shaft shaped center pin 10 that protrudes downward is provided in the center portion of the base face portion 7.

Supporting shafts 11 that protrude downward are provided, separated to the left and right, in a position near the front edge of the base face portion 7.

Groove-shaped gripping portions 6a which open in the side direction (outer direction) and downward are formed on the lower edge portion of the left and right edge portions of the supporting base 6.

Slider supporting portions 3a are formed in positions near the rear edge on the left and right side face portions, respectively, of the first shell 3.

Locking levers 12 are each turnably supported on supporting shafts 11 of the first shell 3.

Figure 4:
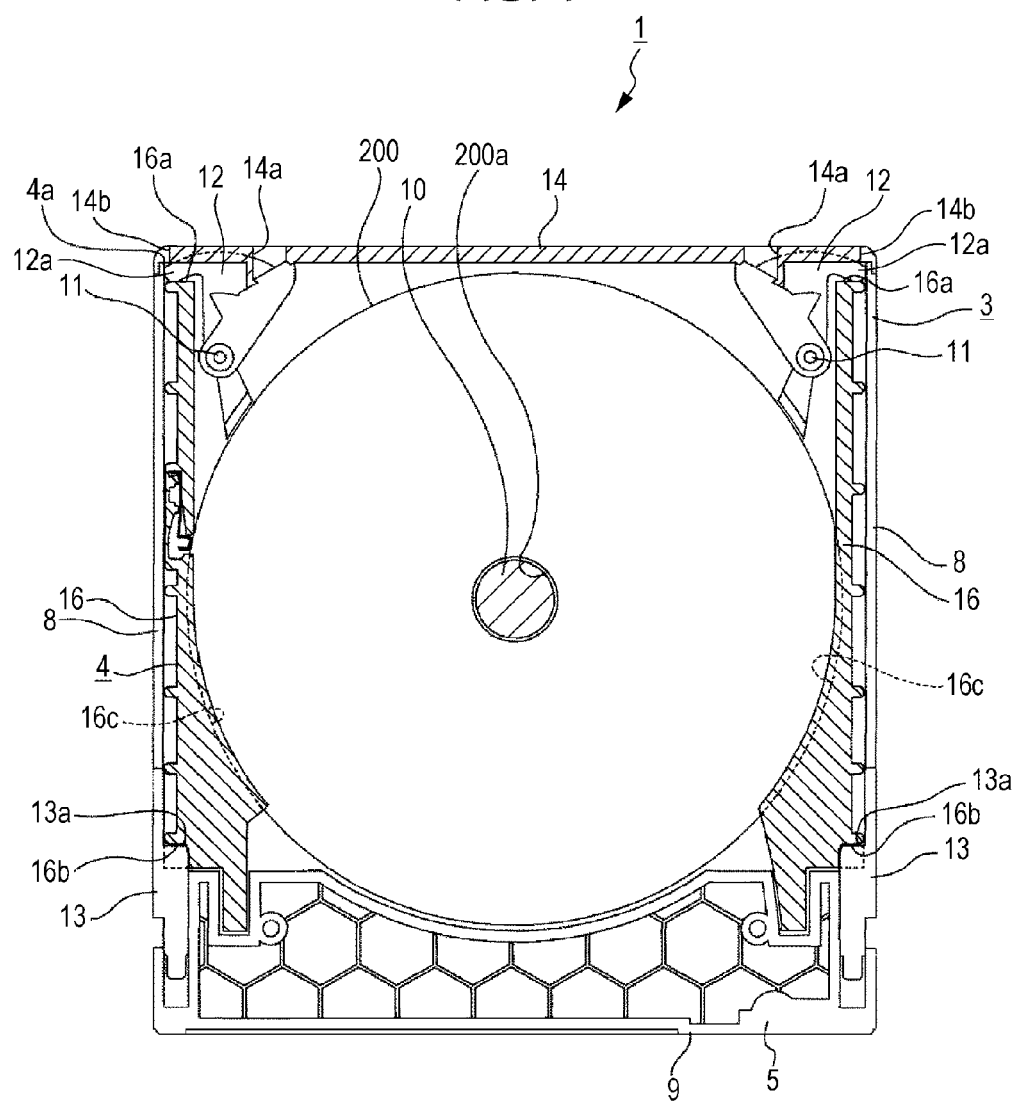
FIG. 4 is a cross-sectional diagram of the disc cartridge illustrating a state in which the first and second shells are locked with a lock slider.

A locking protrusion 12a that protrudes toward the side is provided to the tip portion of the locking lever 12 (see FIG. 4). In the state wherein the locking levers 12 are supported by the supporting shafts 11, the locking protrusions 12a are biased toward the direction nearing the side face portions 8, respectively, by an unshown biasing spring.

Lock sliders 13 are slidably supported in the front/back direction by the slider supporting portions 3a of the first shell 3 (see FIGS. 1 through 4). The lock sliders 13 are each biased toward the front by an unshown coil spring. Lock portions 13a that protrude in the inner direction toward the center portion of the front/back direction are provided to the lock sliders 13 (see FIGS. 3 and 4).

An access panel 14 is attached to the front edge portion of the first shell 3 (see FIGS. 1 through 4). Inserting holes 14a are formed on the access panel 14 in a manner separated on the left and right. Notches for inserting 14b which are open to the outside are formed on the left and right edge portions of the access panel 14.

The second shell 4 is integrally formed of a basal face portion 15 that faces the vertical direction and side face portions 16 that protrude upward from the left and right edge portions of the basal face portion 15.

A first locking recess 16a that is open towards the front on the front edge portion and passes through to the left and right is formed on the side face portion 16, and a second locking recess 16b that is open towards the rear and to the outside is formed in a position near the rear edge.

Holding grooves 16c are formed on the inner face of the side face portion 16, and the holding grooves 16c are positioned so as to be separated equidistantly in the vertical direction.

A bridge member 17 is attached to a position near the rear edge between the side face portions 16 of the second shell 4 (see FIG. 2).

An information input sheet 18 serving as an information input arrangement is adhered to the rear face of the case unit 2, for example, on the disc cartridge 1 (see FIGS. 1 and 2). Predetermined information, such as information relating to the pitch between the disc-shaped recording mediums 200 stored within the case unit 2 and the number of disc-shaped recording mediums 200 stored therein, for example, is input on the information input sheet 18.

Note that the information input arrangement is not restricted to the information input sheet 18, and an appropriate arrangement can be used such as printed information like a bar code or the like printed on the case unit 2 or a recording chip or the like embedded within the case unit 2.

Disc-shaped recording mediums 200 are held within the case unit 2 of the disc cartridge 1 configured as described above (see FIGS. 1 and 2). The peripheral portion of the disc-shaped recording medium is inserted from the front of the holding grooves 16c formed on the side face portions 16 of the second shell 4 and held within the case unit 2, in a state in which the first shell 3 and second shell 4 are separated. Accordingly, an opening positioned at the front edge of the second shell 4 is formed as a disc inserting/removing opening 4a wherein insertion and removal of the disc-shaped recording mediums 200 is performed.

When the case unit 2 is in a configuration wherein the first shell 3 and second shell 4 are joined and the access panel 14 is attached to the first shell 3, inserting grooves 2a formed on each of the left and right side portions (see FIG. 1) extend front to back. The rear edges of the inserting grooves 2a are each connected to slider supporting portions 3a of the first shell 3, and the front edges thereof are each connected to the inserting notches 14b formed on the access panel 14.

Disc Cartridge Joining State

The joining state of the disc cartridge 1 will be described below (see FIG. 4). The first shell 3 and second shell 4 are joined in a state in which the base face portion 7 of the base unit 5 and the basal face portion 15 face one another vertically. In a state of the first shell 3 and second shell 4 being joined, the first shell 3 and second shell 4 are locked by lock levers 12 and lock sliders 13.

The lock levers 12 are positioned on the turning edge of the direction in which the locking protrusions 12a mutually separate (outer direction) by bias force of biasing springs, and the locking protruding portions 12a are inserted into the first locking recesses 16a formed on the side face portions 16 of the second shell 4 so as to be engaged.

The lock sliders 13 are positioned at the front moving edge by bias force of a coil spring, and the lock portions 13a are each inserted into a second locking recess 16b formed on the side face portions 16 of the second shell 4 so as to be engaged.

In the state of the first shell 3 and second shell 4 being joined, a center pin 10 provided to the first shell 3 is inserted into center holes 200a of the disc-shaped recording mediums 200.

Configuration of Disc Conveying Device

Next, a specific configuration of a disc conveying device 19 will be described (see FIGS. 5 through 36).

Base Frame

Figure 9:
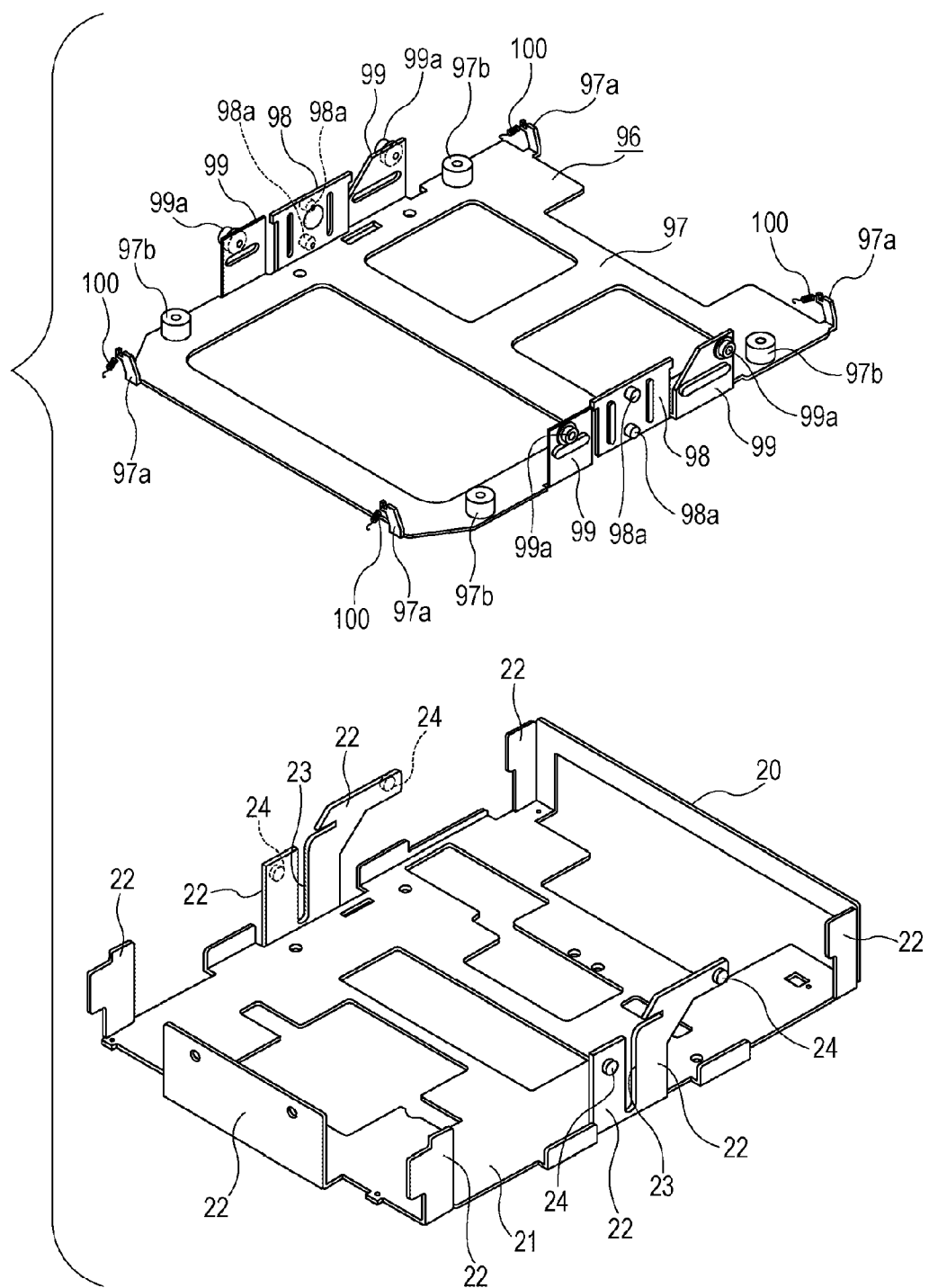
FIG. 9 is a perspective view illustrating a base frame and base plate.
Figure 10:
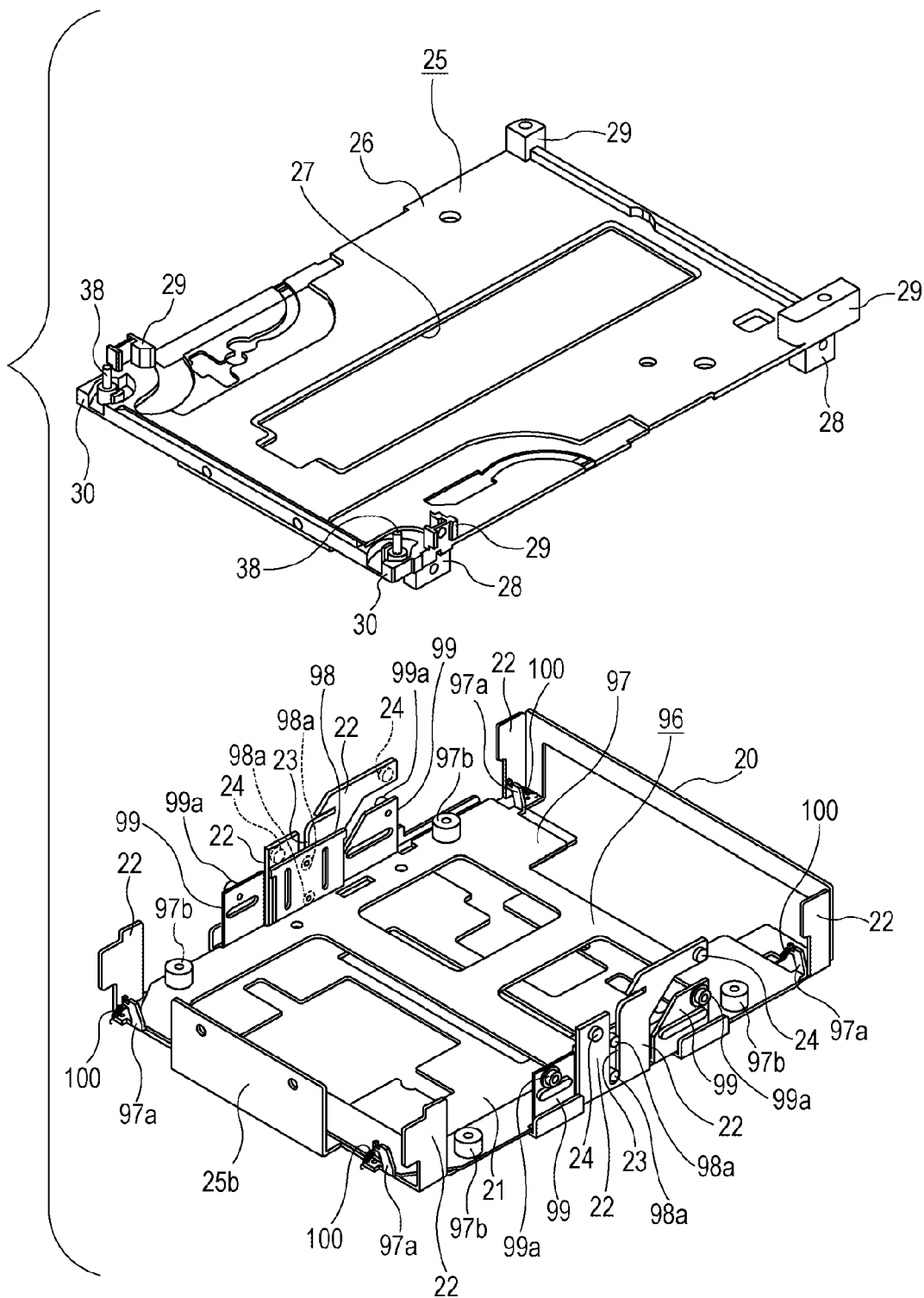
FIG. 10 is a perspective view illustrating a base frame, unit plate, and base plate.

The disc conveying device 19 has a base frame 20 and an unshown cover that covers the base frame 20 from the upper side, with the base frame 20 being made up of a floor face plate 21 formed having an outline of an erected, roughly rectangular shape, and multiple side face plates 22 that each protrude upward from the outer edge of the floor face plate 21 (see FIG. 9).

Two side face plates 22 are arrayed front-to-back on the left and right sides of the roughly center portion in the front/back direction of the base frame 20. A slit, which extends vertically and opens upward, is formed in the side face plates 22 that are arrayed front-to-back, and this slit is formed as a guide regulating hole 23.

Guide regulating pins 24 are attached to each of the outer faces of the side face plates 22 arrayed front-to-back in the roughly center portion in the front/back direction. An unshown circuit board is disposed on the floor face plate 21 of the base frame 20.

Base Plate

Figure 5:
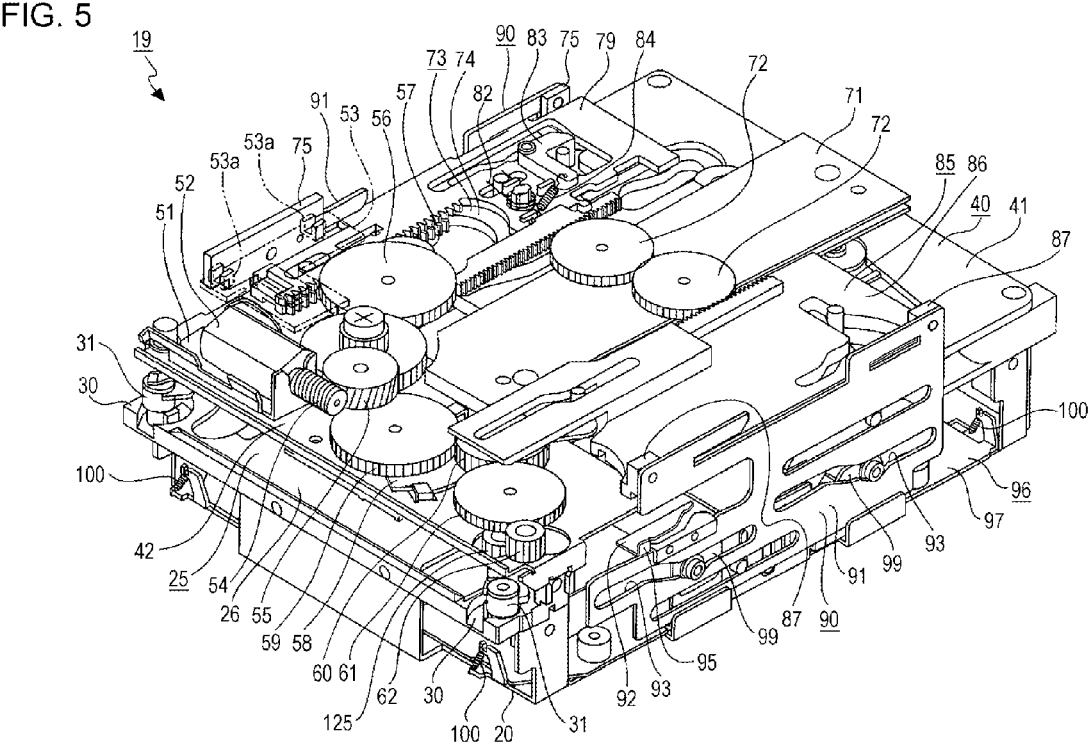
FIG. 5 is a perspective view of the disc conveying device.

A base plate 25 is attached to the side face plates 22 of the base frame 20 (see FIG. 5). The base plate 25 has a base plate portion 26 formed having an outline of an erected, roughly rectangular shape, attachment receiving protrusions 28 that protrude downward from the peripheral portion of the base plate portion 26, and attachment protrusions 29 that protrude upward from the peripheral portion of the base plate portion 26 (see FIG. 10). The attachment receiving protrusions 28 of the base plate 25 are attached to the side face plates 22 of the base frame 20 with screws or the like, and the base plate portion 26 is positioned above the floor face plate 21.

A base unit disposing hole 27 that extends front-to-back is formed on the central portion in the left/right direction of the base plate portion 26. An adjuster supporter 30 is provided to each of the left and right edges on the front edge portion of the base plate portion 26. A shaft attaching portion 30a that passes through is formed vertically on the adjust supporter 30 (see FIG. 11). The circumference portion of the shaft attaching portion 30a of the adjuster supporter 30 is formed as a recess 30b, and a spring engaging protrusion 30c which protrudes upward is provided to the recess 30b.

Route Adjuster

Route adjusters 31 are turnably supported by the adjuster supporters 30 (see FIG. 5). The route adjuster 31 is integrally formed of a cylindrical shaft inserting unit 32, a position adjusting portion 33 that protrudes sideways from the shaft inserting unit 32, a positioning protrusion 34 that protrudes from the upper edge portion of the position adjusting portion 33, a protrusion portion 35 that protrudes to the opposite direction of the positioning protrusion 34 from the upper edge portion of the position adjusting portion 33, and a spring engaging unit 36 that protrudes downward from the tip portion of the position adjusting portion 33 (see FIGS. 11 through 19).

The position adjusting portion 33 is formed in a roughly triangular prism shape that becomes narrower in width toward the tip, and has positioning grooves 37 that extend in the horizontal direction of both side faces. Both edge portions of the positioning groove 37 have guide faces 37a formed therein wherein the groove width increases towards the tips (see FIG. 14).

The positioning protrusion 34 protrudes from the position adjusting portion 33 in the same direction as the protruding direction from the shaft inserting portion 32 of the position adjusting portion 33, and have guided faces 34a, which are on the upper and lower edge portions on the left and right edge portions, that slope so as to become mutually closer in the vertical direction towards the outside. The protrusion 35 is provided as an engaging portion 35a of which the tip portion is bent upwards to form a V-shape.

Figure 11:
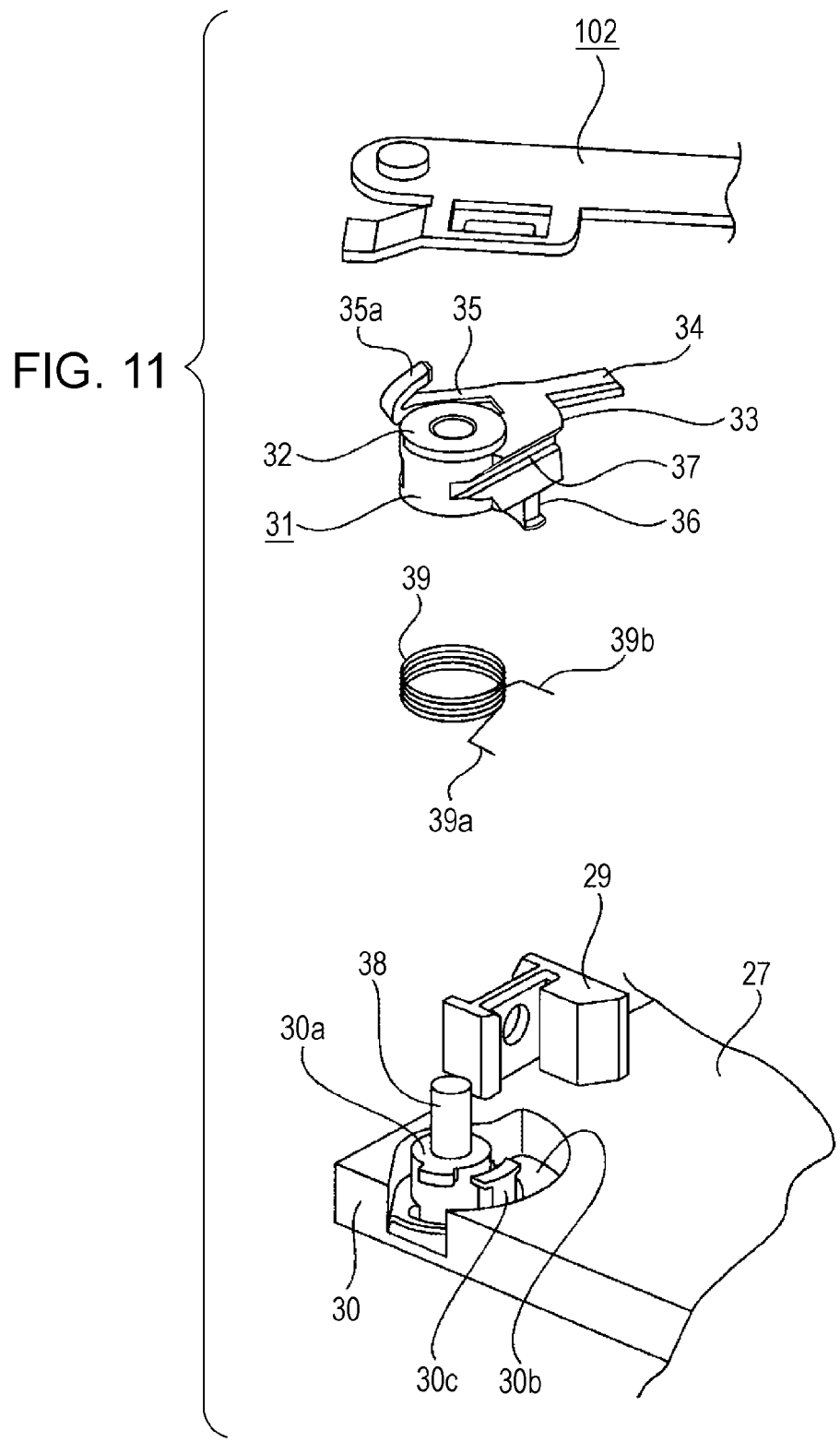
FIG. 11 is an enlarged exploded perspective view illustrating a route adjuster on the left side and a first front side link arm and so forth.
Figure 12:
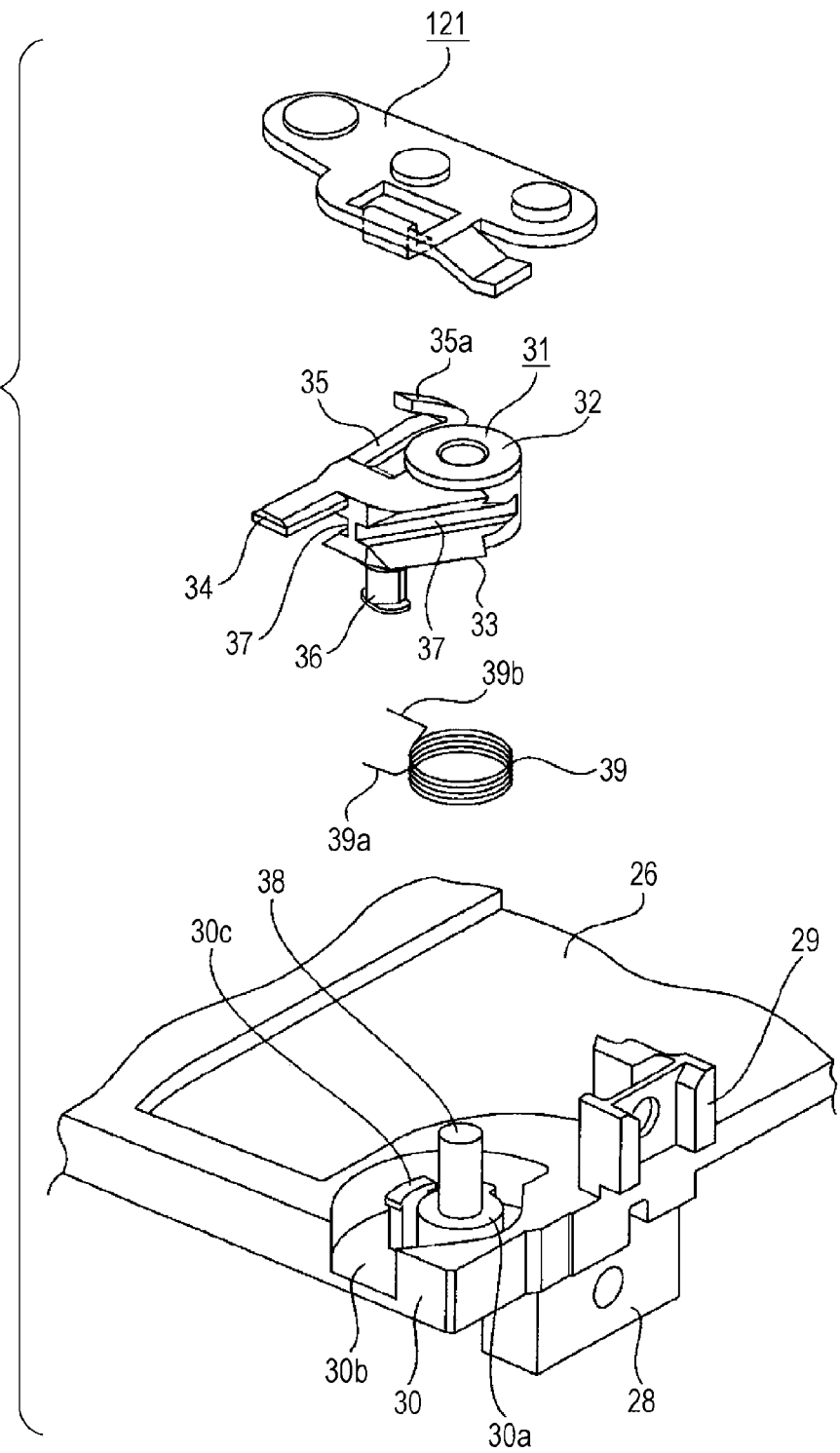
FIG. 12 is an enlarged exploded perspective view illustrating a route adjuster on the right side and a second front side link arm and so forth.
Figure 13:
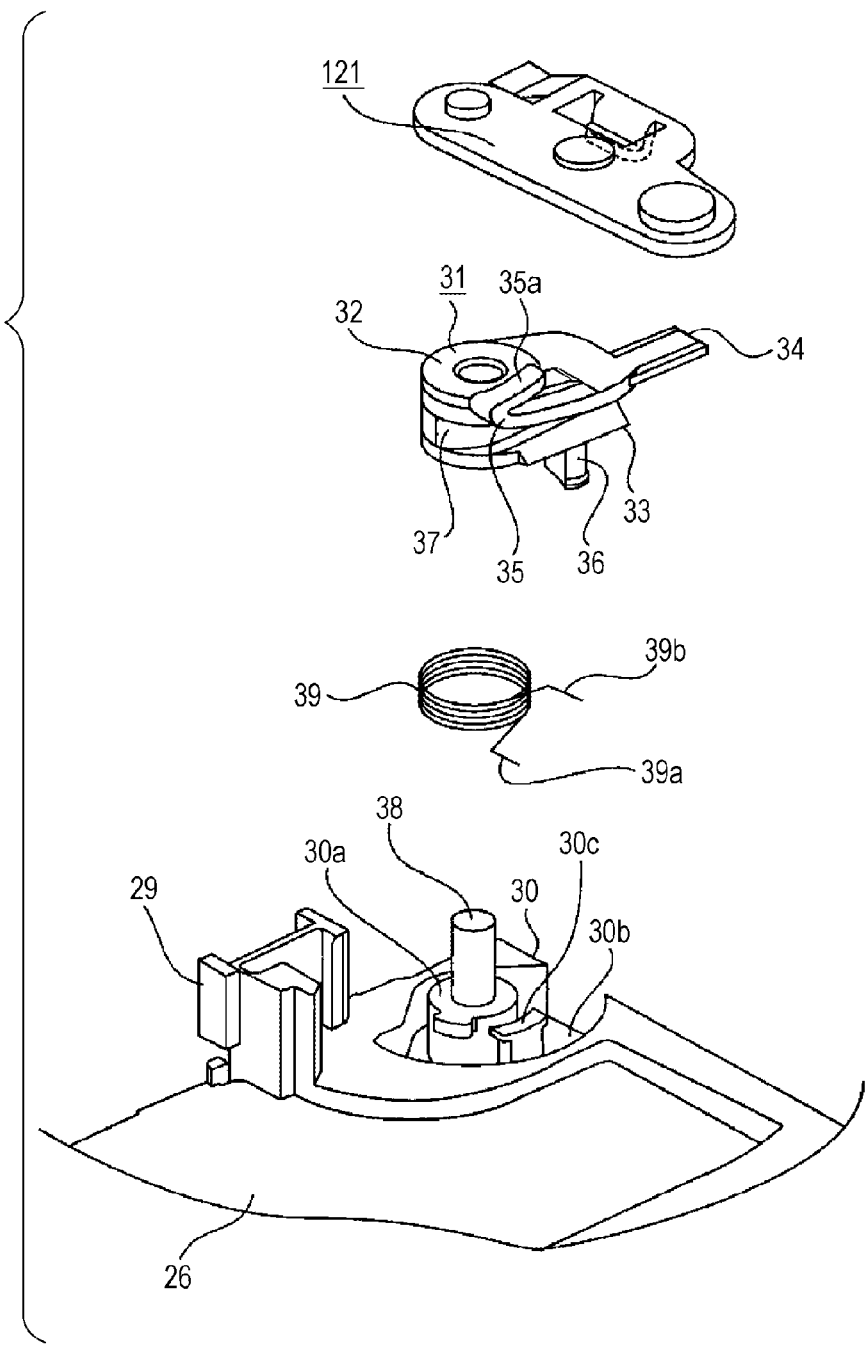
FIG. 13 is an enlarged exploded perspective view illustrating a state viewing a route adjuster on the right side and a second front side link arm and so forth from a different direction from FIG. 12.
Figure 14:
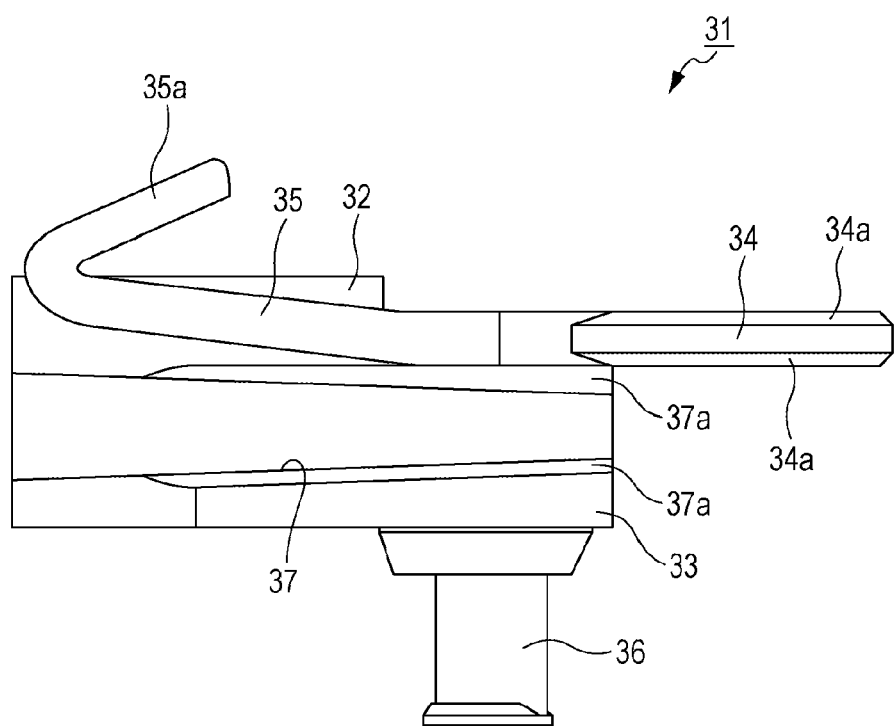
FIG. 14 is an enlarged side face view of a route adjuster.
Figure 15:
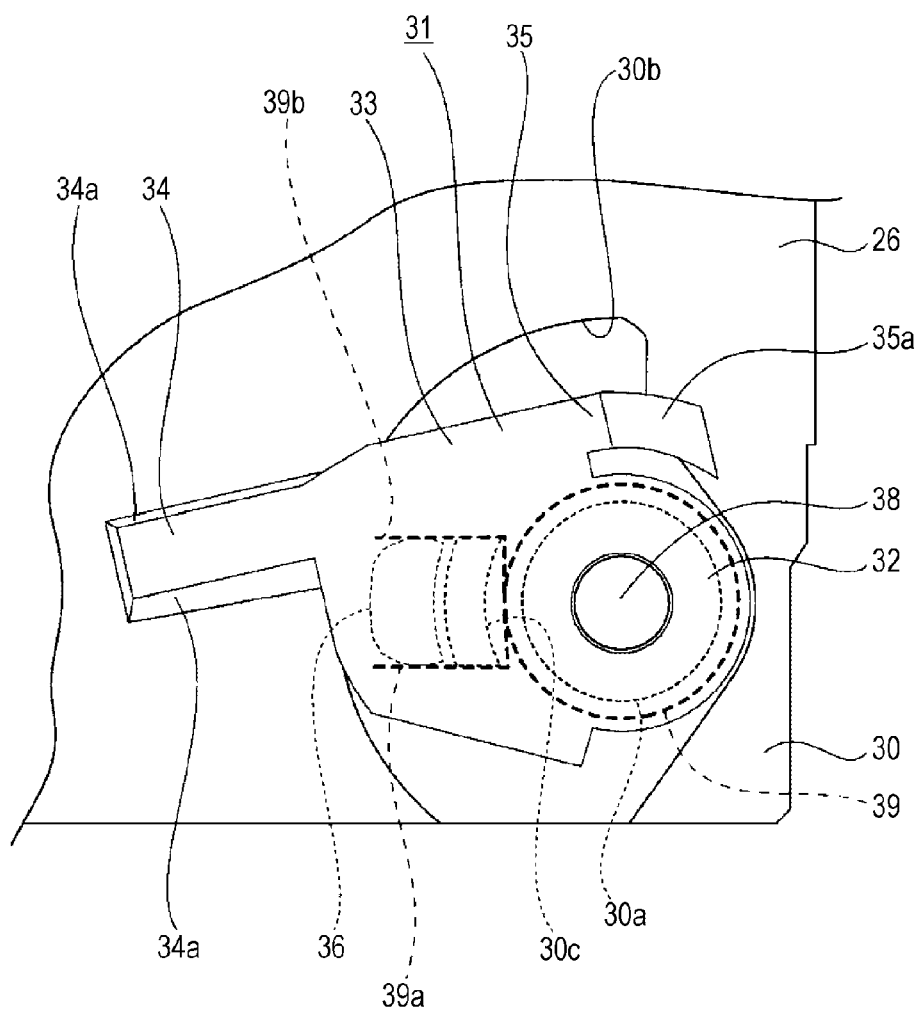
FIG. 15 is a schematic plan view illustrating a state wherein a route adjuster is in a central position, and illustrate the actions of the route adjuster together with FIGS. 16 and 17.

The route adjuster 31 is turnably supported by the adjuster supporter 30 having a supporting shaft 38, attached to the shaft attaching portion 30a, as its fulcrum (see FIGS. 11 through 13). In the state of the route adjuster 31 being supported by the adjuster supporter 30, a return spring 38 is supported on the shaft attaching portion 30a of the adjuster supporter 30 (see FIG. 15). The return spring 38 is a torsion coil spring, for example.

Figure 16:
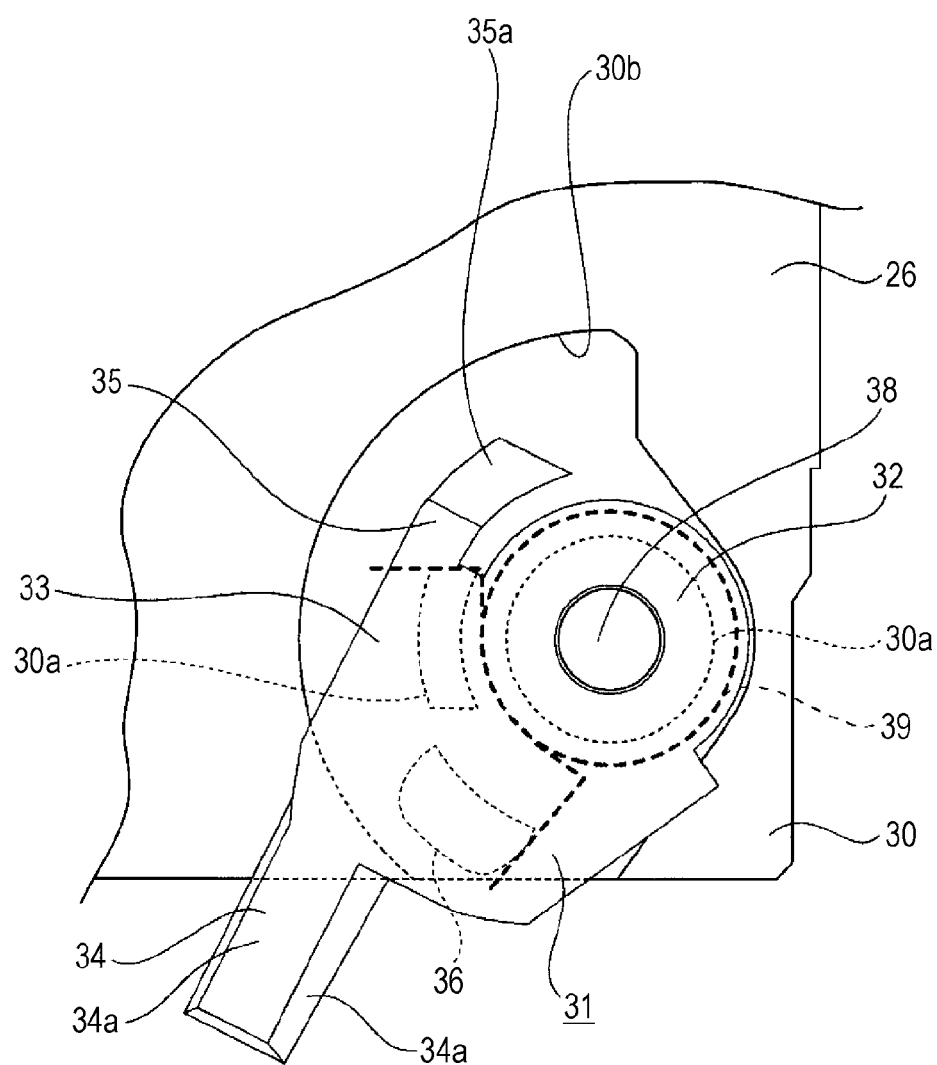
FIG. 16 is a schematic expanded plan view illustrating a state wherein the route adjuster is turned in one direction.
Figure 17:
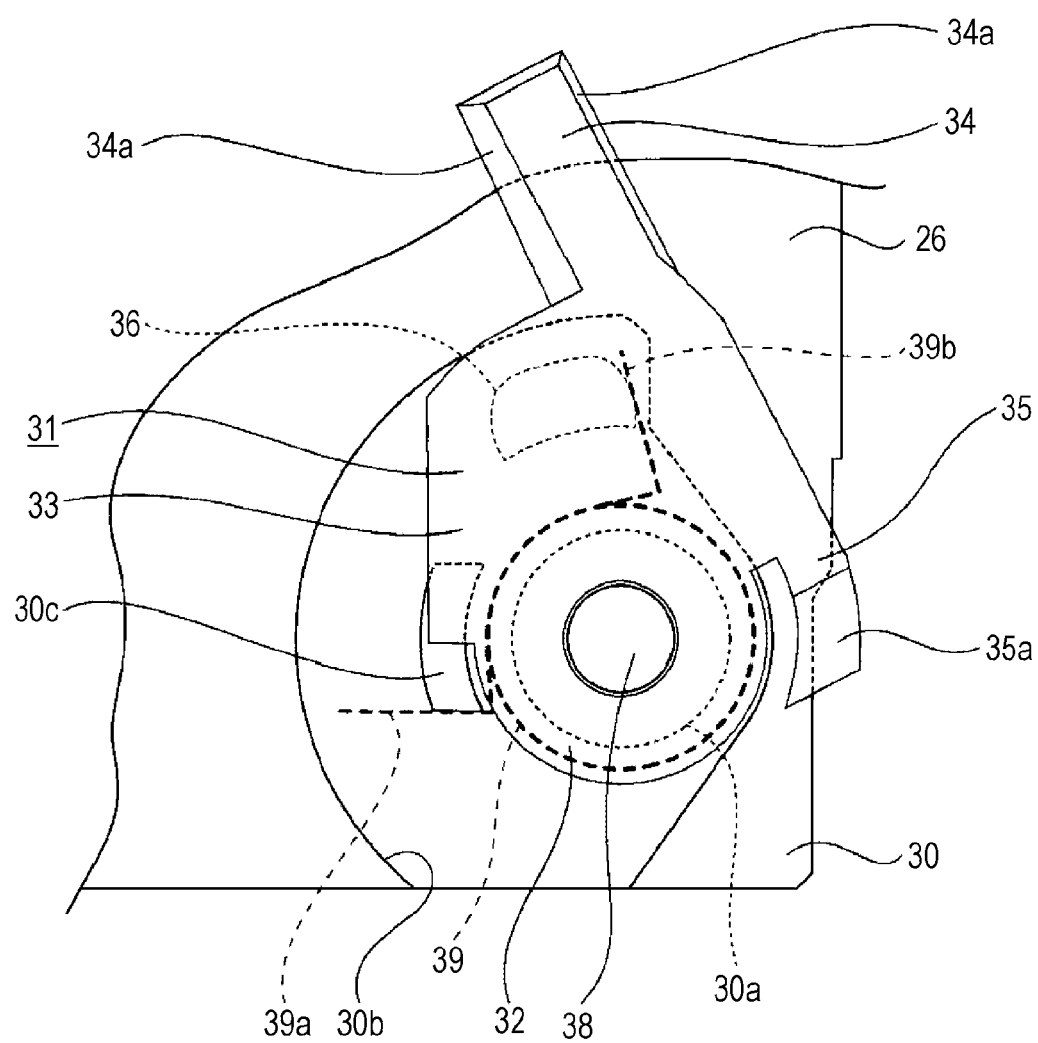
FIG. 17 is a schematic expanded plan view illustrating a state wherein the route adjuster is turned in another direction.

Upon the route adjuster 31 being turned in the direction for the positioning protrusion 34 to move toward the front, an edge portion 39a of the return spring 39 is engaged to the spring engaging portion 36, while the other edge portion 39b of the return spring 39 is engaged to the spring engaging protrusion 30c, and biasing force is applied to the route adjuster 31 by the return spring 39 in the turning direction of the positioning protrusion 34 being moved toward the rear side (see FIG. 16). Conversely, upon the route adjuster 31 being turned in the direction for the positioning protrusion 34 to move toward the rear side, the other edge portion 39b of the return spring 39 is engaged to the spring engaging portion 36, while the one edge portion 39a is engaged to the spring engaging protrusion 30c, and biasing force is applied to the route adjuster 31 by the return spring 39 in the turning direction of the positioning protrusion 34 being moved toward the front side (see FIG. 17). Accordingly, in a state wherein external force is not applied, the route adjuster 31 is held in a neutral position by the return spring 39.

The neutral position of the route adjuster 31 positioned on the left side is the position held in the direction of the positioning protrusion 34 extending to the right, and the neutral position of the route adjuster 31 positioned on the right side is the position held in the direction of the positioning protrusion 34 extending to the left.

Base Chassis

A base chassis 40 is attached to the base plate 25 (see FIG. 5). The base chassis 40 is made up of a first base 41 and a second base 42 that is attached to the front edge side on the upper face of the first base 41. The first base 41 is made of a resin material, for example, and the second base 42 is made of a metallic material, for example.

Figure 18:
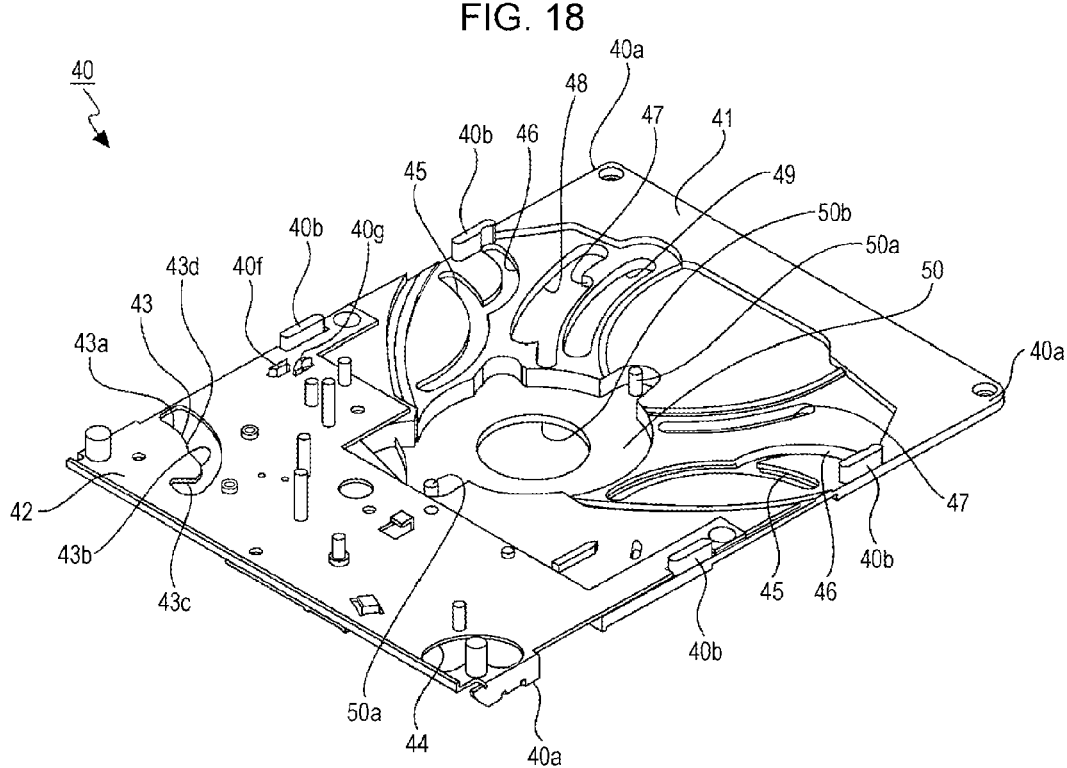
FIG. 18 is a perspective view of a base chassis.

The base chassis 40 is formed having an outline of an erected, roughly rectangular shape, and attachment receiving protrusions 40a are provided to the periphery thereof (see FIG. 18). The attachment receiving protrusions 40a of the base chassis 40 are attached to the attaching protrusions 29 of the base plate 25 with screws or the like, and the base chassis 40 is positioned above the base plate portion 26.

Guide protrusions 40b that protrude upward are provided, separated to the front and back, on the left and right edges of the base chassis 40.

An operating cam portion 43 is formed on the front edge portion of the left edge portion of the base chassis 40 in a manner passing through vertically. The operating cam portion 43 is made up of a first cam portion 43a that is formed in roughly an arc shape having the left front corner of the base chassis 40 as the center thereof, a second cam portion 43b that is similarly formed in roughly an arc shape having the corner as the center thereof and continuing from the front edge of the first cam portion 43a, and a third cam portion 43c that continues from the front edge of the second cam portion 43b and extends to the left and right for a short distance. The first cam portion 43a is wider than the second cam portion 43b, and a stepped edge 43d that faces roughly toward the rear is formed on the continuing portions of the first cam portion 43a and second cam portion 43b.

A gear moving hole 44 is formed on the front edge portion of the right edge portion of the base chassis 40. The gear moving hole 44 is formed in an arc shape having the right front corner of the base chassis 40 as the center thereof.

First shaft moving holes 45 and second shaft moving holes 46 are formed on the left and right edge portions, respectively, in the roughly center portion in the front/back direction of the base chassis 40. The first shaft moving holes 45 and second shaft moving holes 46 are each formed in a protruding arc shape toward the inner side, the center position of which each differs, and the front edge portion of the second shaft moving hole 46 positioned toward the rear side is linked to the middle portion of the first shaft moving hole 45.

Pin moving holes 47 are formed on the inner side of each second shaft moving hole 46 on the base chassis 40. The pin moving holes 47 are formed in a gentle arc shape protruding toward the outer side.

A connecting portion moving hole 48 is formed in a manner continuing to the outer side of the pin moving hole 47 that is positioned on the left side of the base chassis 40. The connecting portion moving hole 48 is formed in an arc shape having the same center as the center of the pin moving hole 47, and is formed in a state linking to the pin moving hole 47.

An action shaft moving hole 49 is formed on the inner side of the pin moving hole 47 that is positioned on the left side of the base chassis 40. The action shaft moving hole 49 is formed in an arc shape having the same center as the center of the pin moving hole 47.

A disposing recess 50 that opens upward is formed on the central portion of the base chassis 40. Supporting pins 50a that protrude upwards are provided to both front and rear edges of the disposing recess 50. A circular table inserting hole 50b is formed in roughly the center of the disposing recess 50.

Sliding protrusions 40c that protrude downward are provided in positions on the front edge side on the lower face of the base chassis 40 in a manner separated to the left and right. The sliding protrusions 40c are formed in an arc shape having the left front corner of the base chassis 40 as the center thereof, and the front edge thereof matches the front edge of the base chassis 40.

Spring supporting shafts 40d that protrude downward from the lower face to positions near each of the left and right edges are provided to the base chassis 40, and spring holding portions 40e are provided to the left and right edge portions. The spring holding portions 40e are positioned near each of the spring supporting shafts 40d.

A locking action protrusion 40f and lock disengaging action protrusion 40g that protrude upward are provided in positions near the left edge of the base chassis 40 (see FIG. 18). The locking action protrusion 40f is positioned somewhat to the front of the lock disengaging action protrusion 40g.

Driving Motor, Gears, Etc.

An attaching plate 51 is attached to the front edge portion on the left edge portion of the base chassis 40 by screws or the like (see FIG. 5). The attaching plate has a motor attaching portion 51a and board attaching portion 51b (see FIG. 20). On the attaching plate 51, a driving motor 52 is attached to the motor attaching portion 51a and a sensor board 53 is attached to the board attaching portion 51b.

The driving motor 52 and sensor board 53 are connected to the circuit board disposed on the floor plate 21 of the base frame 20 by an unshown flexible print wiring plate. The driving motor 52 is attached to the motor attaching portion 51a in the direction that the output shaft extends in the left and right direction, and a worm 54 is fixed to the output shaft. Sensors 53a are mounted on the sensor board 53 (FIGS. 5 and 6).

Figure 6:
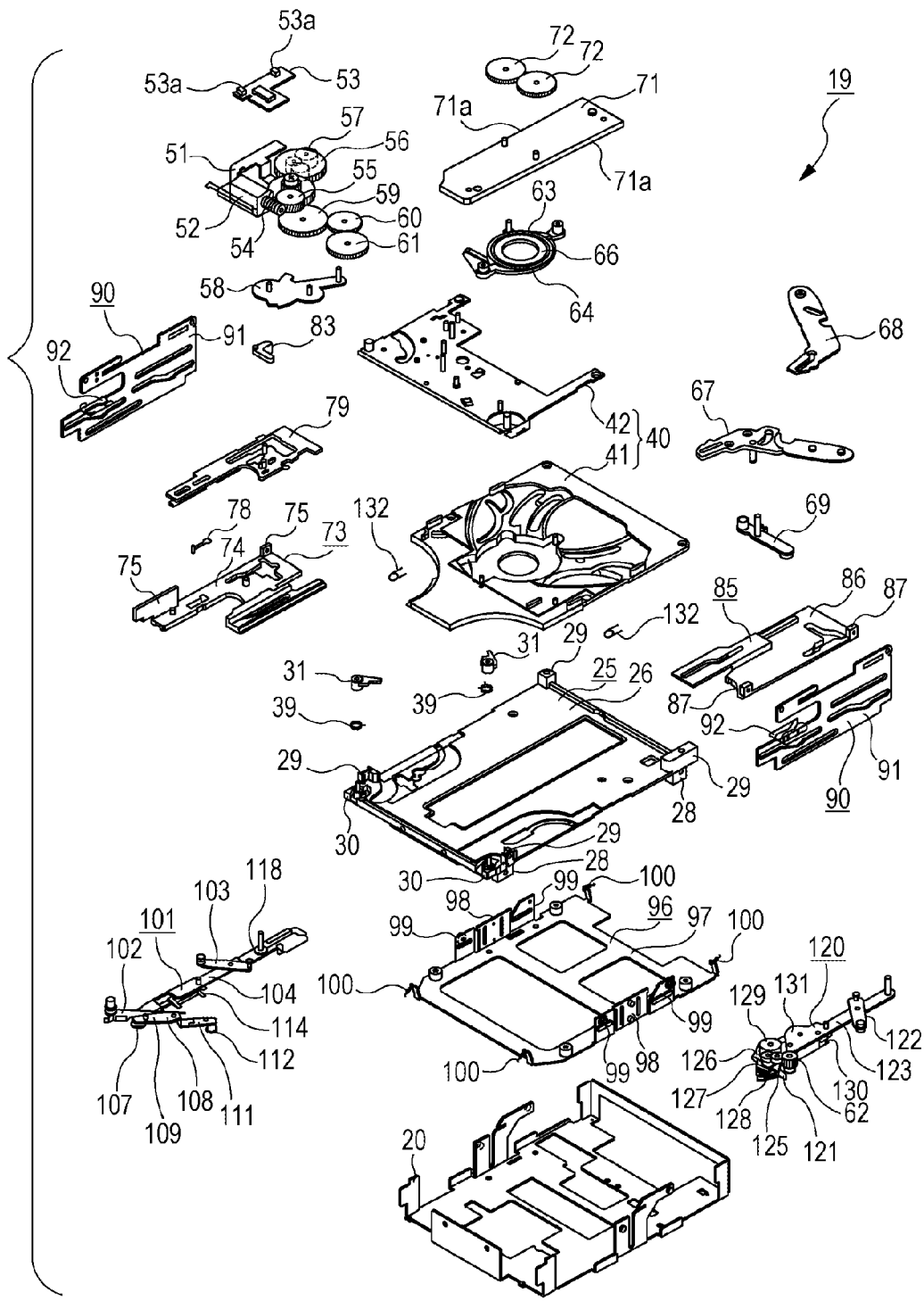
FIG. 6 is an exploded perspective view of the disc conveying device.
Figure 20:
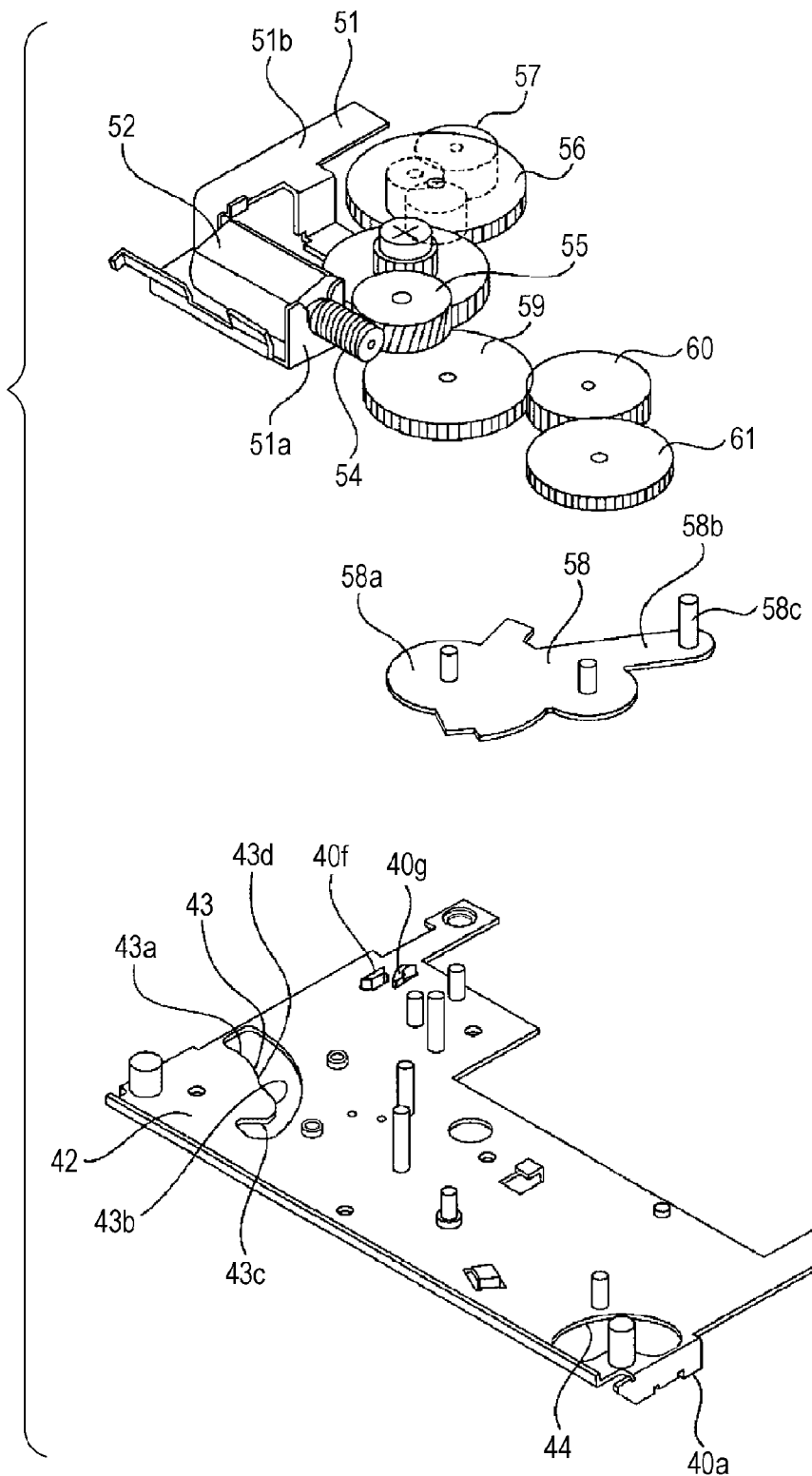
FIG. 20 is an enlarged exploded perspective view illustrating a driving motor and the gears and so forth.

A worm gear 55 and a transmitting gear group 56 are each supported on the upper side of the base chassis 50 (see FIGS. 5, 6, and 20). The worm gear 55 meshes with the worm 54, and the transmitting gear group 56 meshes with the worm gear 55.

A driving gear 57 is supported in a position near the left edge of the base chassis 40, and the driving gear 57 meshes with the final level of the transmitting gear group 56. Accordingly, upon the driving motor 52 being rotated, the driving force thereof is transmitted in sequence to the worm 54, worm gear 55, and the driving gear 57 via the transmitting gear group 56, and the rotations of the driving gear 57 are reduced by the transmitting gear group 56.

A gear supporting plate 58 is turnably supported on the front edge in the center portion in the left/right direction of the base chassis 40. The gear supporting plate 58 is made up of a gear supporting portion 58a, an arm portion 58b that protrudes towards the back from the gear supporting portion 58a, and a sliding pin 58c that protrudes upward from the tip portion of the arm portion 58b.

A first transmitting gear 59 and a switching gear 50 are supported in a meshed state on the gear supporting plate 58. The first transmitting gear 59 is meshed with the worm gear 55.

A second transmitting gear 61 and a third transmitting gear 62 are supported in a meshed state on the right edge portion on the front edge portion of the base chassis 60.

The second transmitting gear 61 is meshed with the switching gear 60 or disengaged from meshing, according to the turning position of the gear supporting plate 58. The third transmitting gear 62 is supported on the right front corner of the base chassis 60.

Upon the driving motor 52 being rotated while the second transmitting gear 61 is meshed with the switching gear 60, the driving force thereof is transmitted in sequence to the worm 54, worm gear 55, first transmitting gear 59, switching gear 60, and the third transmitting gear 62 via the second transmitting gear 61.

Pulley Holder and Chucking Pulley

Figure 7:
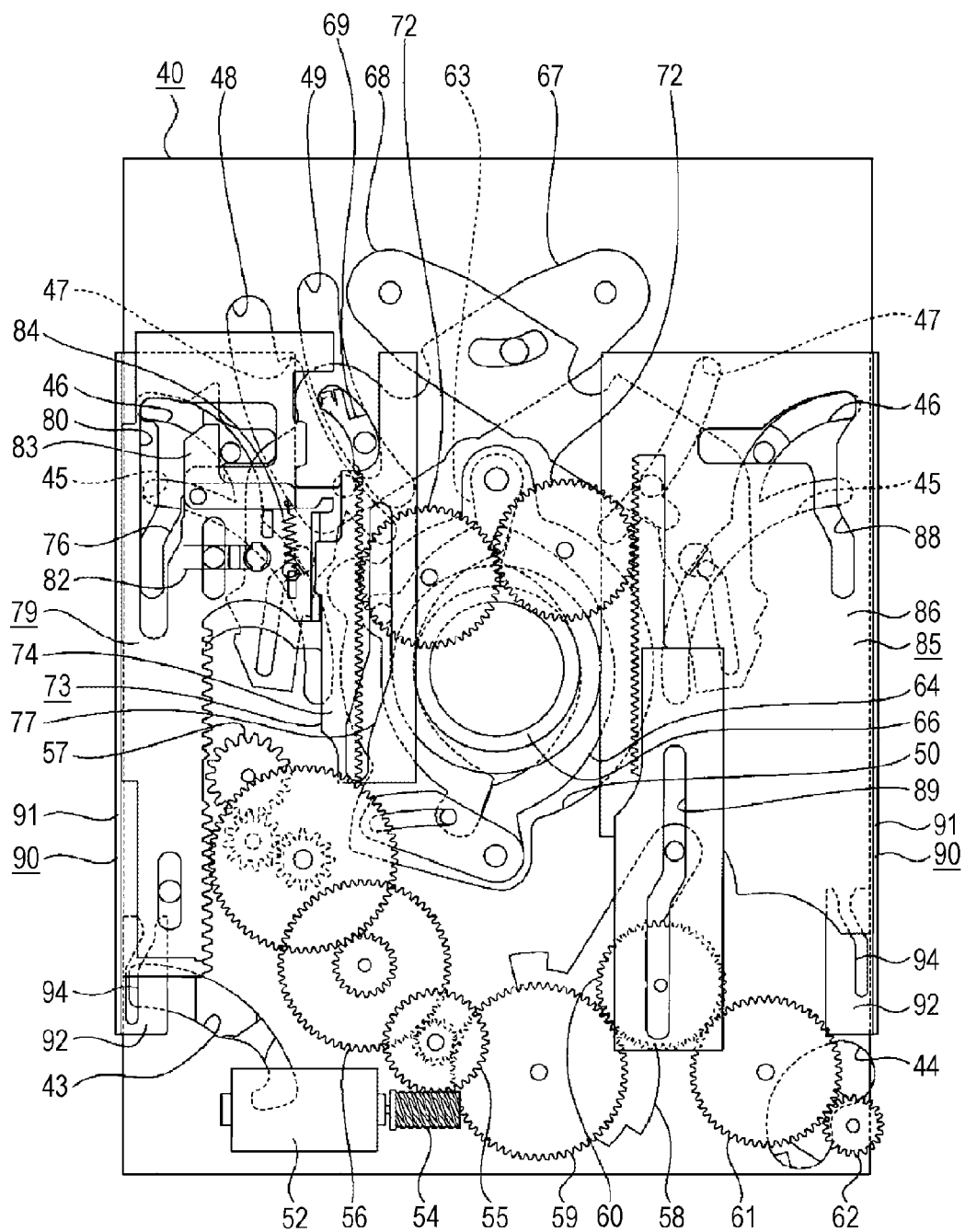
FIG. 7 is a schematic plan view illustrating the members primarily disposed on the upper side of a base chassis.

A first pulley holder 63 and second pulley holder 64 are disposed in a disposing recess 50 of the base chassis 40 (see FIGS. 6 and 7).

Figure 21:
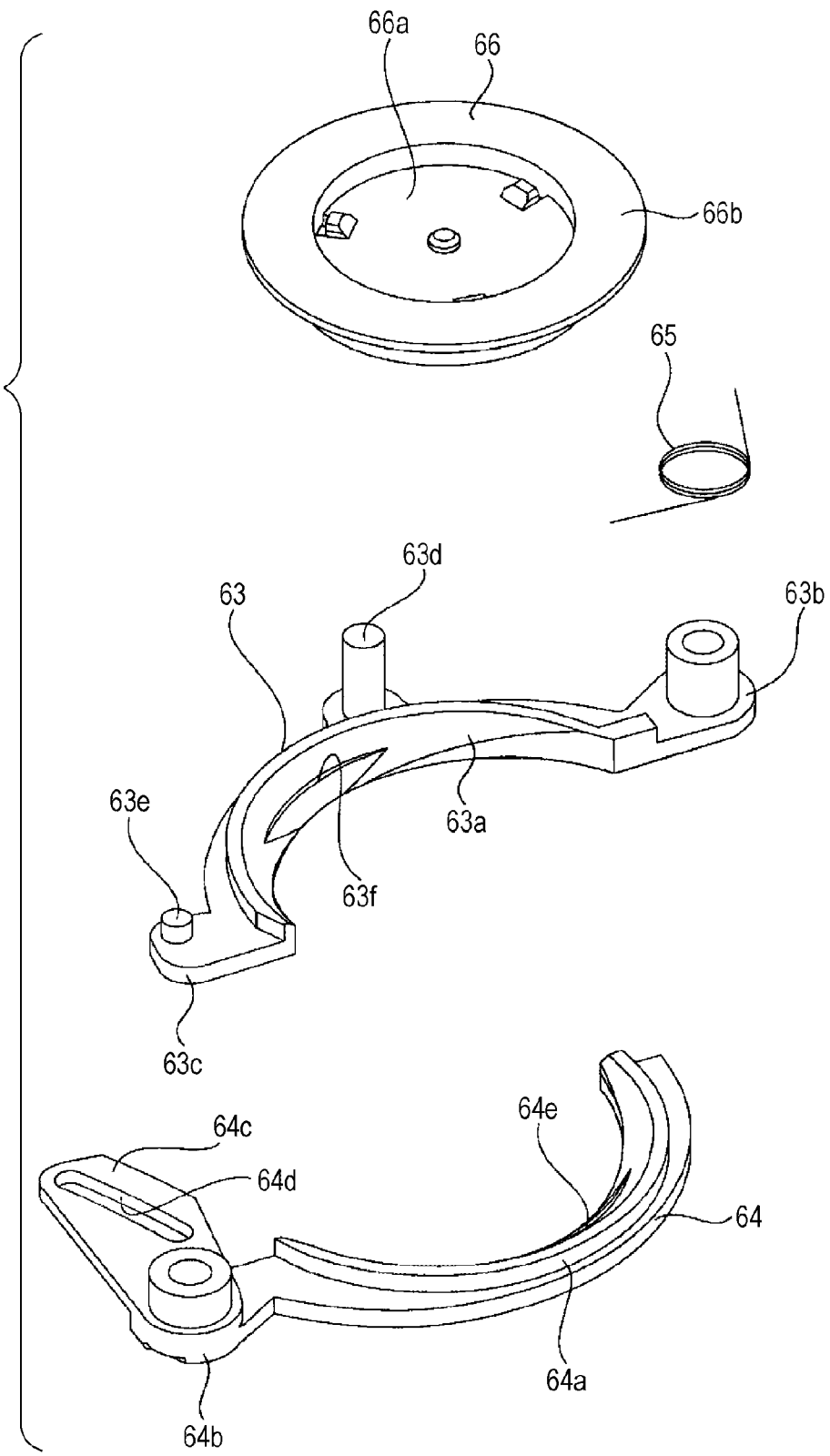
FIG. 21 is an enlarged exploded perspective view illustrating a pulley holder and a chucking pulley.
Figure 26:
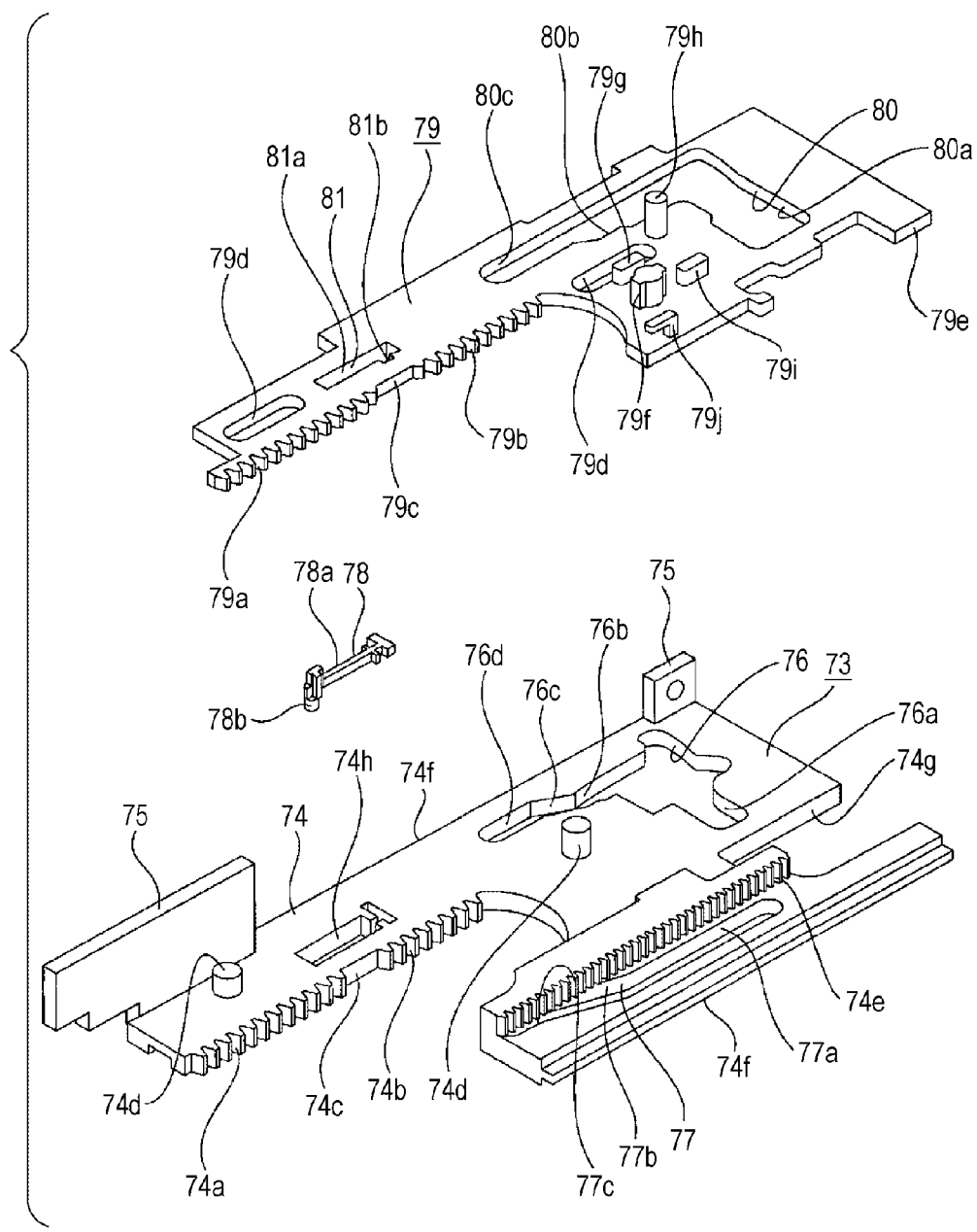
FIG. 26 is an exploded perspective view illustrating a first main slider and sub slider.

The first pulley holder 63 is made up of a holding portion 63a that is formed in a semi-circle arc protruding toward the left side, a supported portion 63b that protrudes backward from the rear edge portion of the holding portion 63a, and a connecting portion 63c that protrudes frontward from the front edge portion of the holding portion 63a (see FIGS. 21 and 26). A slave pin 63d that protrudes upward is provided to the center portion of the holding portion 63a, and a connecting pin 63e that protrudes upward is provided to a connecting portion 63c. The holding portion 63a is formed in an inverse conical shape that slopes downward, excluding the periphery portion. A stepped portion 63f is formed on the upper face of the center portion in the lengthwise direction of the holding portion 63a.

The second pulley holder 64 is made up of a holding portion 64a that is formed in a semi-circle arc having the concave portion toward the right side, a supported portion 64b that protrudes frontward from the front edge portion of the holding portion 64a, and a connecting portion 64c that protrudes sideways from the supported portion 64b. A connecting hole 64d that is formed in a gentle arc shape is formed on the connecting portion 64c. The holding portion 64a is formed in an inverse conical shape that slopes downward, excluding the periphery portion. A stepped portion 64e is formed on the upper face of the center portion in the lengthwise direction of the holding portion 64a.

The first pulley holder 63 has one supporting pin 50a provided to the disposing recess 50 that is inserted in the supported portion 63b, and is turnable having the one support pin 50a as the fulcrum in the disposing recess 50.

The second pulley holder 64 has the other supporting pin 50a provided to the disposing recess 50 that is inserted in the supported portion 64b, and is turnable having the other support pin 50a as the fulcrum in the disposing recess 50.

The connecting pin 63e of the first pulley holder 63 is inserted in the connecting hole 64d of the second pulley holder 64d so as to be slidably engaged, whereby the second pulley holder 64 is turned according to the turning action of the first pulley holder 63. The first pulley holder 63 and second pulley holder 64 synchronously turn in the direction that the holding portions 63a and 64b attach and separate. In a state of the first pulley holder 63 and second pulley holder 64 being supported by supporting pins 50a, a torsion coil spring 65 is supported between one of the supporting pins 50a and the first pulley holder 63, whereby biasing force is applied to the first pulley holder 63 and second pulley holder 64 in the direction that the holding portions 63a and 64b approach each other.

A chucking pulley 66 is held by the first pulley holder 63 and second pulley holder 64. The chucking pulley 66 is formed of a magnetic material, and has a mounted part 66a having an externally round shape, and a flange portion 66b that is flared outward from the mounted part 66a.

Figure 22:
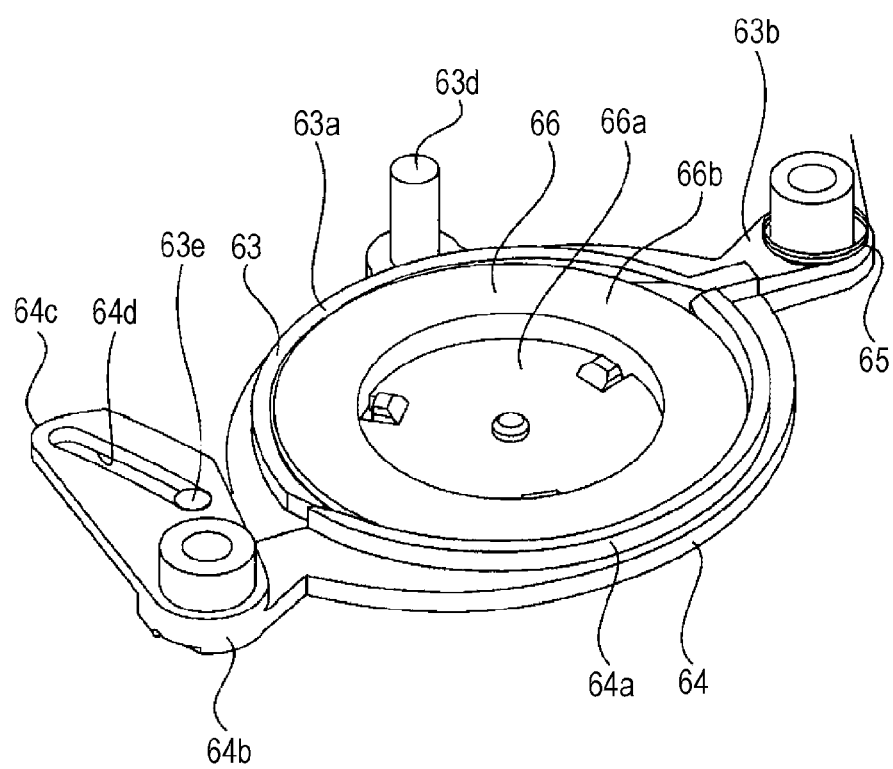
FIG. 22 is an enlarged perspective view illustrating a chucking pulley being held by a pulley holder.
Figure 23:
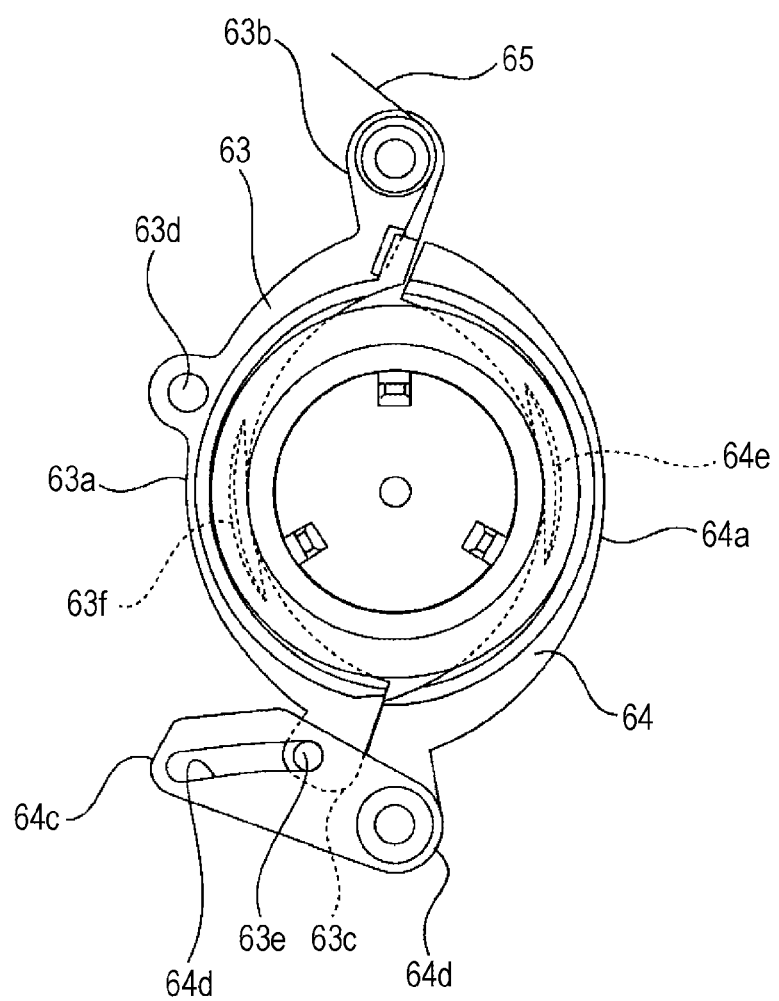
FIG. 23 is a plan view illustrating a state wherein a first pulley holder and second pulley holder are closed.
Figure 24:
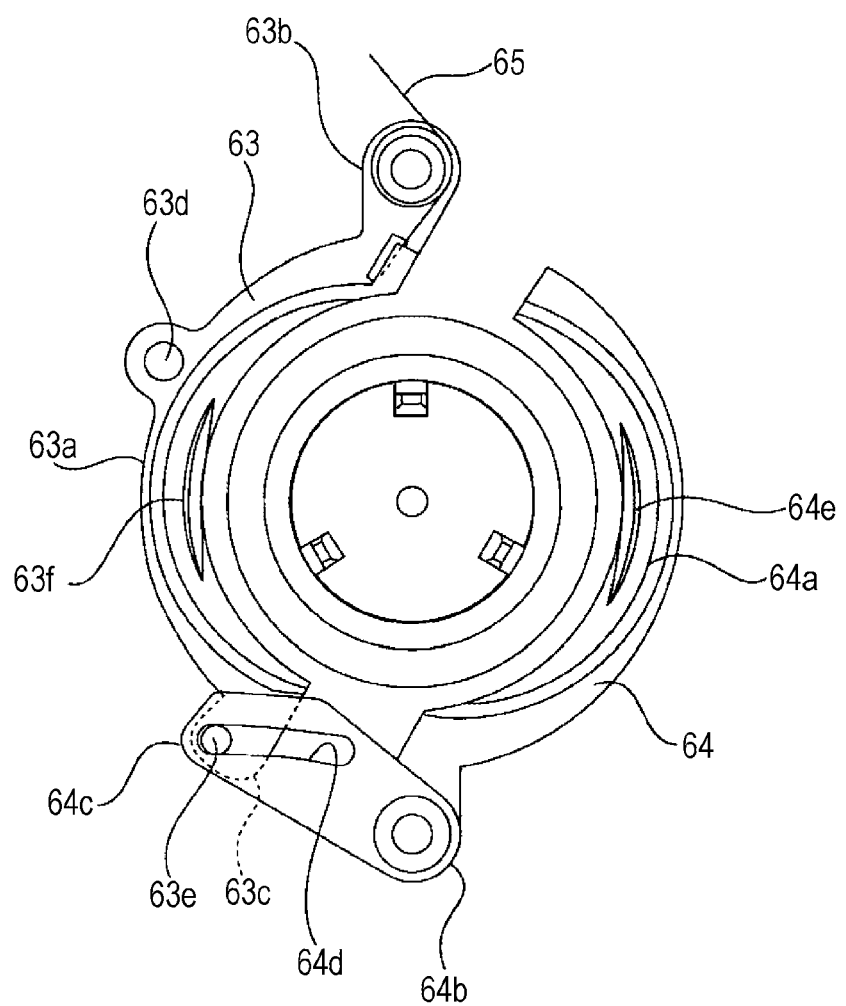
FIG. 24 is a plan view illustrating a state wherein a first pulley holder and second pulley holder are open.

The chucking pulley 66 is held in a state of being held up upwards by the holding portion 63a of the first pulley holder 63 and the holding portion 64a of the second pulley holder 64 being positioned on the lower side of the flange portion 66b (see FIGS. 22 and 23). The chucking pulley is turned from the state of being held, in the direction of the first pulley holder 63 and second pulley holder 64 separating against the bias force of the coil spring 65, and the holding portions 63a and 64a open and are positioned outside the flange portion 66b, whereby the holding state of the first pulley holder 63 and second pulley holder 64 as to the chucking pulley 66 is disengaged, and the chucking pulley 66 is in a state that can be moved downward (see FIG. 24).

Note that stepped portions 63f and 64e are formed on the first pulley holder 63 and second pulley holder 64, respectively, and as the holding portions 63a and 64a of the first pulley holder 63 and second pulley holder 64 separate, the chucking pulley 66 moves downwards, the process during which the flange portion 66b, when sloping as to a horizontal state, engages with one of the stepped portions 63f and 64e, and movement is restricted in the state of the chucking pulley 66 sloping. While in the state of movement being restricted while in a sloped state, the holding portions 63a and 64a continue to separate, the chucking pulley 66 moves until the flange portion 66b engages with both stepped portions 63f and 64e, and is in a horizontal state. Accordingly, when the holding portions 63a and 64a further separate, the chucking pulley moves downward in a horizontal state, whereby movement of the chucking pulley 66 is performed in an appropriate direction.

Interlocking Lever

Figure 8:
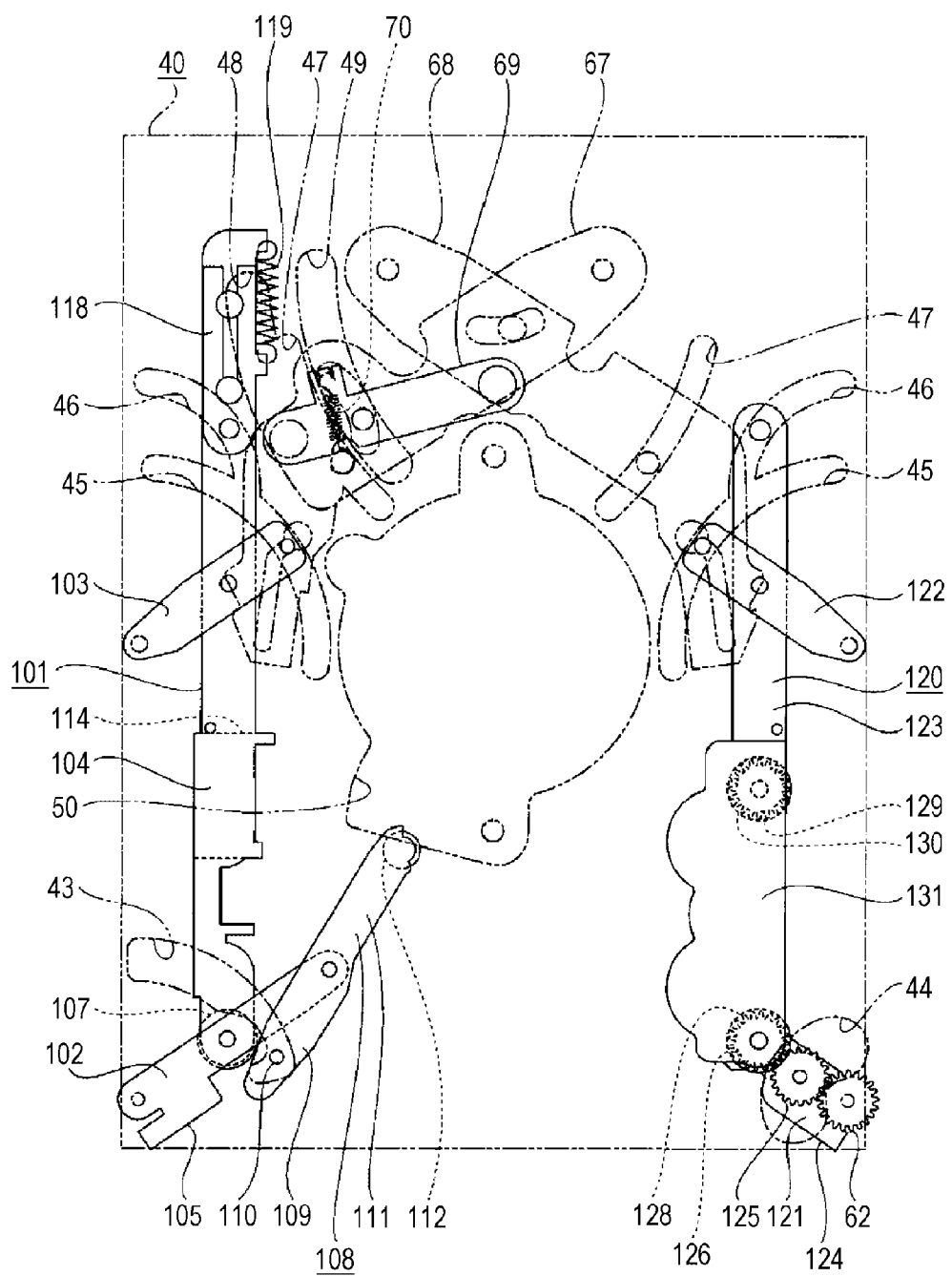
FIG. 8 is a schematic plan view illustrating the members primarily disposed on the lower side of the base chassis.

A first interlocking lever 67 and second interlocking lever 68 are movably supported in the state of being connected in positions near the rear edge on the front face of the base chassis 40 (see FIGS. 6 through 8).

Figure 25:
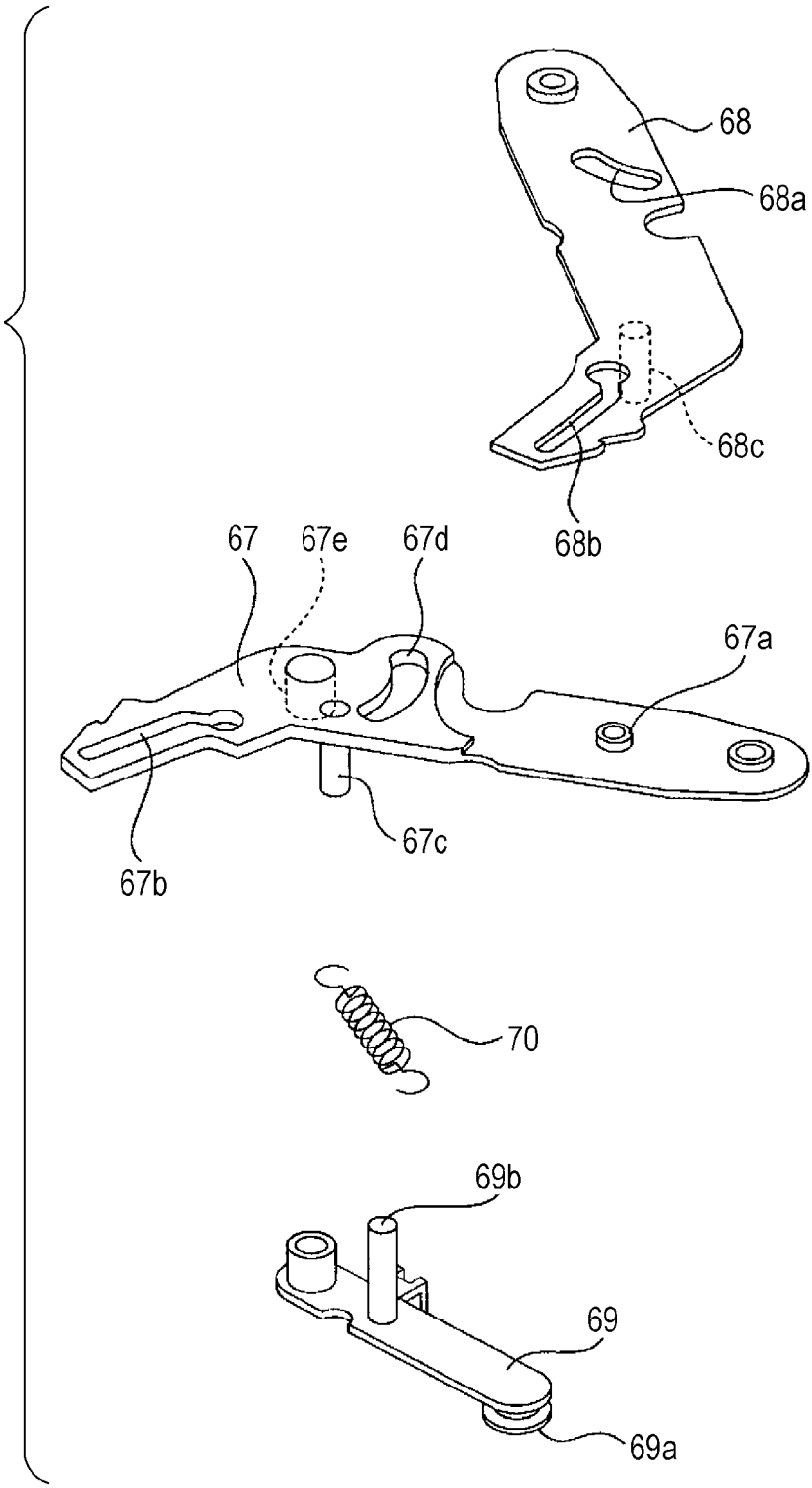
FIG. 25 is an exploded perspective view illustrating an interlocking lever and a starting level.

The first interlocking lever 67 is formed as a plate facing the up/down direction, and is in a dogleg shape protruding behind in the left diagonal direction (see FIG. 25). A connecting shaft 67a that protrudes upward in a position near the right edge is provided to the first interlocking lever 67, an arc-shaped engaging hole 67b is formed on the left edge portion, and a disc holding pin 67c protruding downward is provided to the right side of the engaging hole 67b. An arc-shaped shaft inserting hole 67d is formed in roughly the center portion in the left/right direction of the first interlocking lever 67, and a supporting axis 67e protruding downward is provided between the engaging hold 67b and shaft inserting hole 67d. The right edge portion of the first interlocking lever 67 is turnably supported by the base chassis 40.

The second interlocking lever 68 is formed as a plate facing the up/down direction, and is in a dogleg shape protruding behind roughly in the right diagonal direction. The second interlocking lever 68 has an arc-shaped connecting hole 68a formed at a position near the left edge, and roughly an arc-shaped connecting hole 68b formed on the right edge portion. A disc holding pin 68c protruding downward near the engaging hole 68b is provided to the second interlocking lever 68. The left edge portion of the second interlocking lever 68 is turnably supported by the base chassis 40.

The connecting shaft 67a of the first interlocking lever 67 is inserted in the connecting hold 68a of the second interlocking lever 68 so as to be slidably engaged, and the first interlocking lever 67 and second interlocking lever 68 are synchronously turned having the right edge portion and left edge portion, respectively, as the fulcrum. The disc holding pins 67c and 68c of the first interlocking lever 67 and second interlocking lever 68 are each inserted into the pin moving holes 47 of the base chassis 40 and protrude downward from the base chassis 40.

The supporting shaft 67e of the first interlocking lever 67 is inserted in the connecting portion moving hole 48 of the base chassis 40 and protrudes downward. A starting lever 69 is turnably supported by the supporting shaft 67e of the first interlocking lever 67 (see FIGS. 8 and 25).

The starting lever 69 is positioned on the lower face side of the base chassis 40. The starting lever 69 is formed to be long in one direction, and has a pressed shaft 69a that protrudes downward toward an edge portion. The other edge portion of the starting lever 69 is the turning fulcrum as to the first interlocking lever 67. An action shaft 69b that protrudes upward is provided in a position near the turning fulcrum of the starting lever 69, and the action shaft 69b is inserted through the action shaft moving hole 49 of the base chassis 40 and the shaft inserting hole 67d of the first interlocking lever 67 and protrudes upwards.

A coil spring 70 is supported between the starting lever 69 and the disc holding pin 67c of the first interlocking lever 67, and bias force is applied to the starting lever 69 by the coil spring 70 in the turning direction for the pressed shaft 69a to move forward.

Cover Plate

A cover plate 71 is attached from above by screws or the like in the center portion in the left/right direction of the first base portion 41 of the base chassis 40 (see FIGS. 5 and 6). The cover plate 71 is formed having an erected, roughly rectangular shape, and the first pulley holder 63, second pulley holder 64, chucking pulley 66, a portion of the first interlocking lever 67, and a portion of the second interlocking lever 68 are closed off from above by the cover plate 71. Both the left and right edge portions of the cover plate 71 are provided as guide portions 71a.

Synchronizing Gear

Synchronizing gears 72 are supported in a meshed state on the upper face side of the cover plate 71.

First Main Slider

A first main slider 73 is movably supported in the front/back direction on the left edge portion on the upper face of the base chassis 40 (see FIGS. 5 through 7).

Figure 27:
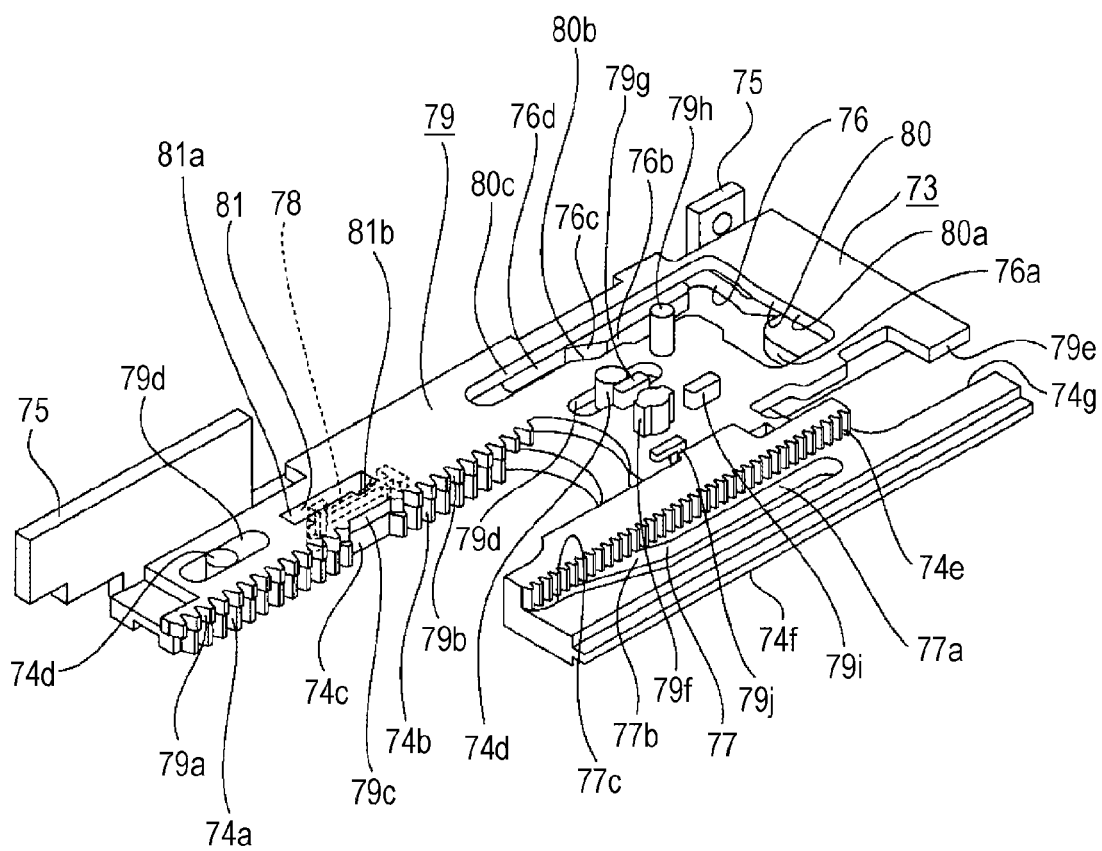
FIG. 27 is a perspective view illustrating the first main slider and sub slider.
Figure 28:
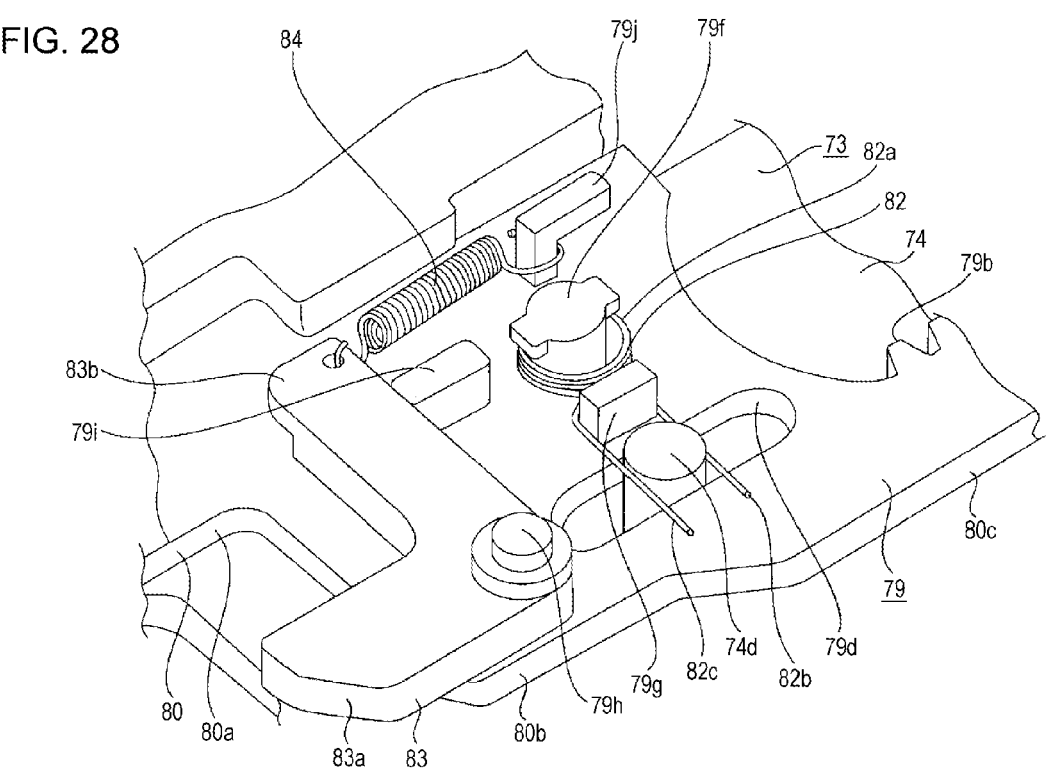
FIG. 28 is an enlarged perspective view illustrating a portion of the sub slider and an operating lever and so forth.
Figure 29:
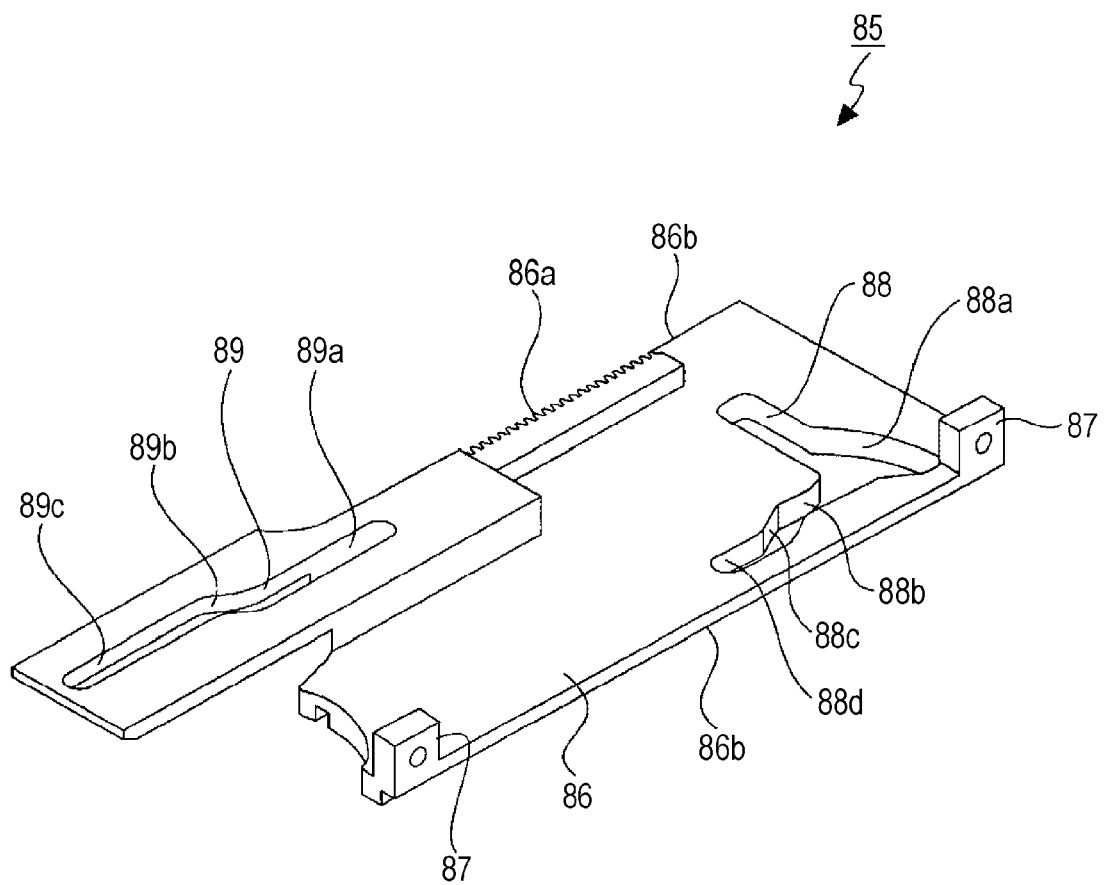
FIG. 29 is a perspective view illustrating a second main slider.

The first main slider 73 has a plate-shaped sliding portion 74 that faces in the up/down direction and connecting portions 75 that each protrude upward from both the front and back edge portions on the left edge portion of the sliding portion 74 (see FIGS. 26 and 27).

A first main rack portion 74a and a second main rack portion 74b that face the right, in a manner separated front and back, on the front half portion on the left edge portion of the sliding portion 74, and the portion between the first main rack portion 74a and second main rack portion 74b is formed as a non-rack portion 74c.

Supporting pins 74d that are separated front and back, and protrude upward are provided to the sliding portion 74. A connecting rack portion 74e that faces the right in a position near the right edge is provided to the sliding portion 74, and guide receiving portions 74f that extend front to back are provided on each of the left and right edge portions. An inserting notch 74g that is opened to the rear is formed on the rear edge portion in a position near the right edge of the sliding portion 74.

A cam hole 76 is formed in a position near the rear edge on the left edge portion of the sliding portion 74. The cam hole 76 is made up of a waiting portion 76a having a large open area, a first straight line portion 76b that continues to the front edge on the left edge portion of the waiting portion 76a and extends front to back, a sloping portion 76c that continues to the front edge of the first straight line portion 76b and is sloped so as to move towards the left as movement is made closer to the front edge, and a second straight line portion 76d that continues to the front edge of the sloping portion 76c and extends front to back.

A cam supporting hole 77 is formed between the connecting rack portion 74e and the guide receiving portion 74f on the right side, on the sliding portion 74. The cam supporting hole 77 is made up of a rear side portion 77a that extends front to back, an intermediate portion 77b that continues to the front edge of the rear side portion 77a and is sloped so as to be displaced towards the left as movement is made closer to the front, and a front side portion 77c that continues to the front edge of the intermediate portion 77b and extends front to back.

A lever action hole 74h that extends front to back is formed in a position near the front edge of the sliding portion 74.

A locking lever 78 that is disposed in the lever action hole 74h is attached to the sliding portion 74. The locking lever 78 is made up of an elastic deformation portion 78a that extends front to back and a locking portion 78b that protrudes to the right from the front edge side of the elastic deformation portion 78a, and the rear edge portion of the elastic deformation portion 78a is attached to the sliding portion 74. Accordingly, the elastic deformation portion 78a is elastically deformed and the locking lever 78 is operated in the lever action hole 74h.

On the first main slider 73, the guide receiving portions 74f are guided by the guide protrusions 40b provided on the left edge portion of the base chassis 40 and the guide portions 71a on the left side of the cover plate 71, and are movably supported in the front/back direction of the base chassis 40.

In a state wherein the first main slider is supported by the base chassis 40, the connecting rack portion 74e is meshed with the synchronizing gear 72 on the left side (see FIG. 5). Accordingly, the synchronizing gears 72 turn according to the movement in the front/back direction of the first main slider 73.

Also, in a state wherein the first main slider 73 is supported by the base chassis 40, the slave pin 63d provided to the first pulley holder 63 is inserted into the cam supporting hole 77.

Sub Slider

A sub slider 79 is movably supported in the front/back direction on the first main slider 73 (see FIGS. 5 through 7). The sub slider 79 is formed in a plate shape facing the up/down direction, and a first sub rack portion 79a and a second sub rack portion 79b that face the right, in a manner separated front and back, are provided on the front half portion on the left edge portion of the sub slider 79 (see FIGS. 26 and 27). The portion between the first sub rack portion 79a and second sub rack portion 79b is formed as a non-rack portion 79c.

The pitch of the first sub rack portion 79a and second sub rack portion 79b of the sub slider 79 is the same as the pitch of the first main rack portion 74a and second main rack portion 74b, and the distance in the front/back portion of the non-rack portion 79c is the same as the distance in the front/back portion of the non-rack portion 74c.

Supported holes 79d that are separated front to back and extend front to back are formed on the sub slider 79. An action protrusion 79e that protrudes to the right is provided to the rear edge portion of the sub slider 79.

A spring support protrusion 79f and spring engaging protrusion 79g that each protrude upward are provided in the roughly center portion in the front/back direction of the sub slider 79. The spring support protrusion 79f is positioned to the right of the supported hole 79d at the rear side, and the spring engaging protrusion 79g is positioned between the spring support protrusion 79f and the supported hole 79d on the rear side.

A lever support pin 79h that protrudes upward toward the rear of the supported hole 79d on the rear side is provided to the sub slider 79. A turn-restricting protrusion 79i that protrudes upward on the rear of the spring support protrusion 79f is provided to the sub slider 79. A spring hooking protrusion 79*j* that protrudes upward in the opposite direction from the spring engaging protrusion 79*g* is provided to the sub slider 79, sandwiching the spring support protrusion 79*f* therebetween.

A cam action hole 80 is formed in a position near the rear edge on the left edge portion on the sub slider 79. The cam action hole 80 is made up of a waiting portion 80*a* having a large open area, a rear side straight line portion 80*b* that continues to the front edge on the left edge portion of the waiting portion 80*a* and extends front to back, and a front side straight line portion 80*d* that continues to the front edge of the rear side straight line portion 80*b* and extends front to back. The horizontal width of the rear side straight line portion 80*b* is greater than the horizontal width of the front side straight line portion 80*c*.

A lever inserting hole 81 is formed in a position near the front edge of the sub slider 79. The lever inserting hole 81 is made up of an inserting portion 81*a* that extends front to back and a recessed lever engaging portion 81*b* that is open towards the left, wherein the lever engaging portion 81*b* is linked to the portion near the rear edge of the inserting portion 81*a*.

A position control spring 82 is supported by the spring support protrusion 79*f* of the sub slider 79. The position control spring 82 is a torsion coil spring, and the coil portion 82*a* is supported by the spring supporting protrusion 79*f*, one edge portion 82*b* is positioned on the front side of the spring engaging protrusion 79*g*, and the other edge portion 82*c* is positioned on the rear side of the spring engaging protrusion 79*g*.

A supporting pin 74*d* of the first main slider 73 inserted into the supported hole 79*d* on the rear side is positioned between the one edge portion 82*b* and other edge portion 82*c* on the position control spring 82.

An L-shaped action lever 83 is turnably supported by the lever support pin 79*h* of the sub slider 79. The action lever 83 is made up of a first portion 83*a* that extends roughly in the front/back direction and a second portion 83*b* that extends roughly in the left/right direction, and the portion connecting to the first portion 83*a* and second portion 83*b* are supported by the lever supporting pin 79*h*.

A portion of the first portion 83*a* of the action lever 83 is positioned on the upper side of the waiting portion 80*a* of the cam action hole 80. A pulling coil spring 84 is supported between the second portion 83*b* of the action lever 83 and the spring hooking protrusion 79*j*. Accordingly, the action lever 83 is biased toward the direction of the second portion 83*b* moving toward the front, and the second portion 83*b* touches the turn-restricting portion 83*i*, whereby the turning as to the sub slider 79 is restricted.

The sub slider 79 is movably supported in the front/back direction by the first main slider 73, by the supporting pins 74*d* being inserted into the supported holes 79*d* from the bottom (see FIG. 27).

In a state wherein the sub slider 79 is supported on the first main slider 73, the locking lever 78 attached to the first main slider 83 is inserted into the lever inserting hole 81.

Second Main Slider

A second main slider is movably supported in the front/back direction on the right edge portion on the upper face of the base chassis 40 (see FIGS. 5 through 7). The second main slider 85 has a plate-shaped sliding portion 86 that faces the up/down direction, and connecting portions 87 that protrude upward from each of the front and back edge portions on the right edge portion of the sliding portion 86.

A cam hole 88 is formed in a position near the rear edge of the sliding portion 86. The cam hole 88 is made up of a waiting portion 88*a* having a large open area, a first straight line portion 88*b* that continues to the front edge on the right edge portion of the waiting portion 88*a* and extends front to back, a sloping portion 88*c* that continues to the front edge of the first straight line portion 88*b* and is sloped so as to be displaced towards the right as movement is made closer to the front edge, and a second straight line portion 88*d* that continues to the front edge of the sloping portion 88*c* and extends front to back.

A connecting rack portion 86*a* that faces the left in a position near the left edge is provided to the sliding portion 86, and guide receiving portions 86*b* that extend front to back are provided on each of the left and right edge portions.

A cam sliding hole 89 is formed in a position on the front edge side of the sliding portion 86. The cam sliding hole 89 is made up of a rear side sliding portion 89*a* that extends front to back, a sloping sliding portion 89*b* that continues to the front edge of the rear side sliding portion 89*a* and is sloped so as to be displaced towards the left as movement is made closer to the front edge, and a front side sliding portion 89*c* that continues to the front edge of the sloping sliding portion 89*b* and extends front to back.

The guide receiving portions 86*b* are guided by the guide protrusions 40*b* provided to the right edge portion of the base chassis 40 and a guide portion 71*a* on the right side of the cover plate 71, and the second main slider 85 is movably supported in the front/back direction by the base chassis 40. In the state of the second main slider 85 being supported by the base chassis 40, the connecting rack portion 86*a* is meshed with the synchronizing gear 72 on the right side (see FIG. 5). Accordingly, movement force of the first main slider 73 is transmitted to the second main slider 85 via the synchronizing gears 72, whereby the first main slider 73 and second main slider 85 synchronously move in the front/back direction.

Side Slider

Side sliders 90 are connected to the connecting portions 75 of the first main slider 73 and the connecting portions 87 of the second main slider 85 (see FIGS. 5 through 7). The side sliders 90 are made up of a plate-shaped side face portion 91 that faces the left/right direction and a plate-shaped guide portion 92 that faces the up/down direction which is attached to the upper edge portion of the side face portion 91 (see FIG. 30).

Figure 31:
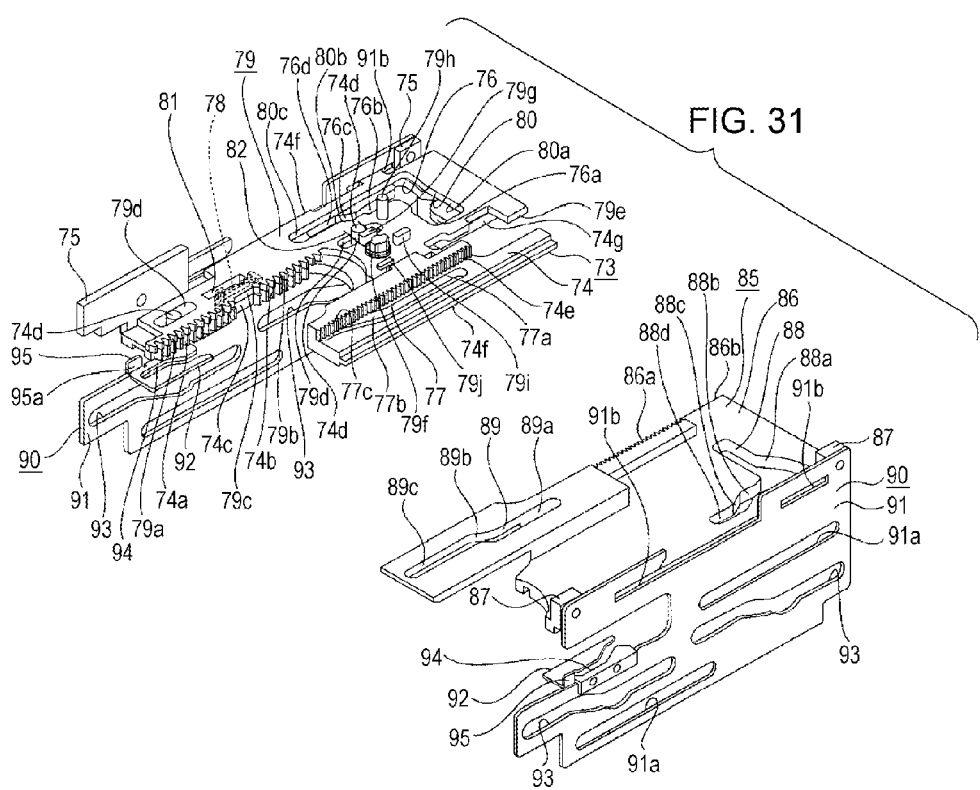
FIG. 31 is a perspective view illustrating a first main slider and sub slider and a second main slider and side slider.

The edge portions on both the front and back sides on the upper edge side of the side sliders 90 are connected to connecting portions 75 of the first main slider 73 and connecting portions 87 of the second main slider 85, and the side face portions 91 are positioned on the outside of the left and right side faces on the base chassis 40 (see FIG. 31).

Figure 30:
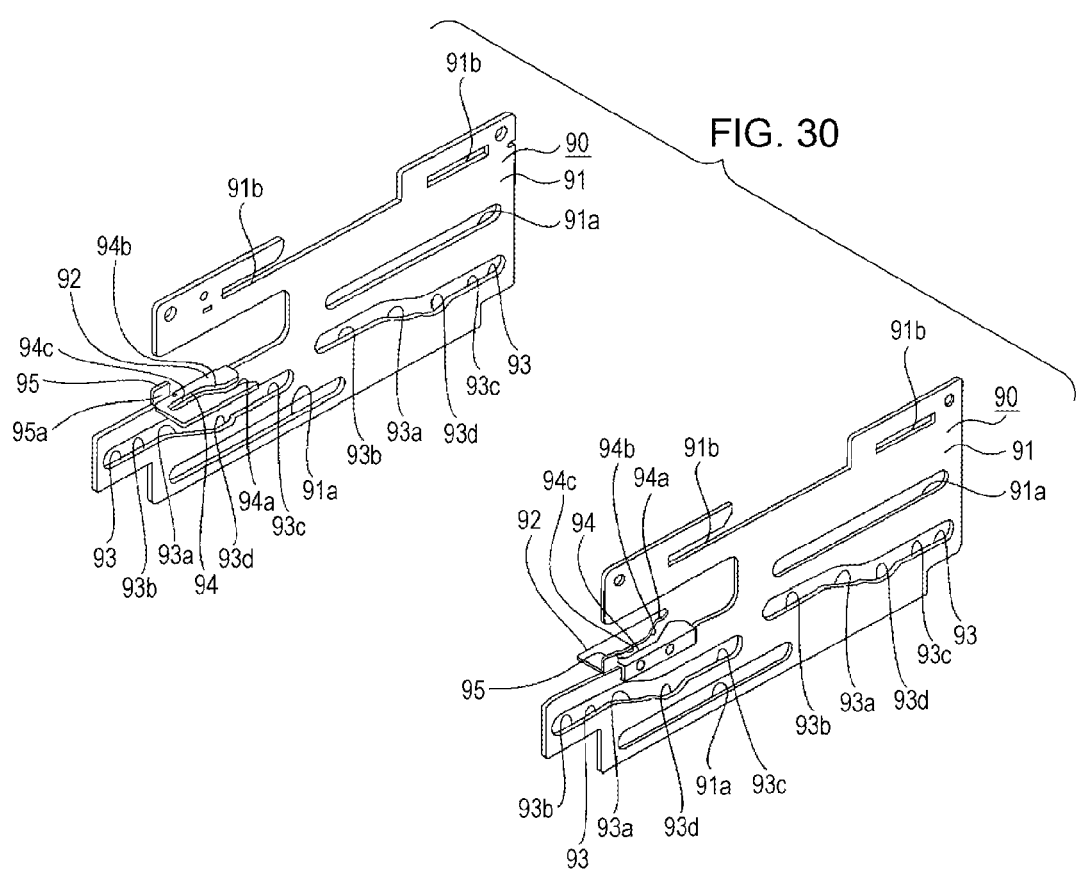
FIG. 30 is a perspective view illustrating a side slider.

Elevator cam holes 93 are formed on the side face portion 91 in a manner separated front to back (see FIGS. 30 and 31). The elevator cam holes 93 are made up of a sloping cam portion 93*a* that is displaced towards the right as movement is made closer to the front, a front side cam portion 93*b* that continues to the front edge of the sloping cam portion 93*a* and extends front to back, a rear side cam portion 93*c* that continues to the rear edge of the sloping cam portion 93*a* and extends front to back, and a holding recess 93*d* that opens upward is formed on the rear edge portion of the sloping cam portion 93*a*.

Guide receiving holes 91*a* that extend front to back are formed below the front side elevator cam holes 93 and above the rear side elevator cam holes 93 on the side face portions 91. Holding holes 91*b* that extend front to back are formed in a manner separated front to back, in positions near the upper edge of the side face portions 91.

A cam sliding hole 94 is formed on the guide portion 92. The cam sliding hole 94 is open towards the rear, and is made up of a rear side sliding portion 94a that extends front to back, a sloping sliding portion 94b that continues to the front edge of the rear side sliding portion 94a and is sloped so as to be displaced outwards (to the side) as movement is made closer to the front edge, and a front side sliding portion 94c that continues to the front edge of the sloping sliding portion 94b and extends front to back.

A stopper 95 which is formed by a portion being bent upwards is provided to the guide portion 92. The stopper 95 is positioned somewhat inward from the side edge positioned on the outermost side of the guide portion 92, and a face facing inward is formed as a contact face 95a.

Guide restriction pins 24 of the base frame 20 are inserted into each of the guide receiving holes 91a, whereby the side slider 90 is movably supported in the front/back direction as to the base frame 20. In a state of the side slider 90 being supported by the base frame 20, the side edge portion on the left side of the sub slider 79 is slidably engaged by the holding holes 91b, whereby the sub slider 79 can be suppressed from floating from the first main slider 73.

Unit Plate and Base Unit, Etc

A unit plate 96 is movably supported in the up/down direction by the side sliders 90 (see FIG. 5). The unit plate 96 has a base face portion 97 that faces the up/down direction, first side face portions 98 that protrude upward from each of the left and right side edges of the base face portion 97, and second side face portions 99 that protrude upward from each of the left and right side edges of the base face portion 97 (see FIGS. 9 and 10).

The base face portion 97 is formed having an erected, roughly rectangular shape, and has spring hooking pieces 97a that protrude upward in a manner separated to the left and right on both front and back edge portions. Springs 100 are supported between the spring hooking pieces 97a and the base frame 20, and the unit plate 96 is biased downward.

A first side face portion 98 is positioned somewhat inward from the side face portion 99, and guide receiving pins 98a are provided in a manner up and down on the outer face of the first side face portion 98. The guide receiving pins 98a are slidably engaged to the guide restricting holes 23 formed between the side face plates 22 of the base frame 20, whereby movement of the unit plate 96 in the left/right direction is restricted by the base frame 20.

The second side face portions 99 are positioned front to back, each having a first side face portion 98 sandwiched between. Guide receiving pins 99a are provided to the outer side of the second side face portion 99. The guide receiving pins 99a are slidably engaged to the elevator cam holes 93, whereby the unit plate 96 is slidably supported in the up/down direction by the side sliders 90.

In a state of the unit plate 96 being supported by the side sliders 90, a base face portion 97 is positioned between the base plate portion 26 of the base plate 25 and the base chassis 40.

Upon the side sliders 90 being moved in the front/back direction together with the movement in the front/back direction of the first main slider 73 and second main slider 85, the guide receiving pins 98a are guided into the guide restricting holes 23 of the base frame 20, and the guide receiving pins 99a are slid into the elevator cam holes 93 of the side sliders 90, whereby the user plate 96 is moved in the up/down direction.

Four dampers 97b are provided to the base face portion 97 in a manner separated front to back and left to right, and an unshown base unit is attached to the base face portion 97 via the dampers 97b. The base unit has a disc table to which a disc-shaped recording medium 200 is mounted, a spindle motor that rotates the disc table, an optical pick-up that moves in the radius direction of the disc-shaped recording medium 200, and so forth. The disc table is positioned directly below the chucking pulley 66, and has a magnet to attract and hold the chucking pulley 66.

The base used is moved in the up/down direction according to the movement of the unit plate 96, and the disc table is attached and detached from the chucking pulley 66.

First Link Mechanism, Etc.

A first link mechanism 101 is supported on the lower face side of the base chassis 40 (see FIG. 8). The first link mechanism 101 has a first front side link arm 102, a first rear side link arm 103, and a first rail 104 (see FIGS. 32 and 33).

The first front side link arm 102 is formed as a plate that faces the up/down direction and extends in one direction, and one edge portion in the lengthwise direction is turnably supported by the lower left corner of the base chassis 40. The turning fulcrum of the first front side link arm 102 is formed in a position shifted somewhat to the rear side as to the turning fulcrum of the route adjuster 31 which is supported by the adjuster supporting portion 30 on the left side of the base plate 25.

A sleeve 106 is supported on the lower face side of the other edge portion in the lengthwise direction of the first front side link arm 102. A fixed roller 107 is supported on the lower face side in the center portion in the lengthwise direction of the first front side link arm 102. At least the periphery portion of the fixed roller 107 is made of a highly adhesive material that can be elastically deformed, such as rubber or the like.

An ejecting lever 108 is turnably supported by the first front side link arm 102. The ejecting lever 108 has a supported face portion 109 and roller support face portion 111 that are connected in the lengthwise direction (see FIGS. 32 through 34).

The supported face portion 109 is made up of a base portion 109a that is long in one direction, a bending portion 109b that protrudes downward from one edge of the base portion 109a, and a connecting portion 109c that extends from the lower edge of the bending portion 109b in the same direction as the base portion 109a.

A cam engaging portion 110 that protrudes upward is provided on the other edge portion of the supported face portion 109. The roller support face portion 111 extends in the same direction as the base portion 109a, and an edge portion thereof is connected to the connecting portion 109c.

A pressing roller 112 is attached to the lower face side on the other edge portion of the roller support face portion 111. The pressing roller 112 is made up of a roller portion 112a and a flange portion 112b that flares outward from the lower edge portion of the roller portion 112a, and the periphery portion of the roller portion 112a is made of a highly adhesive material that can be elastically deformed, such as rubber or the like.

Figure 34:
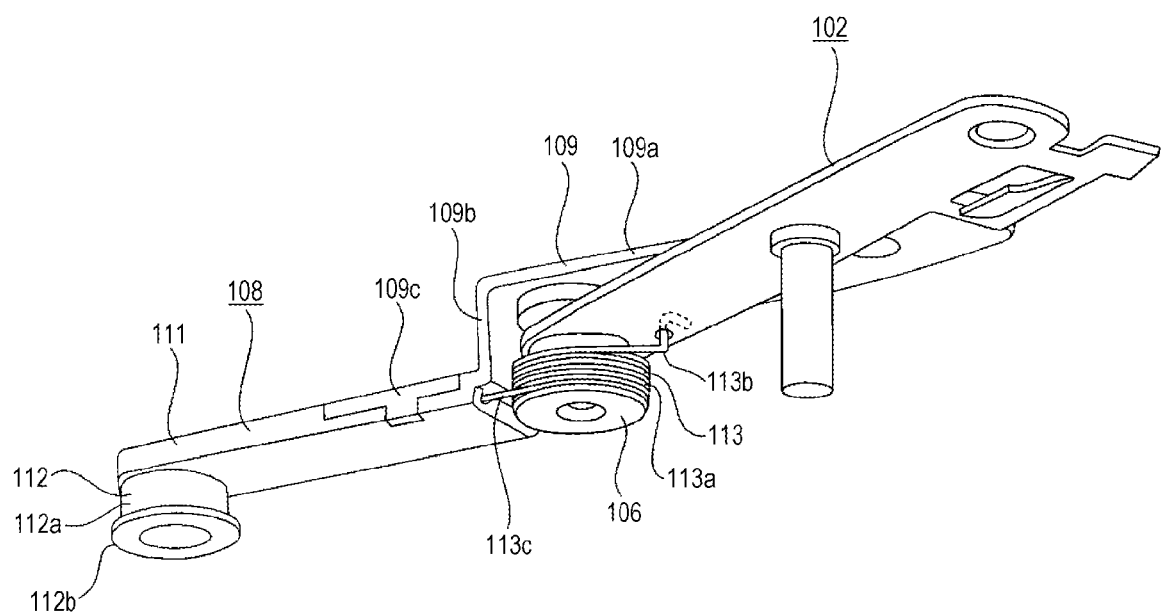
FIG. 34 is an enlarged perspective view illustrating a first front side link arm and ejecting level.
Figure 35:
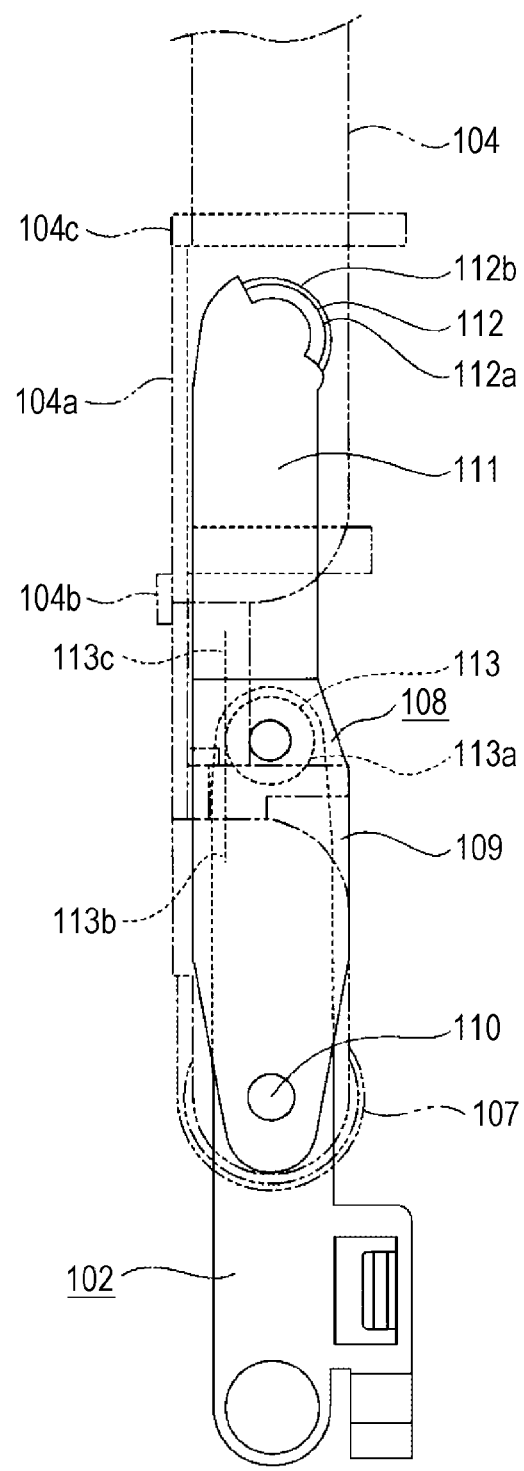
FIG. 35 is a schematic enlarged plan view illustrating a state of a pressing roller and so forth being stored in a storage.
Figure 36:
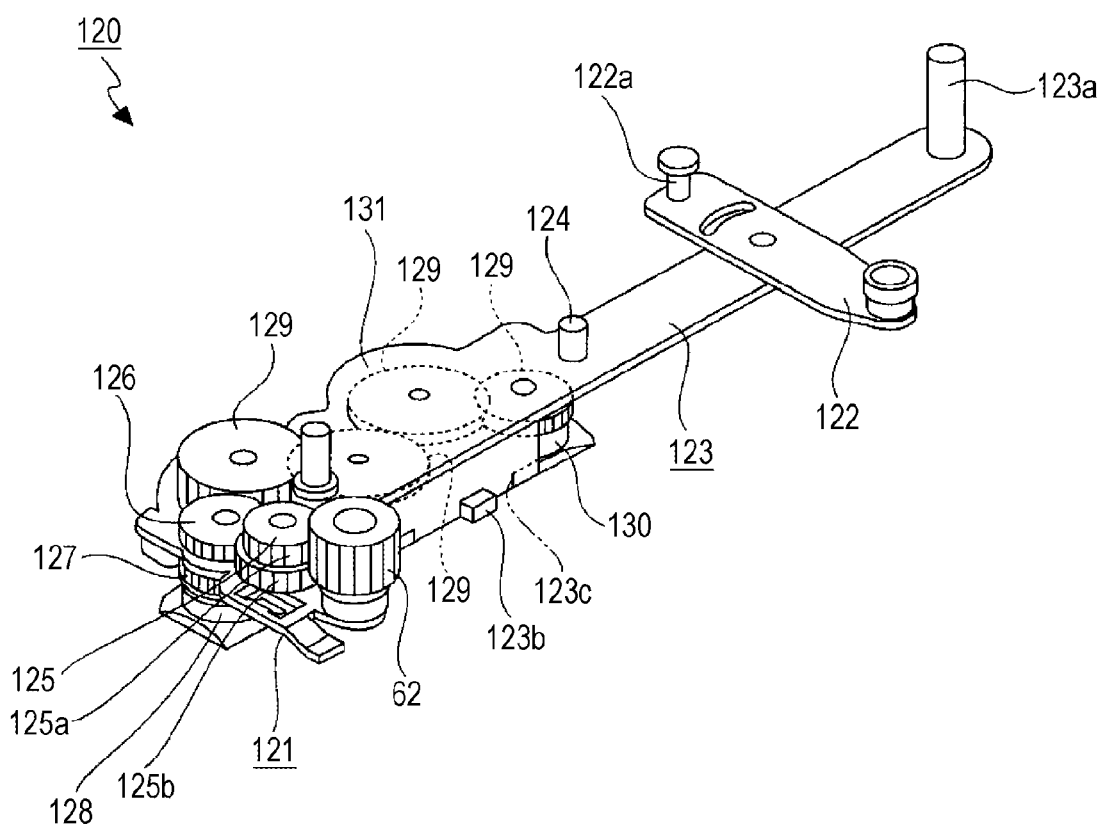
FIG. 36 is a perspective view illustrating a second link mechanism.

In a state wherein the ejecting lever 108 is supported by the first front side link arm 102, a biasing spring 113 is supported between the first front side link arm 102 and the ejecting lever 108 (see FIG. 34). The biasing spring 113 is a torsion coil spring, wherein the coil portion 113a is supported by the sleeve 106, one edge portion 113b is engaged with the other edge portion of the first front side link arm 102, and the other edge portion 113c is inserted and engaged between the connecting portion 109c of the first front side link arm 102 and the one edge portion of the ejecting lever 108. Accordingly, the biasing spring 113 applies turning force in the counterclockwise direction as seen from above as to the first front side link arm 102 to the ejecting lever 108, while applying moving force upward.

In a state wherein the first front side link arm 102 is supported by the base chassis 40, the cam engaging portion 110 of the ejecting lever 108 is inserted from below into the operating cam portion 43 of the base chassis 40, and is slidably engaged (see FIG. 8).

Figure 32:
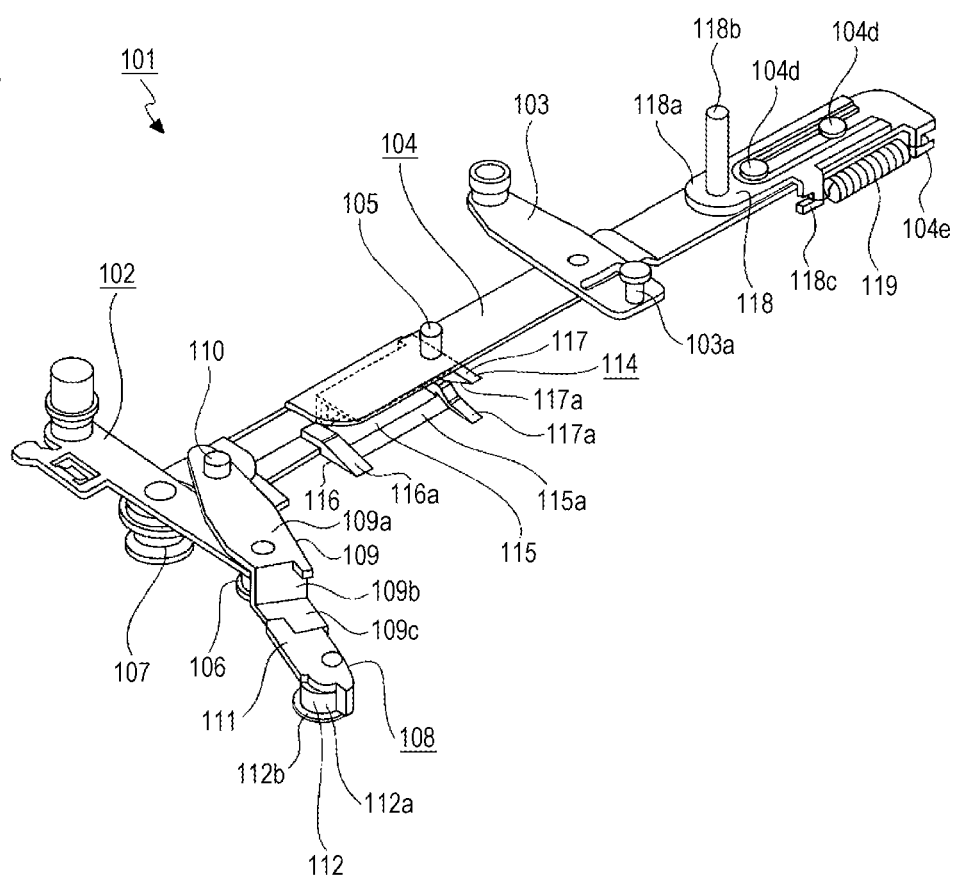
FIG. 32 is a perspective view illustrating a first link mechanism and storage.
Figure 33:
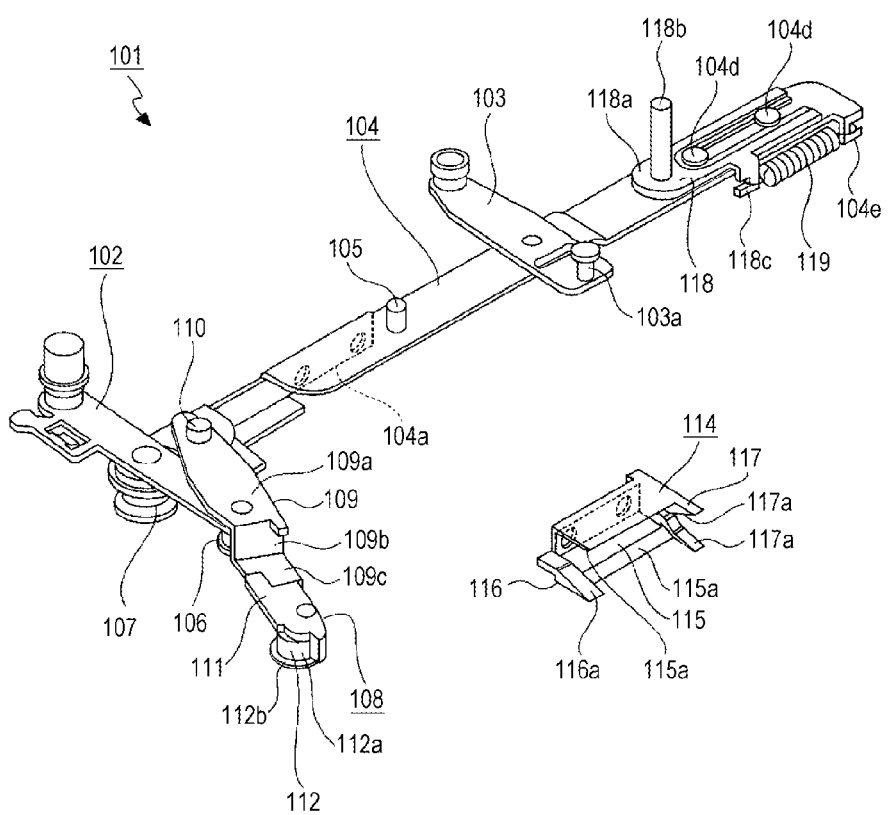
FIG. 33 is a perspective view separately illustrating the first link mechanism and storage.

The first rear side link arm 103 is formed as a plate extending in one direction facing the up/down direction, and is turnably supported by the left edge portion in the center portion in the front/back direction of the base chassis 40. A connecting shaft portion 103a that protrudes upward is provided to the edge portion on the opposite side from the turning fulcrum of the first rear side link arm 103 (FIGS. 32 and 33). In a state wherein the first rear side link arm 103 is supported by the base chassis 40, the connecting shaft portion 103a is inserted from below into the first shaft moving hole 45 on the left side of the base chassis 40, is inserted into the engaging hole 67b formed on the first interlocking lever 67 on the left side, and is slidably engaged. Accordingly, the first interlocking lever 67 is operated synchronously with the operation of the first rear side link arm 103.

The first rail 104 is turnably connected to the first front side link arm 102 and the first rear side link arm 103. The first rail 104 extends front to back, and is moved in the left/right direction so as to be extended facing the front/back direction, according to the turning operation of the first front side link arm 102 and first rear side link arm 103. The front edge portion and the roughly center portion in the front/back direction of the first rail 104 is turnably connected to the first front side link arm 102 and the first rear side link arm 103.

A fixed roller 107 that is supported by the first front side link arm 102 is positioned on the lower face side on the front edge portion of the first rail 104.

A member attaching portion 104a that faces the right is provided in a position near the front edge of the first rail 104. A first stopper engaging piece 104b that protrudes to the left on the lower edge portion in the front edge portion of the member attaching portion 104a is provided to the first rail 104 (see FIG. 35). Also, the outer face on the lower edge portion in the rear edge portion of the member attaching portion 104a is formed as a second stopper engaging piece 104c.

An inserting pin 105 that protrudes upward is provided to the front edge side of the first rail 104 (see FIGS. 32 and 33). Supporting pins 104d that protrude upward are provided in a manner separated front to back in positions near the rear edge of the first rail 104. A spring hooking protrusion 104e that protrudes toward the right is provided to the rear edge portion of the first rail 104.

A storage 114 is attached by screws or the like to the member attaching portion 104a of the first rail 104. The storage 114 is made up of a storage portion 115 that is shaped in a sideways U-shape opening to the left, a front side guiding portion 116 provided so as to be connected to the front side of the lower edge portion of the storage portion 115, and a rear side guiding portion 117 provided so as to be connected to the rear side of the storage portion 115.

A pair of sloping faces that mutually separate farther to the right are formed on the right edge portion of the storage portion 115, in a manner separated up and down, and the pair of sloping faces herein are formed as lever guiding faces 115a.

A front side disc guiding face 116a that slopes so as to be displaced downward farther to the right is formed on the right edge portion of the front side guiding portion 116.

Rear side disc guiding faces 117a that slope so as to mutually separate farther to the right are formed on the right edge portion of the rear side guiding portion 117, in a manner separated up and down.

A limit lever 118 is movably supported in the front/back direction on the supporting pins 104d of the first rail 104. The limit lever 118 is made up of a supported plate portion 118a that faces the up/down direction, a slave shaft 118b that protrudes upward from the front edge portion of the supported plate portion 118a, and a spring hooking piece 118c that protrudes downward from the right edge portion of the supported plate portion 118a.

A tension spring 119 is supported between the spring hooking piece 118c of the limit lever 118 and the spring hooking protrusion 104e of the first rail 104, and the limit lever is biased towards the rear as to the first rail 104.

In a state wherein the first rail 104 is supported by the first front side link arm 102 and the first rear side link arm 103, the slave shaft 118b of the limit lever 118 is inserted from below into the second shaft moving hole 46 on the left side of the base chassis 40 and is inserted into the cam hole 76 of the first main slider 73 and the cam action hole 80 of the sub slider 79.

Second Link Mechanism, Etc.

A second link mechanism 120 is supported by the lower face side of the base chassis 40 (see FIG. 8). The second link mechanism 120 has a second front side link arm 121, second rear side link arm 122, and second rail 123 (see FIG. 36).

The second front side link arm 121 is formed as a plate extending in one direction facing the up/down direction, and one edge portion in the lengthwise direction is turnably supported by the lower right corner of the base chassis 40. The turning fulcrum of the second front side link arm 121 is formed in a position shifted somewhat to the rear side as to the turning fulcrum of the route adjuster 31 that is supported by the adjuster supporting portion 30 on the right side of the base plate 25.

A third transmitting gear 62 that is supported by the base chassis 40 is connected to an edge portion of the second front side link arm 121, and the third transmitting gear 62 is rotated as to the second front side link arm 121.

A two-speed gear 125 is supported in the central portion in the lengthwise direction of the second front side link arm 121. The gear portion 125a on the upper side of the two-speed gear 125 is meshed with the third transmitting gear 62.

Feeding gears 126 and 127 having the shaft portions linked together are each supported on the upper face side and lower face side of the other edge portion in the lengthwise direction of the second front side link arm 121. The feeding gear 126 is meshed with the gear portion 125b on the lower side of the two-speed gear 125. A driving roller 128 is connected to the lower edge portion of the axis portions of the feeding gears 126 and 127. The periphery portion of the driving roller 128 is made of a highly adhesive material that can be elastically deformed, such as rubber or the like.

As described above, upon the driving motor 52 being rotated while in a state wherein the second transmitting gear 61 is meshed with the switching gear 60, the driving force thereof is transmitted in sequence to the worm 54, worm gear 55, first transmitting gear 59, switching gear 60, and third transmitting gear 62 via the second transmitting gear 61. The driving force transmitted to the third transmitting gear 62 is transmitted in sequence to the two-speed gear 125, feeding gear 126, and feeding gear 127, and the driving roller 128 is rotated.

In a state wherein the second front side link arm 121 is supported by the base chassis 40, the gear portion 125a on the upper side of the two-speed gear 125 is inserted from below into the gear moving hole 44 of the base chassis 40.

The second rear side link arm 122 is formed as a plate extending in one direction facing the up/down direction, and is turnably supported by the right edge portion in the center portion in the front/back direction of the base chassis 40. A connecting shaft portion 122*a* protruding upward is provided to the edge portion on the opposite side from the turning fulcrum of the second rear side link arm 122. In a state wherein the link arm 122 is supported by the base chassis 40, the connecting shaft portion 122*a* is inserted from below into the first shaft moving hole 45 on the right side of the base chassis 40, is inserted into the engaging hole 68*b* formed on the second interlocking lever 68 on the right side, and is slidably engaged. Accordingly, the second interlocking lever 68 is operated synchronously with the operation of the second rear side link arm 122.

The second rail 123 is turnably connected to the second front side link arm 121 and the second rear side link arm 122. The second rail 123 extends front to back, and is moved in the left/right direction so as to be extended facing the front/back direction, according to the turning operation of the second front side link arm 121 and second rear side link arm 122. Accordingly, the first rail 104 and second rail 123 are moved in the left/right direction in a constantly parallel state.

The second rail 123 is shorter in the front/back direction than the first rail 104, and the front edge portion and a portion near the rear edge are turnably connected to the second front side link arm 121 and second rear side link arm 122, respectively.

A slave shaft 123*a* that protrudes upward is provided to the rear edge portion of the second rail 123. A first stopper engaging piece 123*b* protruding to the right is provided in a position near the front edge of the second rail 123. Also, the outer face on the rear side of the first stopper engaging piece 123*b* is formed as a second stopper engaging piece 123*c*.

An inserting pin 124 that protrudes upward is provided to the front edge side of the second rail 123.

Feeding flat gears 129 that sequentially mesh are supported by the front half portion of the second rail 123. The feeding flat gear 129 that is positioned at the front-most side is meshed with the feeding gear 126. The feeding flat gear 129 that is positioned at the rear-most side is connected to a rotating roller 130 on the same axis thereof.

Accordingly, the driving force of the driving motor 52 transmitted to the feeding gear 126 is transmitted to the rotating roller 130 via the feeding flat gears 129 and the rotating roller 130 is rotated, in sequence. The rotating roller 130 is synchronized with the driving roller 128 and rotated in the same direction.

The feeding gear 126 and flat gears 129 are covered from the lower face side by a gear cover 131.

Figure 19:
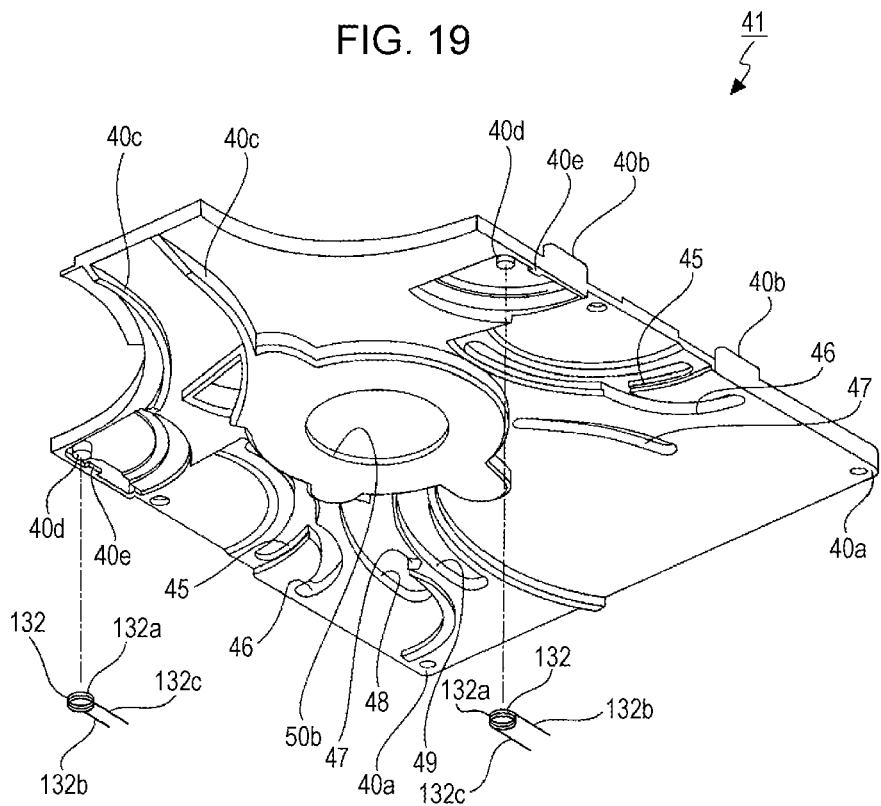
FIG. 19 is a perspective view of a floor side of a first base of the base chassis and a spring member.

The first rail 104 of the first link mechanism 101 and the second rail 123 of the second link mechanism are each biased in the direction of nearing one another in the left/right direction by spring members 132 (see FIG. 19).

The spring member 132 are coil springs, and the coil portions 132*a* are each supported by a spring supporting shaft 40*d* of the base chassis 40, the one edge portions 132*b* are each engaged with the spring pressing portions 40*e* of the base chassis 40, and the other edge portions 132*c* are each engaged with the first rail 104 and second rail 123.

In a state wherein the second rail 123 is supported by the second front side link arm 121 and second side link arm 122, the slave shaft 123*a* of the second rail 123 is inserted from below into the second shaft moving hole 46 on the right side of the base chassis 40 and is inserted into the cam hole 88 on the second main slider 85.

Also, as described above, the first interlocking lever 67 and second interlocking lever 68 have the connecting shaft 67*a* slidably engaged with the connecting hole 68*a*, the first rear side link arm 103 has the connecting shaft portion 103*a* slidably engaged with the connecting hole 67*b* of the first interlocking lever 67, and the second rear side link arm 122 has the connecting shaft portion 122*a* slidably engaged with the engaging hole 68*b* of the second interlocking lever 68.

Accordingly, the first rail 104 supported by the first front side link arm 102 and first rear side link arm 103 and the second rail 123 supported by the second front side link arm 121 and second rear side link arm 122 are connected via the first interlocking lever 67 and second interlocking lever 68, and move in parallel in the left/right direction toward the direction of mutually separating.

Operation of Disc Conveying Device

The conveying operation as to the disc-shaped recording medium 200 of the disc conveying device 19 will be described (FIGS. 37 through 75).

The disc conveying device 19 starts operation from an initial state before loading the disc-shaped storage medium 200, the disc-shaped storage medium 200 that is removed from the disc cartridge is conveyed in a lead-in direction (toward the rear) to a chucking position with a loading operation, the disc-shaped storage medium 200 is chucked in a chucking position and recording or playing of the information signals recorded on the disc-shaped storage medium 200 is performed. Upon the recording or playing of the information signals recorded on the disc-shaped storage medium 200 ending, the chucking as to the disc-shaped storage medium 200 is disengaged, the disc-shaped storage medium 200 is conveyed from the chucking position to the ejecting direction (toward the front) by an ejecting operation and stored in the disc cartridge 1, and the disc conveying device 19 is returned to the initial state after storing the disc-shaped storage medium 200 in the disc cartridge 1.

In the loading operation and ejecting operation, the disc-shaped storage medium 200 is conveyed by a fixed roller 107, pressing roller 112, driving roller 128, and rotating roller 130, and the fixed roller 107, pressing roller 112, driving roller 128, and rotating roller 130 herein function as conveying rollers.

Initial State

Figure 37:
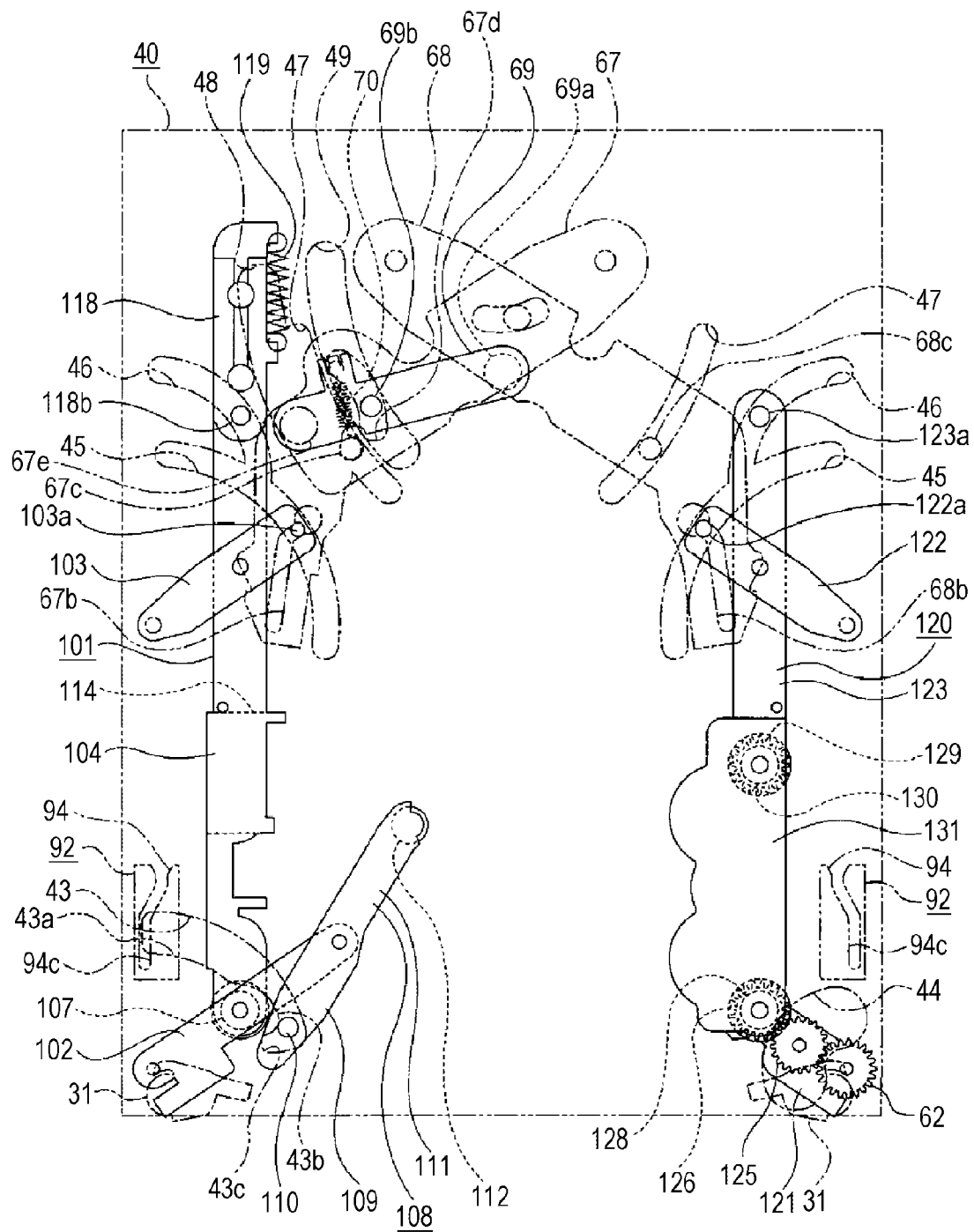
FIG. 37 is a schematic plan view illustrating an initial state of the link mechanism and so forth, and illustrates the operations of the disc conveying device together with FIGS. 38 through 75.
Figure 38:
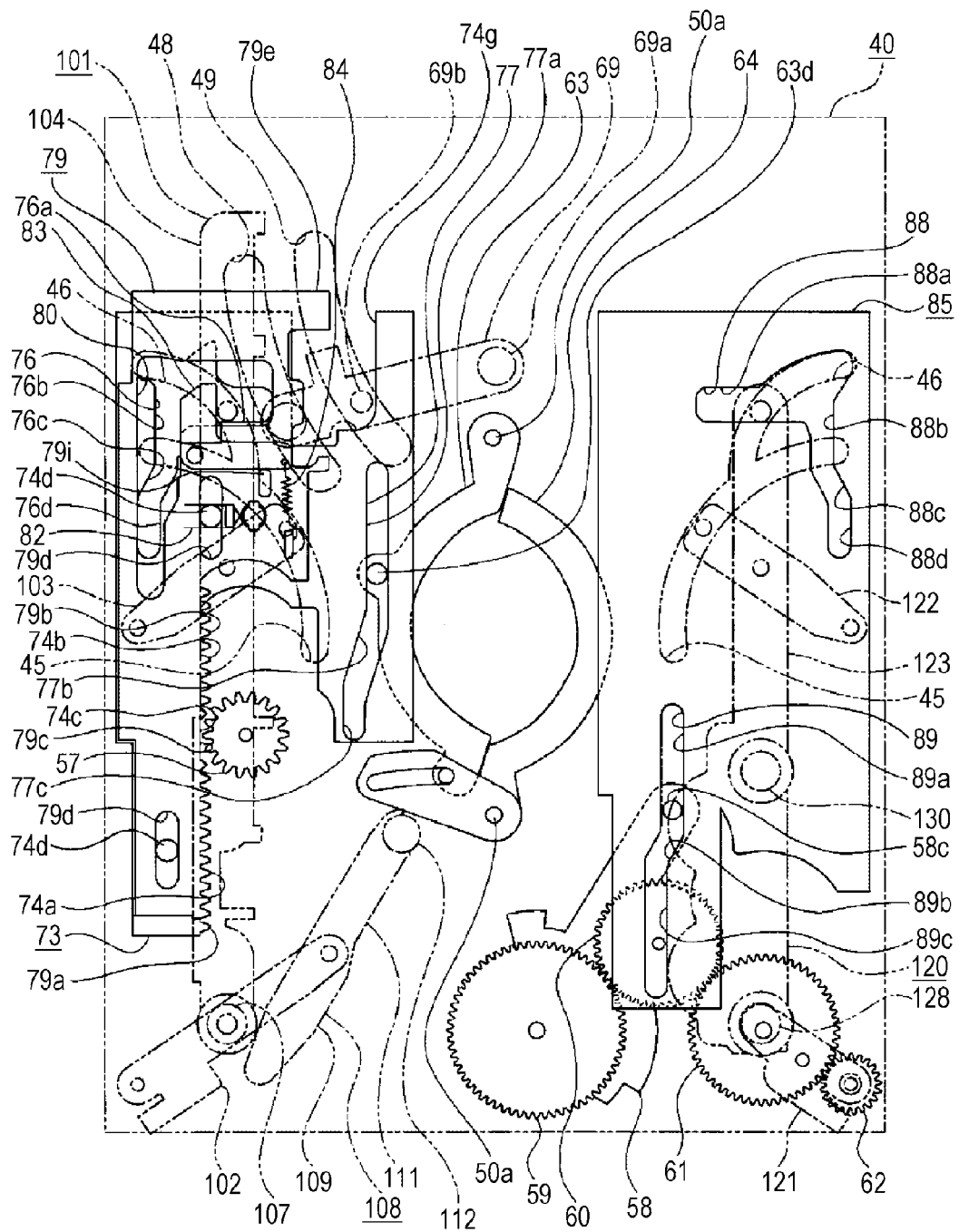
FIG. 38 is a schematic plan view illustrating an initial state of the slider and so forth.
Figure 39:
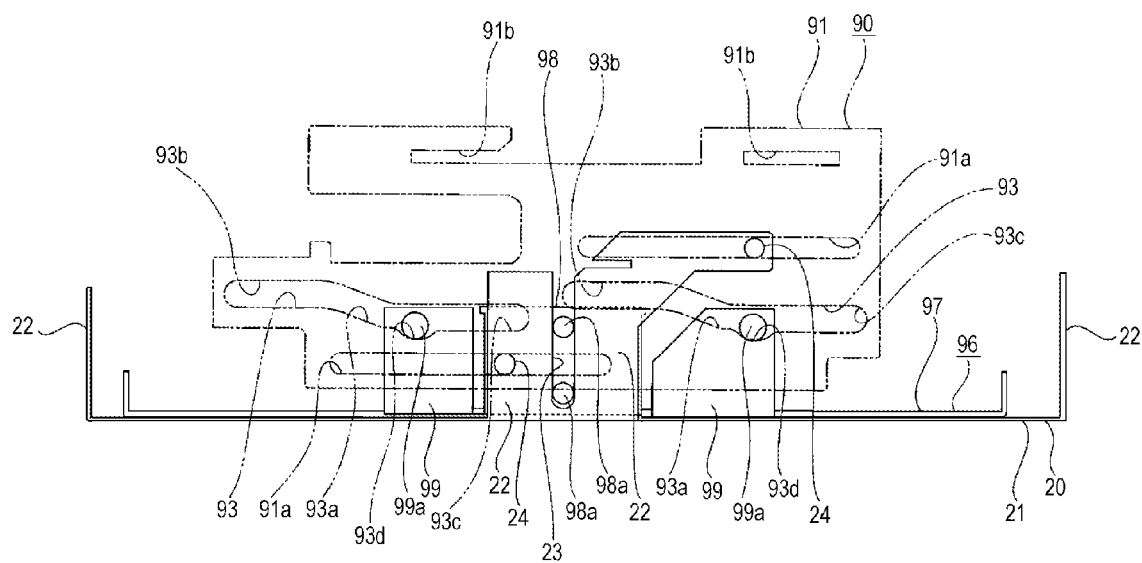
FIG. 39 is a schematic side view illustrating an initial state of the unit plate and so forth.

First, the initial state of the various parts will be described (see FIGS. 37 through 39). In the initial state, the route adjusters 31 are held in a neutral position by returning springs 39.

The neutral position of the route adjuster 31 positioned on the left side is a position held wherein the positioning protrusion 34 extends in the direction facing the right, and the neutral position of the route adjuster 31 positioned on the right side is a position held wherein the positioning protrusion 34 extends in the direction facing the left.

In the initial state, the driving motor 52 is not rotating, and the driving gear 57 and driving roller 128 are not rotating.

In the initial state, the first main slider 73 is in a non-meshed state wherein neither the first main rack portion 74*a* or the second main rack portion 74*b* are meshed with the driving gear 57, and the non-rack portion 74*c* is in a position facing the driving gear 57.

In the initial state, the sub slider 79 has the non-rack portion 79*c* positioned directly above the non-rack portion 74*c*, the non-rack portion 79*c* is in a non-meshed position that is a position facing the driving gear 57, and neither the first sub rack portion 79*a* nor the second sub rack portion 79*b* are meshed with the driving gear 57. At this time the support pins 74d of the first main slider 73 are each positioned in the center portion in the front/back direction of the supported holes 79d of the sub slider 79.

The locking lever 78 that is attached to the first main slider 73 is in a state of being connected to the opening edge of the inserting portion 81a of the lever inserting hole 81, and the sub slider 79 is not locked as to the first main slider 73.

The second main slider 85 is held in the center of the moving range according to the position of the first main slider 73.

When the first main slider 73 is in the initial state, the slave shaft 118b of the limit lever 118 supported by the first rail 104 is in a state of touching the front side opening edge of the waiting portion 76a on the cam hole 76. Also, at this time, the slave shaft 123a of the second rail 123 is in a state of touching the front side opening edge of the waiting portion 88a on the cam hole 88 of the second main slider 85.

In the initial state, the first front side link arm 102, first rear side link arm 103, second front side link arm 121, and second rear side link arm 122 are in a sloped state inwards, and the ejecting lever 108 is also in a sloped state inwards. Accordingly, the roller supporting face portion 111 of the ejecting lever 108 and the pressing roller 112 are in a state of being pulled out from the storage 114 towards the right.

At this time, the distance between the fixed roller 107 supported by the first front side link arm 102 and the driving roller 128 supported by the second front side rink arm 121 is smaller than the diameter of the disc-shaped recording medium 200.

When the first main slider 73 is in the initial state, the slave pin 63d of the first pulley holder 63 is engaged with the rear side portion 77a of the cam supporting hole 77 of the first main slider 73. Accordingly, the holding portions 63a and 64a of the first pulley holder 63 and second pulley holder 64 are in holding positions that are positioned on the lower side of the chucking pulley 66, and the chucking pulley 66 is held in a state of being held up upwards by the holding portions 63a and 64a.

When the second main slider 85 is in the initial state, the sliding pin 58c of the gear supporting plate 58 is engaged with the rear side sliding portion 89a of the cam sliding hole 89 of the second main slider 85. Accordingly, the gear supporting plate 58 is in a state wherein the switching gear 60 is turned in the direction nearing the transmitting gear 61, the switching gear 60 is meshed with the second transmitting gear 61, whereby the driving force of the driving motor 52 can be transmitted to the driving roller 128.

When the sub slider 79 is in an initial state, the second portion 83b of the action lever 83 that is biased toward the front by the tension coil spring 84 is pressed to the turn restricting protrusion 79i and held at the turning edge in the clockwise direction as seen from a plane view. At this time, the action shaft 69b of the starting lever 69 that is turnably supported by the first interlocking lever 67 is positioned further toward the front than the action protrusion 79e of the sub slider 79.

The sub sliders 90 are connected to the first main slider 73 and second main slider 85, and are held in positions according to the moving positions of the first main slider 73 and second main slider 85. At this time the unit plate 96 which is biased downward by the springs 100 is engaged in a state wherein the guide receiving pins 99a of the second side face portions 99 are pressed to the holding recesses 93d of the elevator cam holes 93. Accordingly, the unit plate 96 and the base unit disposed on the unit plate 96 are held at the lower moving edge.

The guide receiving pins 99a of the unit plate 96 are pressed to the holding recesses 93d of the elevator cam holes 93 with the biasing force of the springs 100, whereby positioning accuracy in the up/down direction of the unit plate 96 and base unit is improved.

Loading Operation

Upon the disc-shaped recording medium 200 being removed from the disc cartridge 1 to the rear (lead-in direction) by an unshown removing mechanism, loading operations such as described below are performed by the disc conveying device (see FIGS. 40 through 55).

Figure 40:
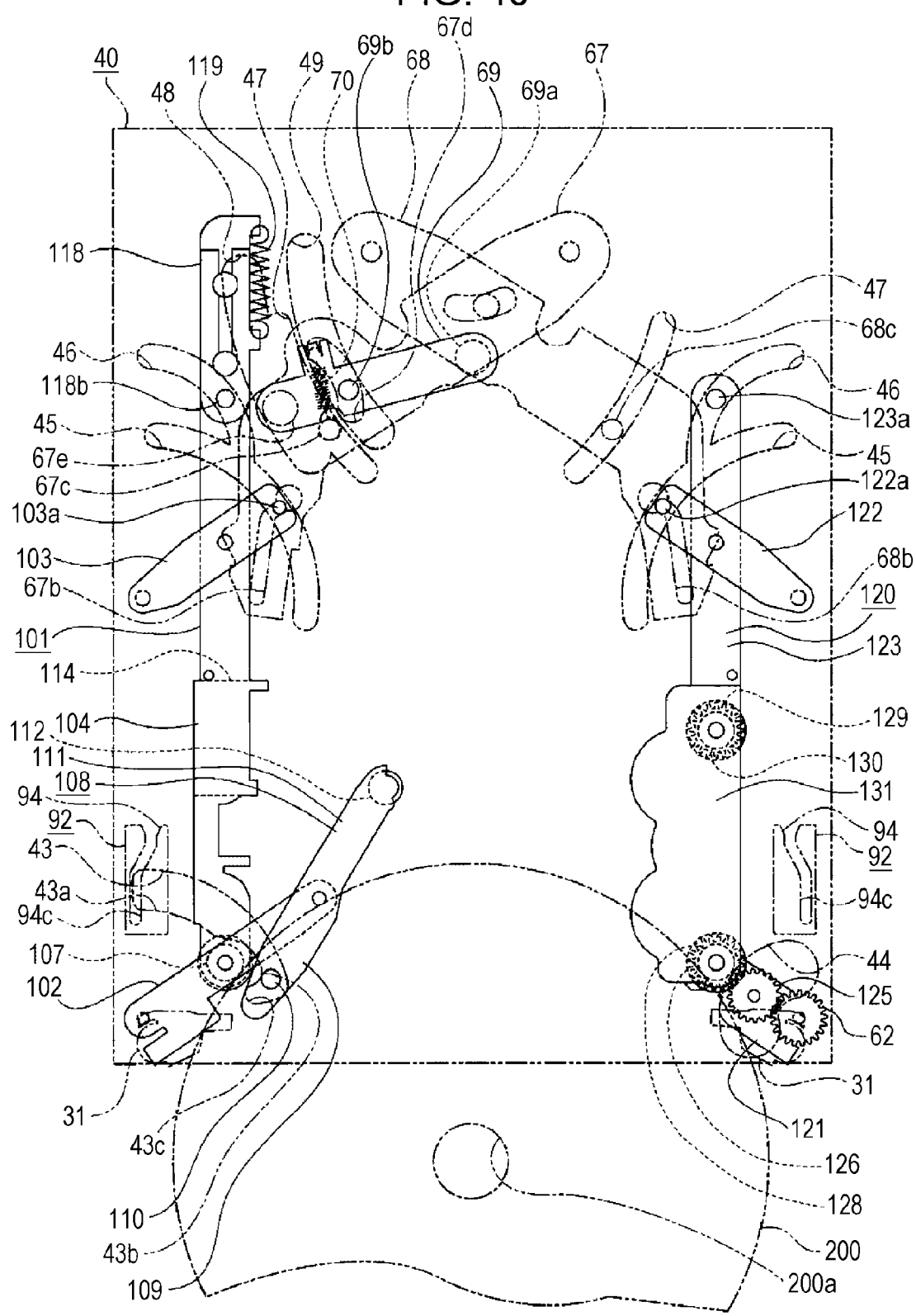
FIG. 40 is a schematic plan view illustrating a state wherein a loading operation is started, and the disc-shaped recording medium is conveyed towards a chucking position.

Upon the disc-shaped recording medium 200 being removed from the disc cartridge 1, the peripheral face of the disc-shaped recording medium 200 touches the route adjusters 31, and the route adjuster 31 are pressed toward the rear by the disc-shaped recording medium 200 (see FIG. 40). Positioning grooves 37 are formed on the route adjusters 31, and the peripheral portion of the disc-shaped recording medium 200 is guided by the guiding faces 37a and is inserted into the positioning grooves 37.

The route adjusters 31 pressed by the disc-shaped recording medium 200 are turned counter to the biasing force of the return springs 39, each in the state of positioning the disc-shaped recording medium 200.

The peripheral face of the disc-shaped recording medium 200 makes contact with the driving roller 128 and fixed roller 107. At this time the driving motor 52 is rotated by a detecting operation of the sensor 53a mounted on the sensor board 53, based on the insertion of the disc-shaped recording medium 200. Upon the driving motor 52 being rotated, the driving force thereof is transmitted to the driving gear 57 in sequence via the worm 54, worm gear 55, and transmitting gear group 56, and the driving gear 57 is reduced and rotated by the transmitting gear group 56. Also, the driving force of the driving motor 52 is transmitted in sequence to the worm 54, worm gear 55, first transmitting gear 59, switching gear 60, second transmitting gear 61, third transmitting gear 62, two-speed gear 125, feeding gear 126, and feeding gear 127, whereby the driving roller 128 is rotated. At this time the driving force of the driving motor 52 is also transmitted to the rotating roller 130 via the flat gears 129 from the feeding gear 126, and the rotating roller 130 is synchronized with the driving roller 128 and rotated in the same direction.

The first main slider 73 and sub slider 79 are in non-meshed positions with one another even when the driving gear 57 is rotated, so the first main slider 73, sub slider 79, and second main slider 85 are not moved.

Figure 41:
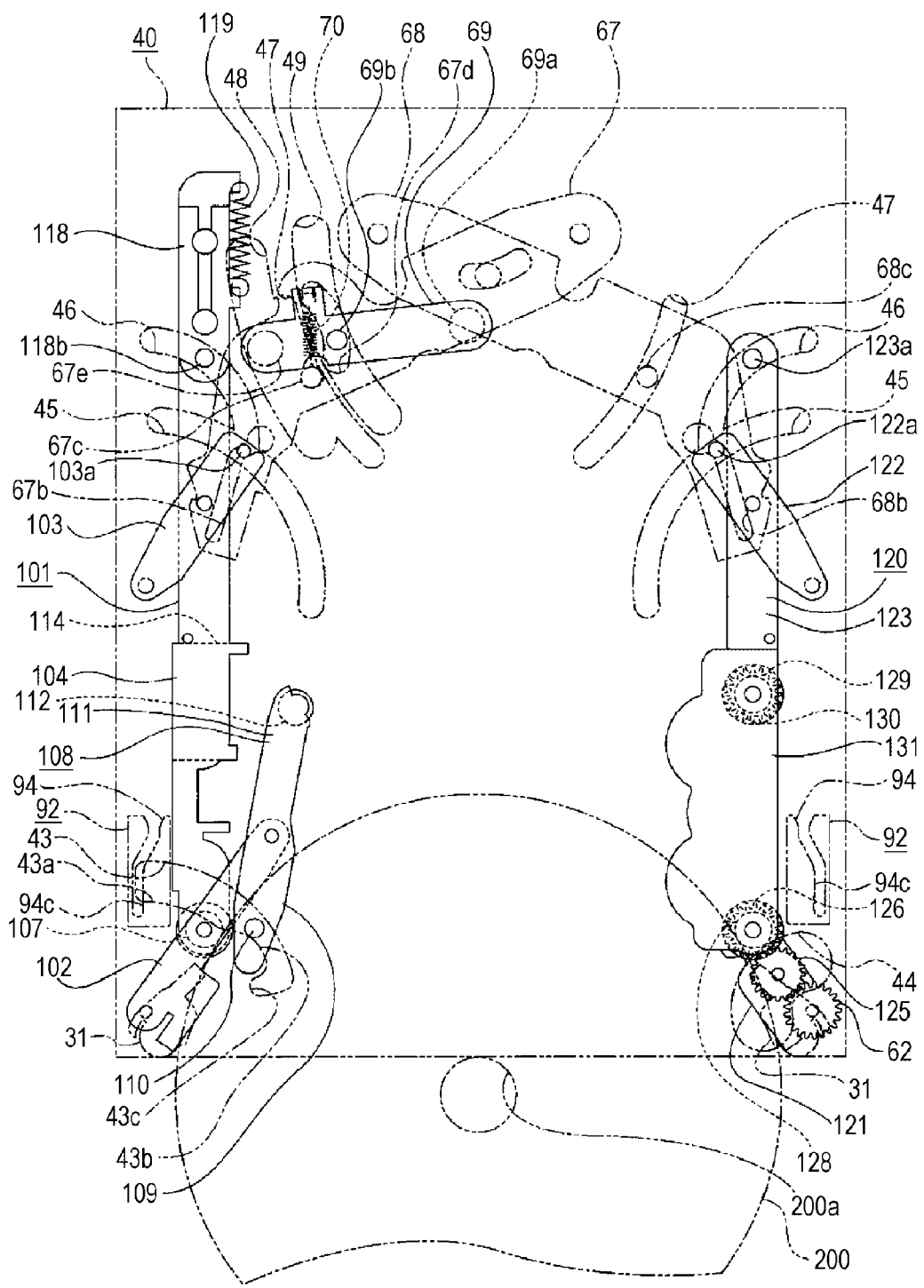
FIG. 41 is a schematic plan view illustrating a state wherein the disc-shaped recording medium continues to be conveyed towards a chucking position.

Upon the driving roller 128 being rotated, the disc-shaped recording medium 200 is conveyed toward the back by the driving roller 128 and fixed roller 107 (see FIG. 41).

When the disc-shaped recording medium 200 is conveyed toward the rear, the route adjusters 31 are further turned counter to the biasing force of the return springs 39, in a state of having positioned the disc-shaped recording medium 200.

As the disc-shaped recording medium 200 is conveyed toward the rear, the first rail 104 and second rail 123 are moved in parallel so as to mutually separate, and the first front side link arm 102, first rear side link arm 103, second front side link arm 121, and second rear side link arm 122 are also turned outwards. At this time the ejecting lever 108 is also turned outwards together with the turning operation of the first front side link arm 102.

Also, the first interlocking lever 67 and second interlocking lever 68 are each turned in the predetermined direction according to the turning operation of the first front side link arm 102 and second front side link arm 121.

As the first rail 104 is moved, the slave shaft 118b of the limit lever 118 is moved along the second shaft moving hole 46 on the left side of the base chassis 40.

When the ejecting lever 108 is turned together with the turning operation of the first front side link arm 102, the cam engaging portion 110 of the ejecting lever 108 is slidably moved by the operating cam portion 43 of the base chassis 40.

When the first rear side link arm 103 is turned, the connecting shaft portion 103a is moved along the first shaft moving hole 45 on the left side of the base chassis 40 and the engaging hole 67b formed on the first interlocking lever 67.

When the second rail 123 is moved, the slave shaft 123a is moved along the second shaft moving hole 46 on the right side of the base chassis 40.

When the second front side link arm 121 is turned, the gear portion 125a on the upper side of the two-speed gear 125 supported by the link arm 121 is moved along the gear moving hole 44 of the base chassis 40.

When the second rear side link arm 122 is turned, the connecting shaft portion 122a is moved along the first shaft moving hole 45 on the right side of the base chassis 40 and the engaging hole 68b formed on the second interlocking lever 68.

When the first interlocking lever 67 and second interlocking lever 68 are turned, the disc holding pins 67c and 68c are moved along the pin moving holes 47 of the base chassis 40. At this time, the supporting shaft 67e of the first interlocking lever 67 moves along the connecting portion moving hole 48 of the base chassis 40, and the action shaft 69b of the starting lever 69b move along the action shaft moving hole 49 of the base chassis 40 and the shaft inserting hole 67d of the first interlocking lever 67.

When the disc-shaped recording medium 200 is conveyed toward the rear, the first rail 104 and second rail 123 are moved in parallel, counter to the biasing force of the spring members 132. Accordingly, the driving roller 128 and fixed roller 107 are pressed against the peripheral face of the disc-shaped recording medium 200 by the biasing force of the spring members 132, and friction between the peripheral face of the disc-shaped recording medium 200 and the driving roller 128 and fixed roller 107 increases, whereby the disc-shaped recording medium 200 can be securely conveyed.

The disc-shaped recording medium 200 is further conveyed toward the rear by the driving roller 128 and fixed roller 107.

When the disc-shaped recording medium 200 is conveyed further toward the rear, the route adjusters 31 are turned counter to the biasing force of the return springs 39 while in a state of having positioned the disc-shaped recording medium 200.

Figure 42:
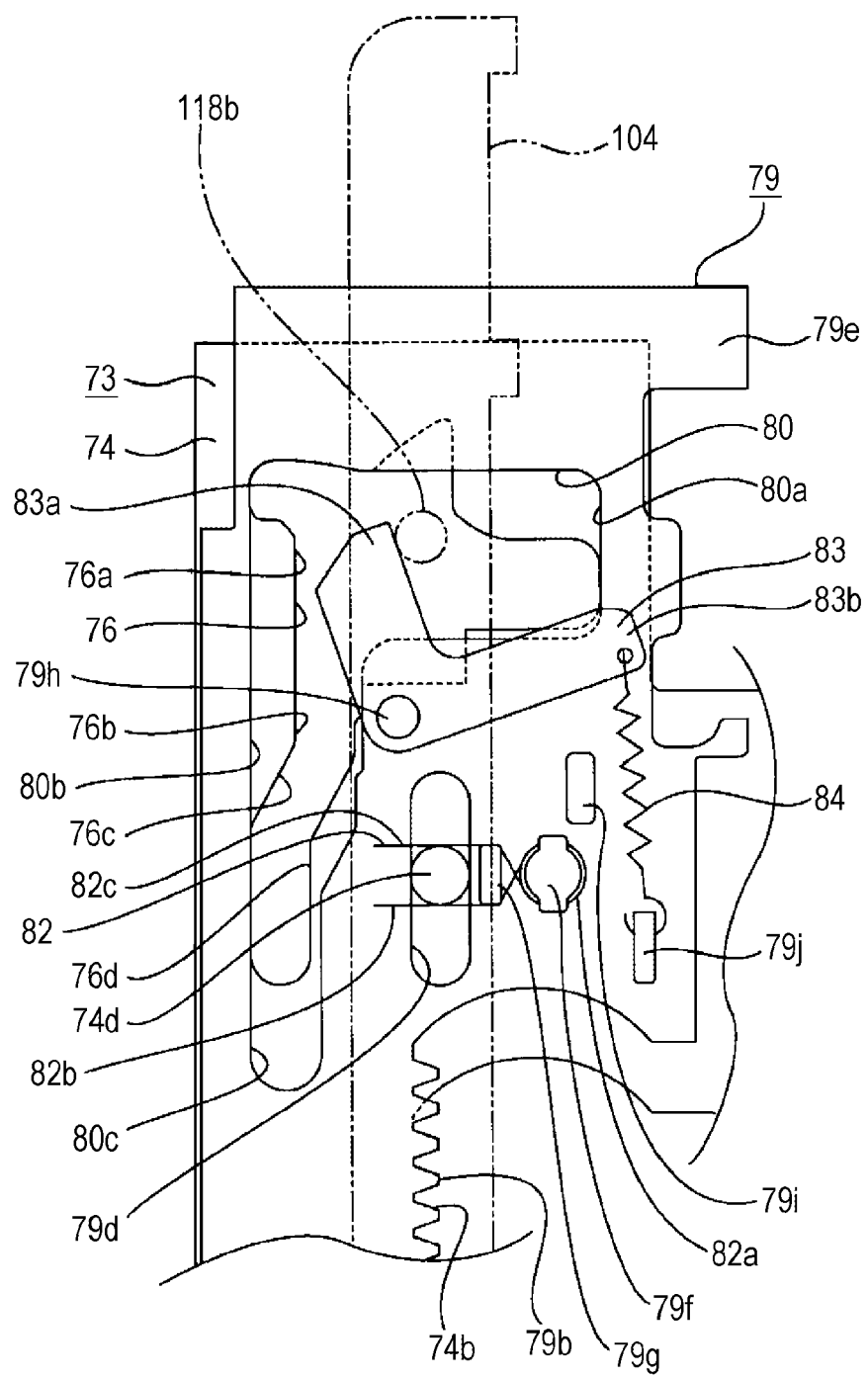
FIG. 42 is a schematic enlarged plan view illustrating a state wherein an operating lever is pressed and turned by a slave shaft of a limit lever.

When the disc-shaped recording medium 200 is conveyed further toward the rear, the first rail 104 and second rail 123 are further moved in parallel so as to mutually separate, whereby the first portion 83a of the action lever 83 supported by the sub slider 79 is pressed towards the left by the slave shaft 118b of the limit lever 118 (see FIG. 42). Accordingly, the action lever 83 turns in the counter-clockwise direction as seen from a plane, counter to the biasing force of the tension coil spring 84. The first rail 104 and second rail 123 continue to move in parallel so as to mutually separate, whereby the slave shaft 118b of the limit lever 118 is moved towards the left so as to cross over, from the upper side, the first portion 83a of the action lever 83, and action lever 83 is turned in the clockwise direction as seen from a plane by the biasing force of the tension coil spring 84, and the second portion 83b is returned to the original position which touches the turn restricting protrusion 79i from behind. The slave shaft 118b of the limit lever 118 is further moved to the left according to the movement of the first rail 104, and is positioned near the left edge of the waiting portion 76a in the cam hole 76 of the first main slider 73.

Figure 43:
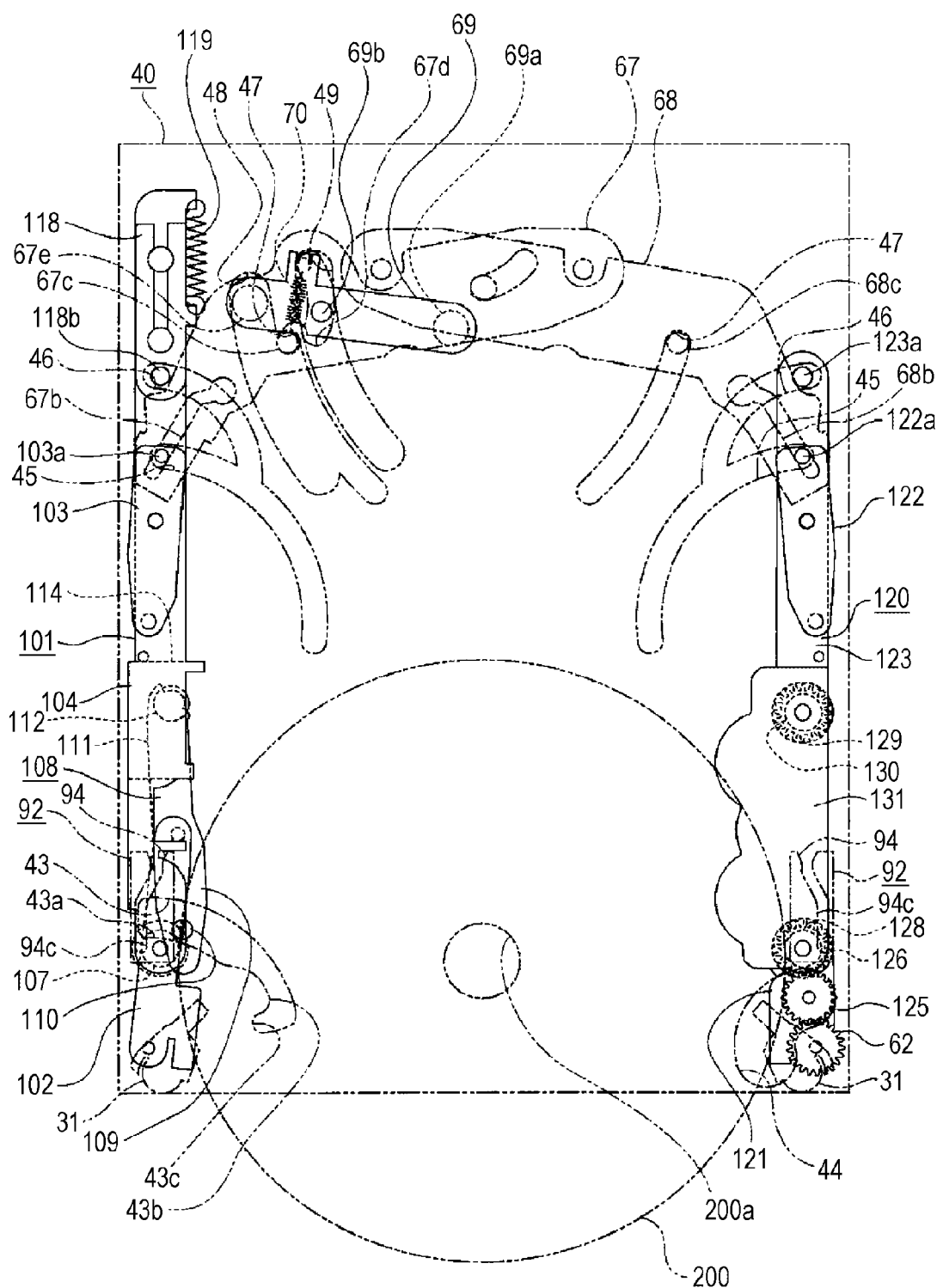
FIG. 43 is a schematic plan view illustrating a state wherein the disc-shaped recording medium continues to be conveyed towards a chucking position.

At this time, the first front side link arm 102, first rear side link arm 103, second front side link arm 121, and second rear side link arm 122 are further turned toward the outside (see FIG. 43). The first rail 104 and second rail 123 are further moved in parallel in a direction so as to mutually separate, and the center of the disc-shaped recording medium 200 is positioned on a line linking the first rail 104 and second rail 123, whereupon the first rail 104 and second rail 123 are widely separated and the first front side link arm 102, first rear side link arm 103, second front side link arm 121, and second rear side link arm 122 are in a state of extending roughly to the front and back.

At this time the first front side link arm 102, first rear side link arm 103, second front side link arm 121, or second rear side link arm 122 may be turned excessively, due to assembly margin-of-error or processing accuracy of the first rail 104, second rail 123, first front side link arm 102, first rear side link arm 103, second front side link arm 121, and second rear side link arm 122. Upon such excessive turning occurring, a portion of the first front side link arm 102, first rear side link arm 103, second front side link arm 121, or second rear side link arm 122 protrudes outside the first rail 104 or second rail 123, whereby force is applied toward the outside of the first rail 104 or second rail 123, and movement may not be smooth when moving inward.

Figure 44:
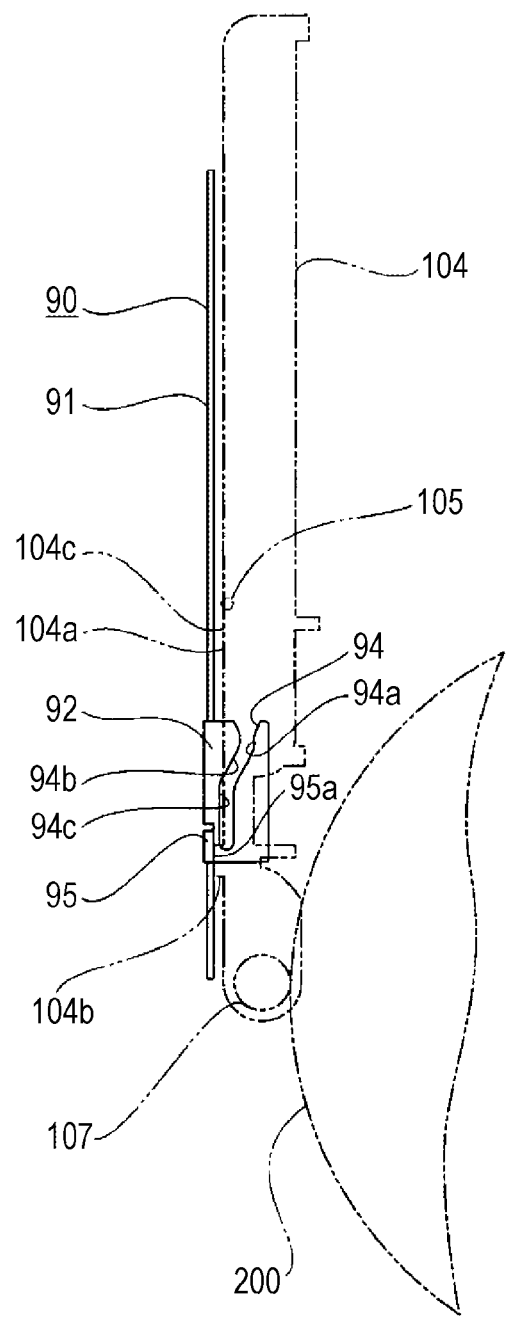
FIG. 44 is a schematic plan view illustrating a state wherein a stopper engaging piece of the first rail touches a stopper of the side slider during conveying of the disc-shaped recording medium.

Thus, with the disc conveying device 19, in a state wherein the center of the disc-shaped recording medium 200 is positioned on a line linking the driving roller 128 and fixed roller 107, and the first rail 104 and second rail 123 are widely separated, the first stopper engaging pieces 104b and 123b, provided to the first rail 104 and second rail 123, respectively, each touch the contact faces 95a of the stoppers 95 on the side sliders 90 (see FIG. 44).

Accordingly, movement of the first rail 104 and second rail 123 in directions to mutually separate is restricted, excessive turning of the first front side link arm 102, first rear side link arm 103, second front side link arm 121, and second rear side link arm 122 is restricted, and smooth movement operations of the first rail 104 and second rail 123 can be secured.

Also, the stoppers 95 are provided to the side sliders 90 positioned on the sides (outer sides) of the first rail 104 and second rail 123, whereby dedicated members to provide the stoppers 95 do not have to be made, and the number of parts can therefore be reduced.

Figure 45:
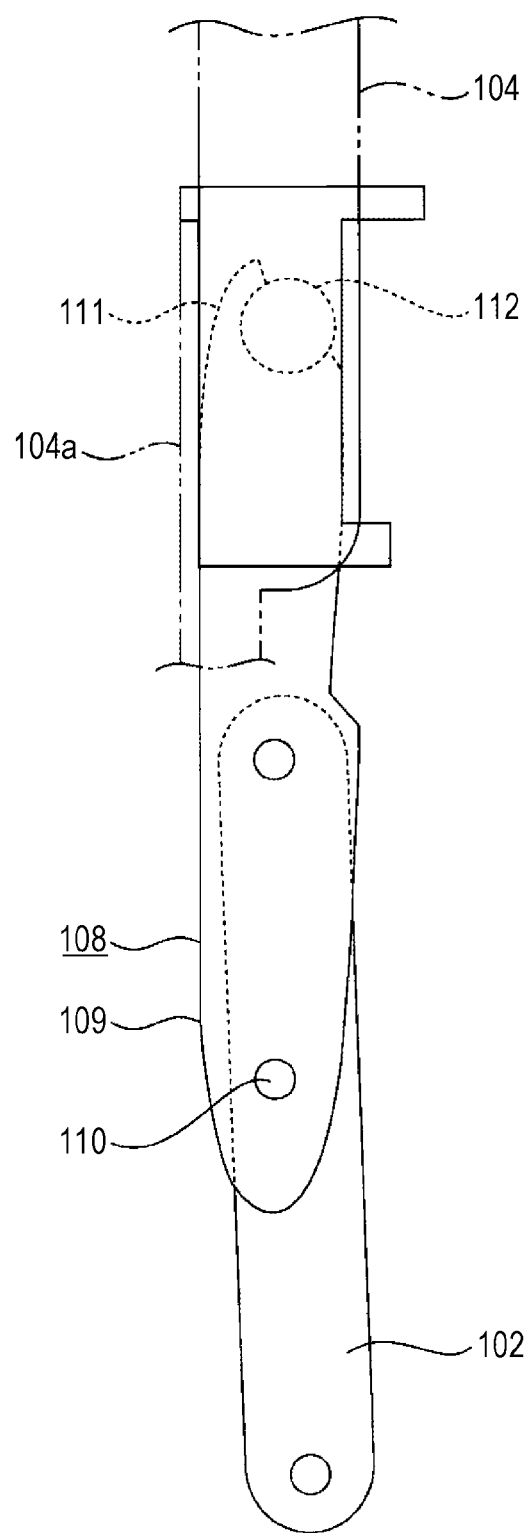
FIG. 45 is a schematic enlarged plan view illustrating a state wherein the ejecting lever is turned and the pressing roller and so forth are stored in the storage.

As described above, when in a state of the disc-shaped recording medium 200 being conveyed toward the rear by the driving roller 128 and fixing roller 107, and the first front side link arm 102 extended roughly front and back, the ejecting lever 108 is also further turned together with the first front side link arm 102, and the roller supporting face portion 111 and pressing roller 112 are stored in the storage portion 115 of the storage 114 (see FIG. 45). At this time the roller supporting face portion 111 and pressing roller 112 are guided by the lever guiding faces 115a and stored in the storage portion 115.

As described above, in the disc conveying device 19, the ejecting lever 108 is stored in the storage 114 at the time of conveying the disc-shaped recording medium 200, whereby the ejecting lever 108 does not obstruct the conveying operation of the disc-shaped recording medium 200, and the conveying operation of the disc-shaped recording medium 200 can be performed smoothly.

Also, the storage 114 is attached to the first rail 104, whereby a dedicated space for disposing the storage 114 does not have to be provided, so the disc conveying device 19 can be reduced in size due to the space reduction, and contact of the disc-shaped recording medium 200 and the storage 114 during conveying of the disc-shaped recording medium 200 can be suppressed.

As described above, a biasing spring 113 for the ejecting lever 108 to apply turning force (biasing force) as to the first front side link arm 102, in the counter-clockwise direction as seen from above, is provided between the first front side link arm 102 and ejecting lever 108.

Accordingly, when the ejecting lever 108 is stored in the storage 114, turning force is applied to the ejecting lever 108 in the direction of storing in the storage 114, whereby the ejecting lever 108 can be securely stored in the storage 114, while suppressing the ejecting lever 108 from unnecessarily exiting the storage 114 when a vibration or the like occurs.

Figure 46:
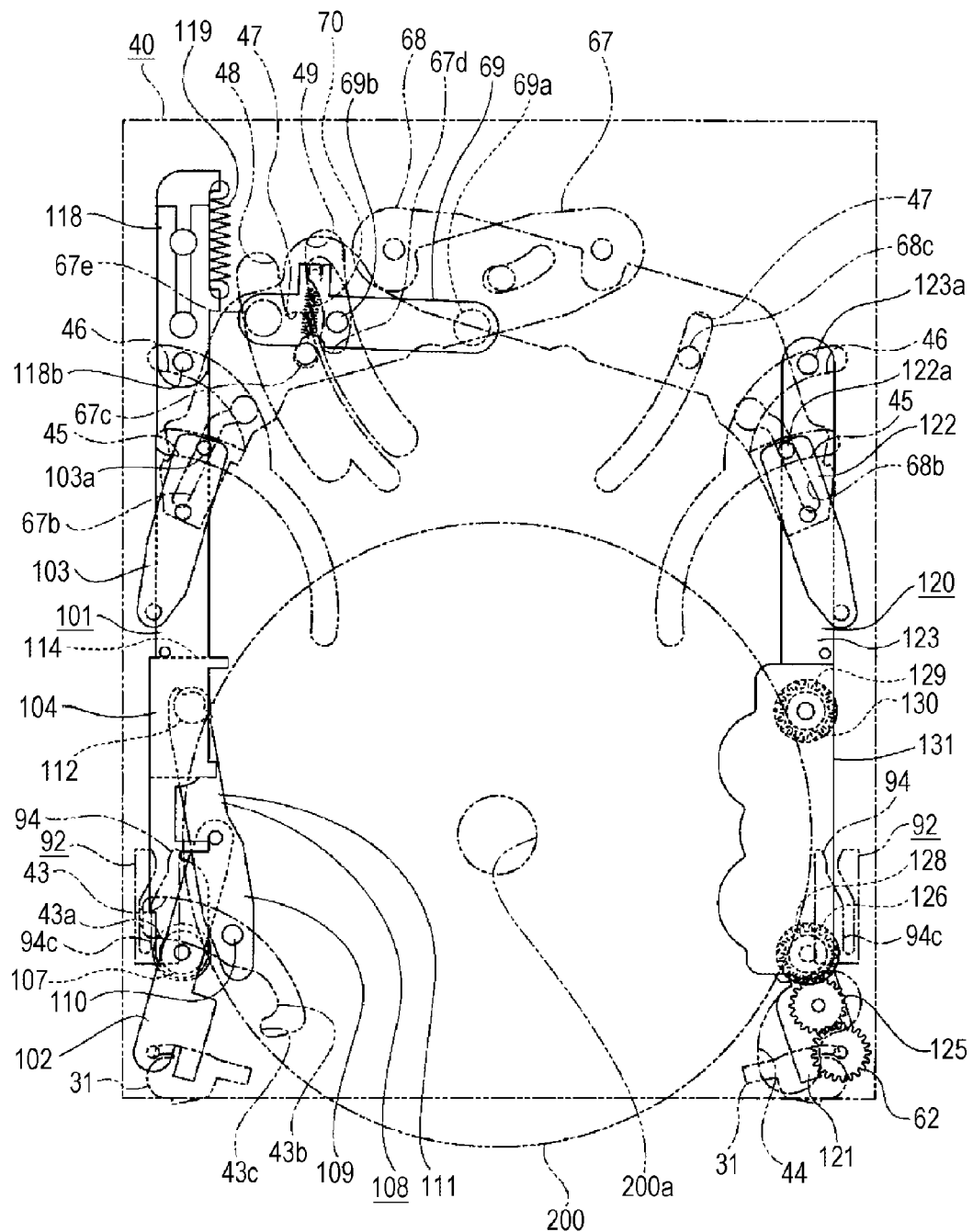
FIG. 46 is a schematic plan view illustrating a state wherein the disc-shaped recording medium continues to be conveyed towards a chucking position.

Further, as the disc-shaped recording medium 200 is conveyed toward the rear by the driving roller 128 and fixing roller 107, the peripheral face of the disc-shaped recording medium 200 is in a state of touching the driving roller 128, fixed roller 107, pressing roller 112, and turning roller 130 (see FIG. 46).

At this time, the peripheral portion of the disc-shaped recording medium 200 is guided by the front side guiding face 116a formed on the front side guiding portion 116 of the storage 114, and is conveyed to the rear.

Further, when the disc-shaped recording medium 200 is conveyed toward the rear, contact between the route adjusters 31 and the disc-shaped recording medium 200 is disengaged, and the route adjusters 31 are turned to a neutral position by the biasing force of the return springs 39.

Further, when the disc-shaped recording medium 200 is conveyed toward the rear, the first rail 104 and second rail 123 are moved in parallel in the direction of nearing each other, and the first front side link arm 102, first rear side link arm 103, second front side link arm 121, and second rear side link arm 122 are turned inwards.

Figure 47:
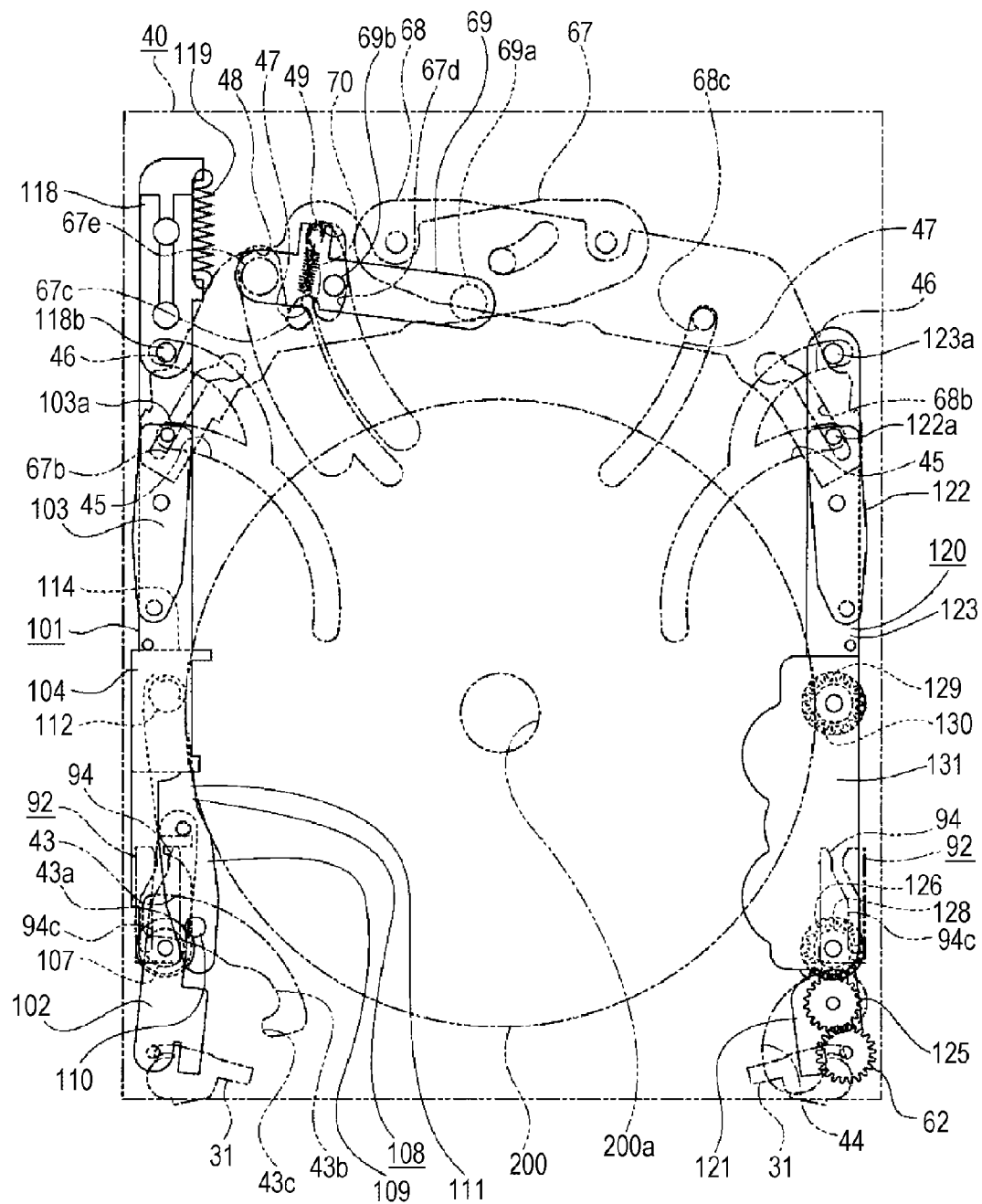
FIG. 47 is a schematic plan view illustrating a state wherein the disc-shaped recording medium continues to be conveyed towards a chucking position.

The disc-shaped recording medium 200 continues to be conveyed toward the rear by the rotating roller 130 and pressing roller 112, and the driving roller 128 and fixed roller 107 separate from the peripheral face of the disc-shaped recording medium 200 (see FIG. 47).

The pressing roller 112 has a function to press and convey forward the disc-shaped recording medium 200, as described later, and when conveying the disc-shaped recording medium 200 toward the rear, the pressing roller 112 is stored in the storage 114 and functions as a conveying roller.

Accordingly, since the pressing roller 112 has two functions, the functionality of the ejecting lever 108 can be improved and the number of parts can be reduced.

When the disc-shaped recording medium 200 is further conveyed toward the rear, the first rail 104 and second rail 123 are moved in parallel again in the direction of mutually separating, and the first front side link arm 102, first rear side link arm 103, second front side link arm 121, and second rear side link arm 122 are again turned outwards. When the first rail 104 and second rail 123 are moved in parallel in the direction of mutually separating, and the disc-shaped recording medium 200 is positioned on a line linking the turning roller 130 and pressing roller 112, the first rail 104 and second rail 123 widely separate again, and the first front side link arm 102, first rear side link arm 103, second front side link arm 121, and second rear side link arm 122 are in a state of extending front to back again.

Also, the first stopper engaging pieces 104b and 123b provided to the first rail 104 and second rail 123, respectively, each touch the contact faces 95a of the stoppers 95 of the side sliders 90.

Accordingly, movement of the first rail 104 and second rail 123 in the direction of mutually separating is restricted, excessive turning of the first front side link arm 102, first rear side link arm 103, second front side link arm 121, and second rear side link arm 122 is restricted, and smooth movement operations of the first rail 104 and second rail 123 are secured.

As described above, when the disc-shaped recording medium 200 is conveyed toward the rear by the rotating roller 130 and pressing roller 112, the peripheral portion of the disc-shaped recording medium 200 is guided by the front side disc guiding face 116a of the front side guiding portion 116 of the storage 114 and the rear side disc guiding faces 117a of the rear side guiding portion 117, and conveyed toward the rear.

Accordingly, the disc-shaped recording medium 200 is conveyed toward the rear without sloping, and smooth conveying operation of the disc-shaped recording medium 200 is performed.

Also, besides the lever guiding face 115a that guides the ejector lever 108, a front side disc guiding face 116a and rear side disc guiding faces 117a that guide the disc-shaped recording medium 200 are formed on the storage 114.

Accordingly, the ejecting lever 108 and disc-shaped recording medium 200 can be securely guided, the ejecting lever 108 can be securely stored in the storage 114, and the disc-shaped recording medium 200 can be smoothly conveyed.

Figure 48:
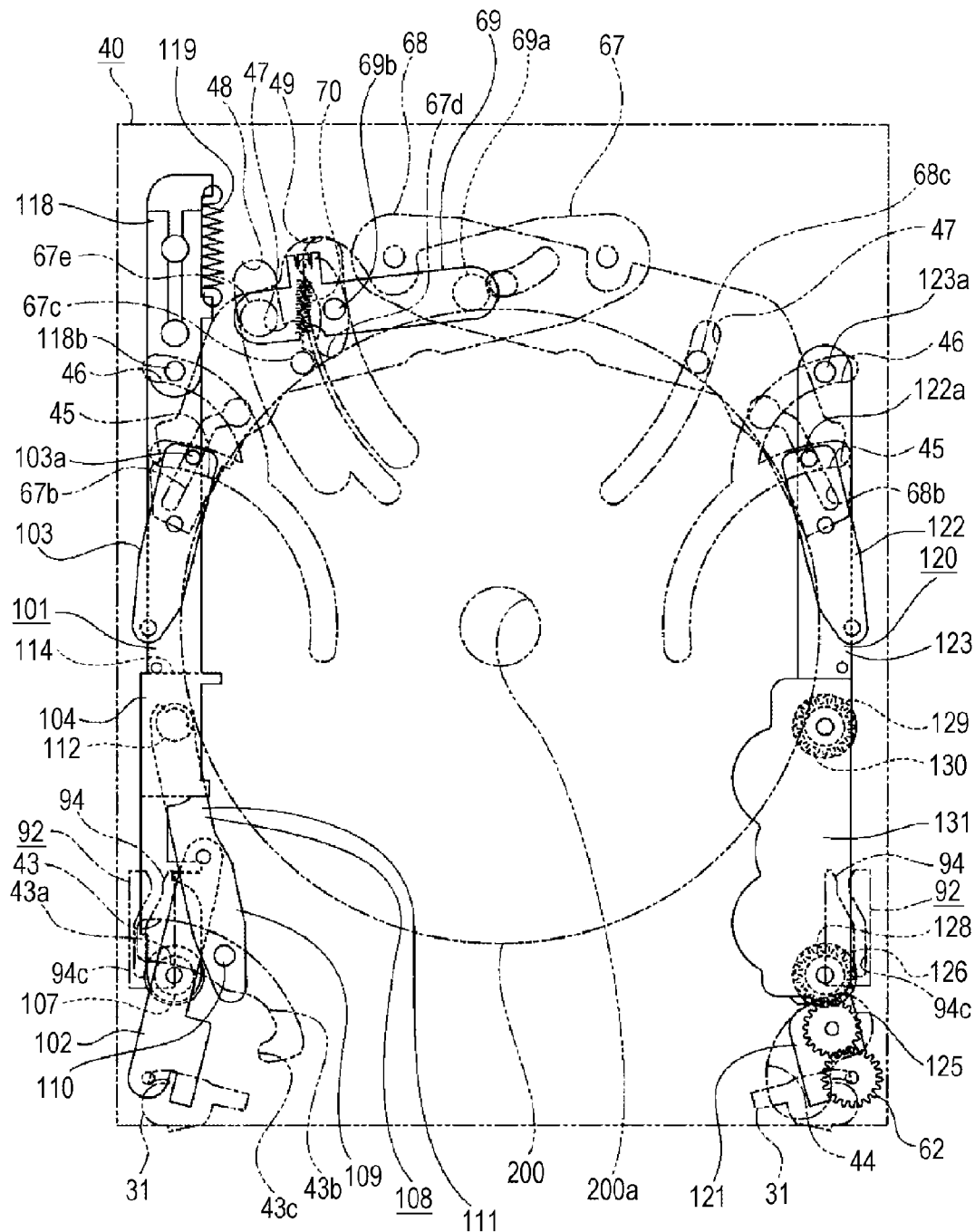
FIG. 48 is a schematic plan view illustrating a state wherein the disc-shaped recording medium continues to be conveyed towards a chucking position.
Figure 49:
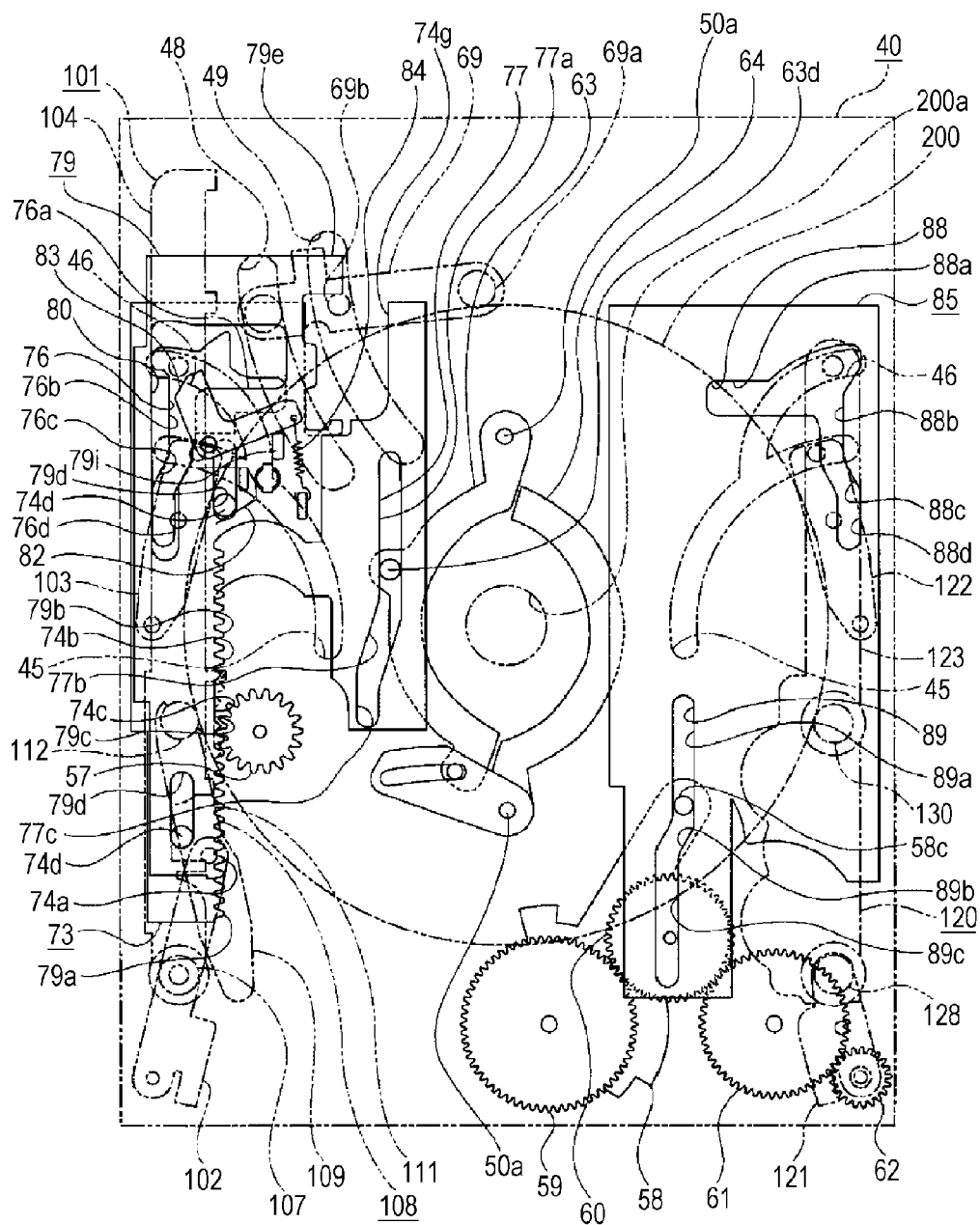
FIG. 49 is a schematic plan view illustrating a state wherein the sub slider is moved to the rear.

The disc-shaped recording medium 200 continues to be conveyed toward the rear to the chucking position by the driving roller 128 and fixed roller 107 (see FIG. 48).

Upon the disc-shaped recording medium 200 being conveyed to a chucking position, i.e. a position where the center hole of the disc-shaped recording medium 200 is existing directly above the disc table of the base unit, the peripheral face of the disc-shaped recording medium 200 is in a state of touching the pressing roller 112, rotating roller 130, disc holding pin 67c of the first interlocking lever 67, and disc holding pin 68c of the second interlocking lever 68, and the disc-shaped recording medium 200 is held at four points and the movement of the disc-shaped recording medium 200 is stopped at the chucking position.

Upon the disc-shaped recording medium 200 being conveyed to the chucking position, the slave shaft 118b of the limit lever 118 is moved to a position near the left edge of the waiting portion 76a in the cam hole 76 of the first main slider 73, and the slave shaft 123a of the second rail 123 is moved to a position near the right edge of the waiting portion 88a in the cam hole 88 of the second main slider 85.

Upon the disc-shaped recording medium 200 being conveyed to the chucking position, pressed shaft 69a of the starting lever 69 turnably supported by the first interlocking lever 67 is pressed toward the rear by the peripheral face of the disc-shaped recording medium 200. Upon the pressed shaft 69a being pressed toward the rear by the disc-shaped recording medium 200, the starting lever 69 is turned counter to the biasing force of the coil spring 70, and the action protrusion 79e of the sub slider 79 is pressed toward the rear by the action shaft 69b (see FIG. 49).

Upon the starting lever 69 being turned and the action protrusion 79e being pressed toward the rear by the action shaft 69b, the sub slider 79 is moved from a non-meshed position toward the rear as to the first main slider 73, and the first sub rack portion 79a meshes with the driving gear 57 that is rotated by the driving force of the driving motor 52. At this time, by the sub slider 79 being moved from the non-meshed position toward the rear as to the first main slider 73, an edge portion 82*b* of the position control spring 82 is pressed forward to the support pin 74*d* of the first main slider 73, and movement force toward the front is applied by the position control spring 82 to the sub slider 79.

Upon the first sub rack portion 79*a* being meshed with the driving gear 57, the sub slider 79 is moved toward the rear by the driving force of the driving motor 52. Upon the sub slider 79 moving toward the rear, the front side opening edges of the supported holes 79*d* each touch the supporting pins 74*d* of the first main slider 73. The sub slider 79 is moved toward the rear, whereby the action protrusion 79*e* is separated from the action shaft 69*b* toward the rear.

The support pins 74*d* function as movement restriction portions that restrict the movement of the sub slider 79 as to the first main slider 73, and the supported holes 79*d* function as restricted portions whereby the movement of the sub slider 79 as to the first main slider 73 is restricted by the support pins 74*d* that function as movement restricting portions.

Figure 50:
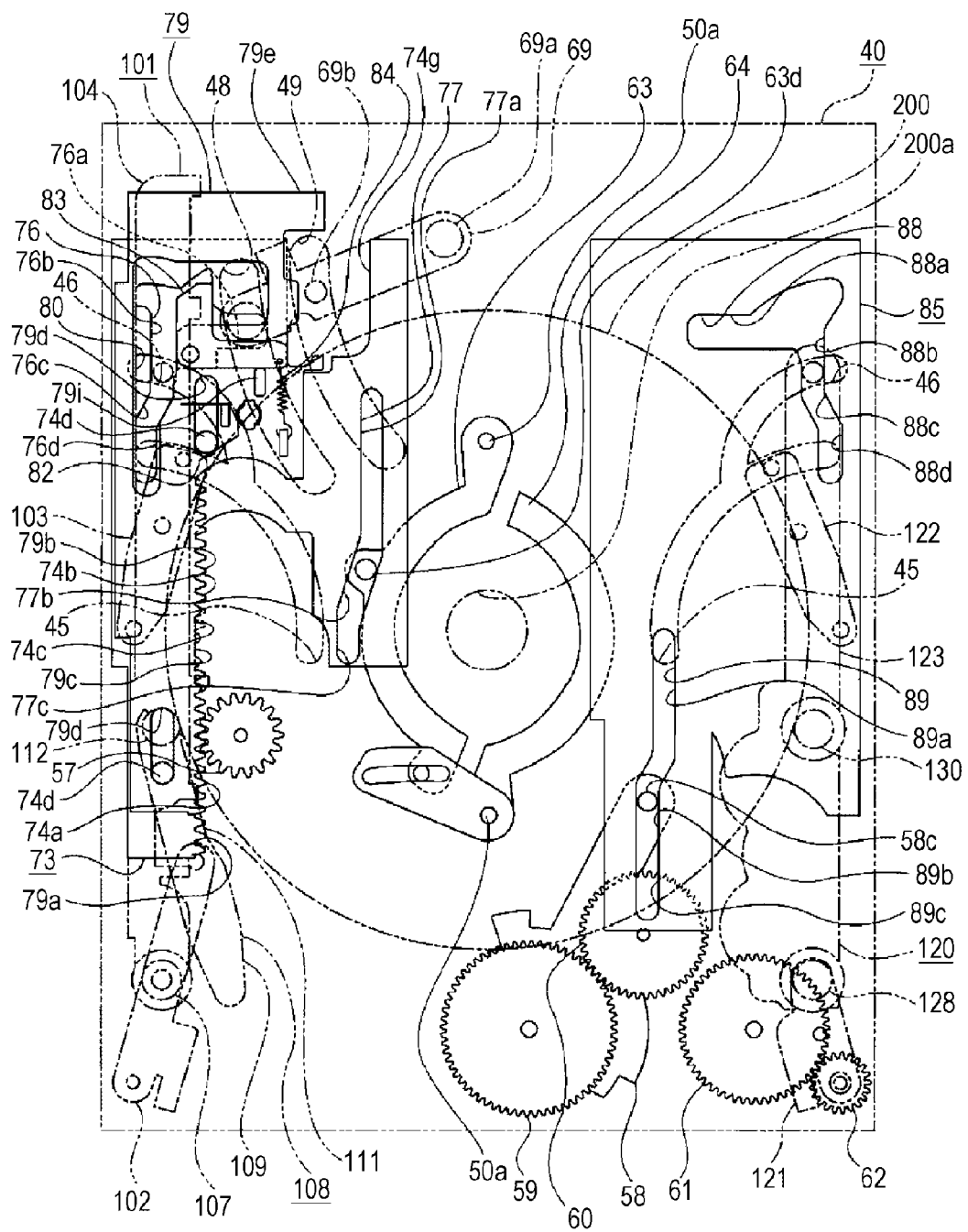
FIG. 50 is a schematic plan view illustrating a state wherein the first main slider and sub slider are integrated and moved to the rear.

As the sub slider 79 continues to be moved toward the rear in the state of the front side opening edges of the supported holes 79*d* each touching the supporting pins 74*d* of the first main slider 73, the supporting pins 74*d* are pressed toward the rear by the front side opening edges of the supported holes 79*d*, and the first main slider 73 and sub slider 79 are integrally moved toward the rear (see FIG. 50). Accordingly, the first main rack portion 74*a* of the first main slider 73 meshes with the driving gear 57, and the first main rack portion 74*a* and the first sub rack portion 79*a* of the sub slider 79 are meshed together with the driving gear 57.

As the first main slider 73 and sub slider 79 are integrated and moved toward the rear, the slave shaft 118*b* of the limit lever 118 is moved from the waiting portion 76*a* in the cam hole 76 of the first main slider 73 to the first straight line portion 76*b*, and the slave shaft 123*a* of the second rail 123 is moved from the waiting portion 88*a* in the cam hole 88 of the second main slider 85 to the first straight line portion 88*b*.

At this time, with the movement toward the rear of the second main slider 85, the sliding pin 58*c* of the gear supporting plate 58 is moved from the rear side sliding portion 89*a* of the cam sliding hole 89 of the second main slider 85 to the front side sliding portion 89*c* via the sloped sliding portion 89*b*. Accordingly, the gear supporting plate 58 is turned in a counter-clockwise direction from a planar view, the switching gear 60 is moved and the meshing between the switching gear 60 and the second transmitting gear 61 is disengaged, and the rotation of the driving roller 128 and the rotating roller 130 is stopped.

Figure 51:
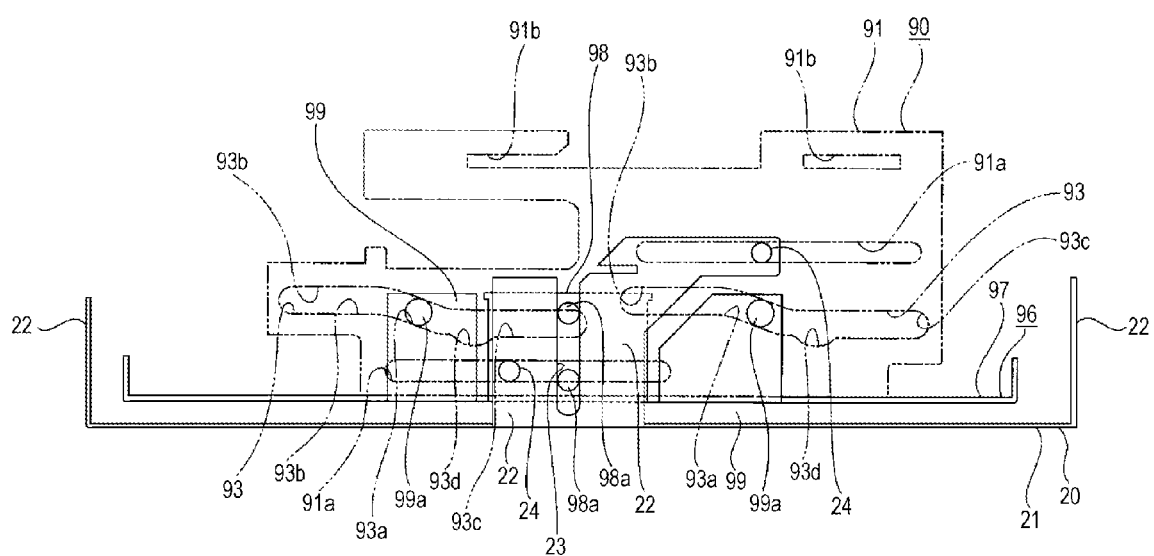
FIG. 51 is a schematic side view illustrating a state of the unit plate being moved upwards.

When the first main slider 73 and second main slider 85 are slid toward the rear as described above, the side sliders 90 are integrated and moved toward the rear (see FIG. 51).

Upon the side sliders 90 being moved toward the rear, the guided pins 99*a* of the unit plate 96 biased downward by the springs 100 are moved from the holding recesses 93*d* of the elevator cam holes 93 to the sloping cam portions 93*a*. Accordingly, the unit plate 96 and the base unit disposed on the unit plate 96 are moved upward and the disc table nears the chucking pulley 66.

Figure 52:
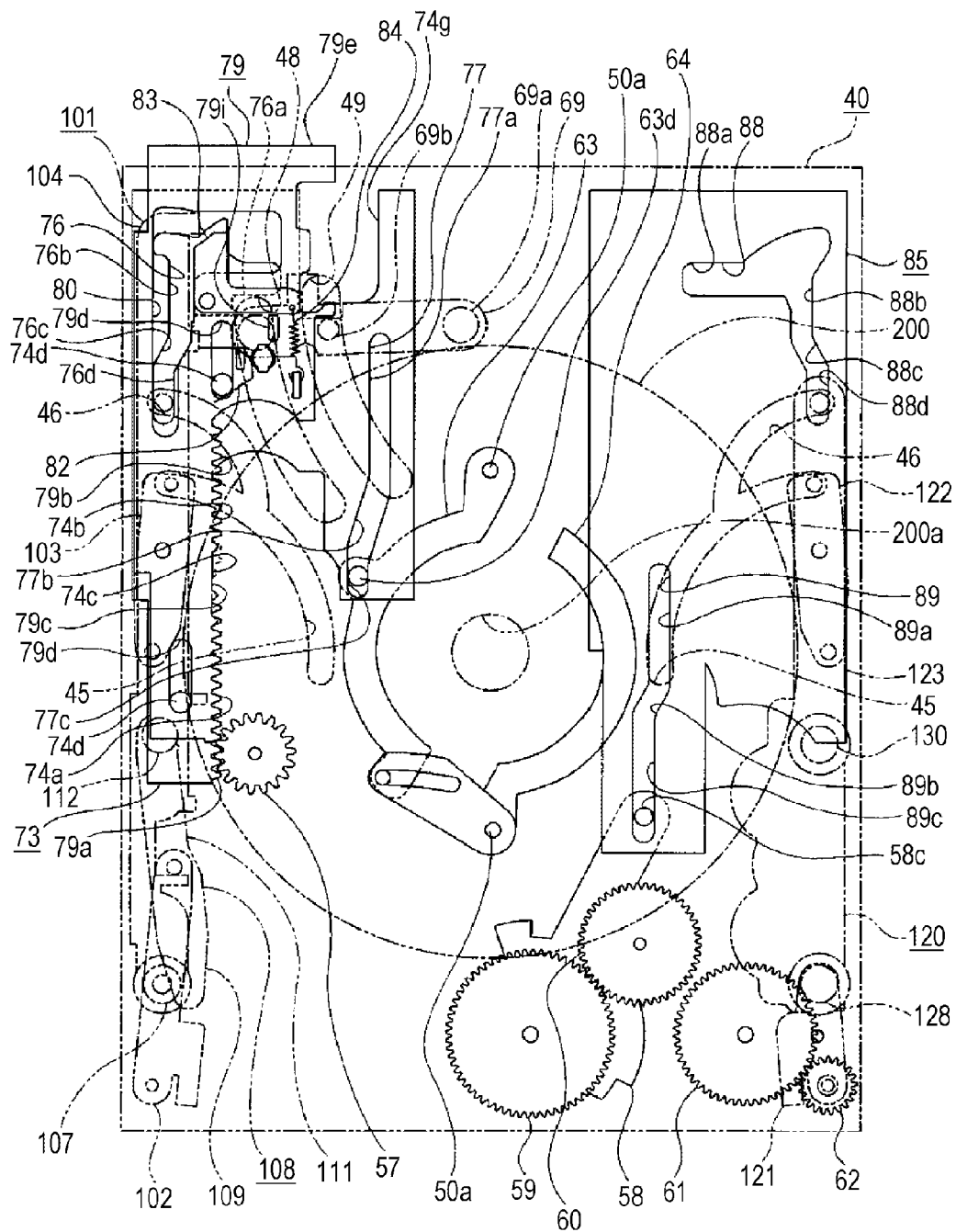
FIG. 52 is a schematic plan view illustrating a state wherein the first main slider and sub slider have been moved to the moving edge at the rear.

Further, the first main slider 73 and sub slider 79 are integrated and move toward the rear by the rotation of the driving gear 57 (see FIG. 52).

Further, by the first main slider 73 and sub slider 79 integrating and moving toward the rear by the rotation of the driving gear 57, the slave shaft 118*b* of the limit lever 118 is moved from the first straight line portion 76*b* in the cam hole 76 of the first main slider 73 to the second straight line portion 76*d* via the sloping portion 76*c*. At the same time, the slave shaft 123*a* of the second rail 123 is moved from the first straight line portion 88*b* in the cam hole 88 of the second main slider 85 to the second straight line portion 88*d* via the sloping portion 88*c*.

Figure 53:
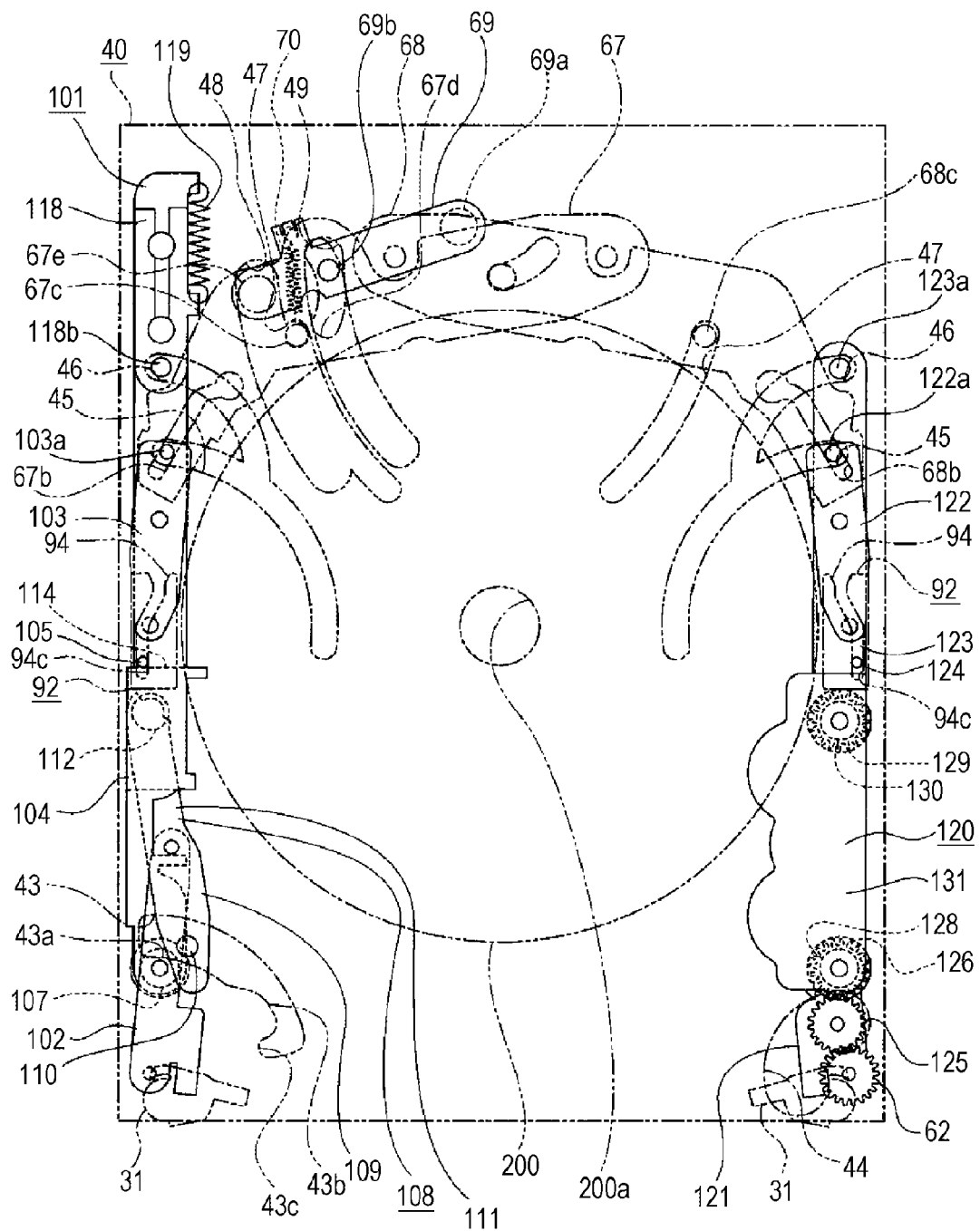
FIG. 53 is a schematic plan view illustrating a state wherein the first rail and second rail are moved in directions so as to mutually separate from each other, and a pressing roller and rotating roller and disc holding pin are separated from the peripheral face of the disc-shaped recording medium.
Figure 54:
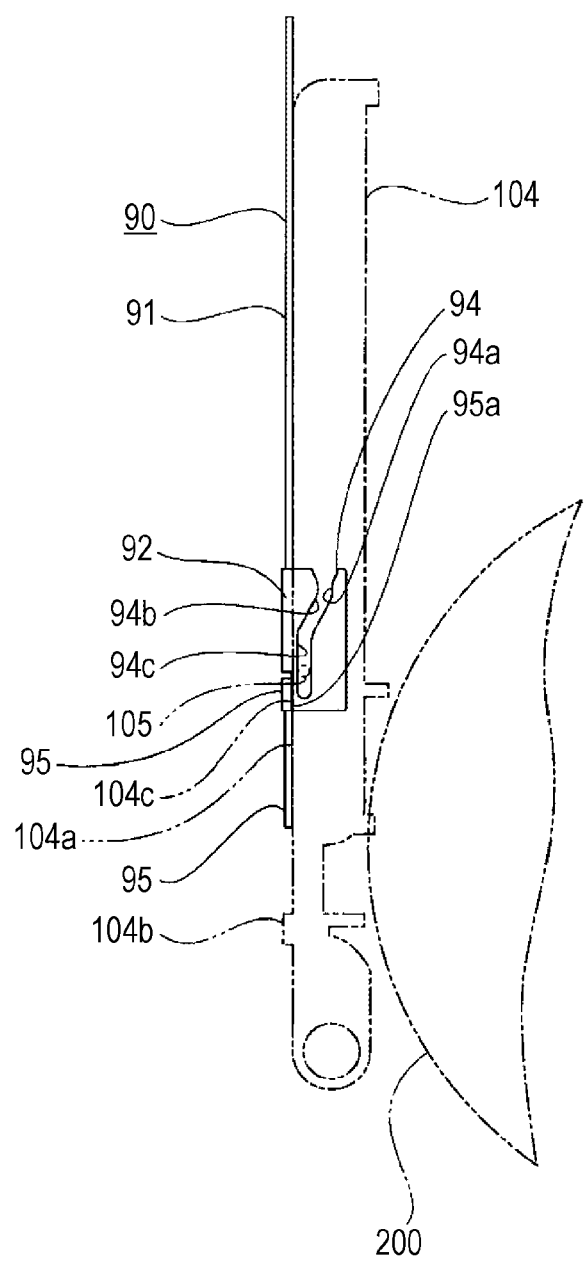
FIG. 54 is a schematic plan view illustrating a state wherein a stopper engaging piece of the first rail is touching the stopper of the side slider during chucking of the disc-shaped recording medium.

Accordingly, the first rail 104 and second rail 123 move in the direction of mutually separating, and the pressing roller 112 and rotating roller 130 are separated from the peripheral portion of the disc-shaped storage medium 200 (see FIG. 53). At the same time, the first interlocking lever 67 and second interlocking lever 68 are turned together with the turning operations of the first rear side link arm 103 and second rear side link arm 122, and the disk holding pins 67*c* and 68*c* are separated from the peripheral face of the disc-shaped storage medium 200.

The first rail 104 and second rail 123 are moved to the farthest separated positions. When the first rail 104 and second rail 123 are moved to the farthest separated positions, the second stopper engaging pieces 104*c* and 123*c* each provided to the first rail 104 and second rail 123, respectively, touch the contact faces 95*a* of the stoppers 95 (see FIG. 54).

Accordingly, similar to the case described above wherein the first stopper engaging pieces 104*b* and 123*b* each touch the stoppers 95, movement of the first rail 104 and second rail 123 in the direction of mutually separating is restricted, excessive turning of the first front side link arm 102, first rear side link arm 103, second front side link arm 121, and second rear side link arm 122 is restricted, whereby smooth movement operations of the first rail 104 and second rail 123 can be secured.

By providing such stoppers 95, when the disc-shaped recording medium 200 is conveyed to the chucking position, the pressing roller 112, rotating roller 130, disc holding pin 67*c* of the first interlocking lever 67, and disc holding pin 68*c* of the second interlocking lever 68 can be moved to positions that sufficiently separated and do not interfere with the disc-shaped recording medium 200.

Also, by providing stoppers 95, the parallel position relation of the first rail 104 and second rail 123 can be favorably maintained, thereby improving operational reliability.

Further, corresponding to the movement positions of the side sliders 90, multiple first stopper engaging pieces 104*b* and 123*b* and second stopper engaging pieces 104*c* and 123*c* that touch the stoppers 95 are provided to the first rail 104 and second rail 123.

Accordingly, corresponding to the position of the side sliders 90, movement of the first rail 104 and second rail 123 is restricted at appropriate positions for each, and operation can be started smoothly from each position of the first rail 104 and second rail 123.

Also, the contact positions with the first stopper engaging pieces 104*b* and 123*b* and second stopper engaging pieces 104*c* and 123*c* with the stoppers 95 are in different positions in the movement direction of the first rail 104 and second rail 123, whereby restriction of movement of the first rail 104 and second rail 123 can be readily performed at the various positions.

When the first rail 104 and second rail 123 are moved to the farthest separated positions, at the same time the slave pin 63*d* of the first pulley holder 63 is moved from the rear side portion 77*a* in the cam supporting hole 77 of the first main slider 73 to the front side portion 77*c* via the intermediate portion 77*b*, due to the movement toward the rear of the first main slider 73. Accordingly, the first pulley holder 63 and second pulley holder 64 are turned from the holding position of holding the chucking pulley 66 to the direction counter to the biasing force of the coil spring 65 so as to be separated, the holding state of the first pulley holder 63 and second pulley holder 64 as to the chucking pulley 66 is disengaged whereby the chucking pulley 66 can be moved downwards.

Figure 55:
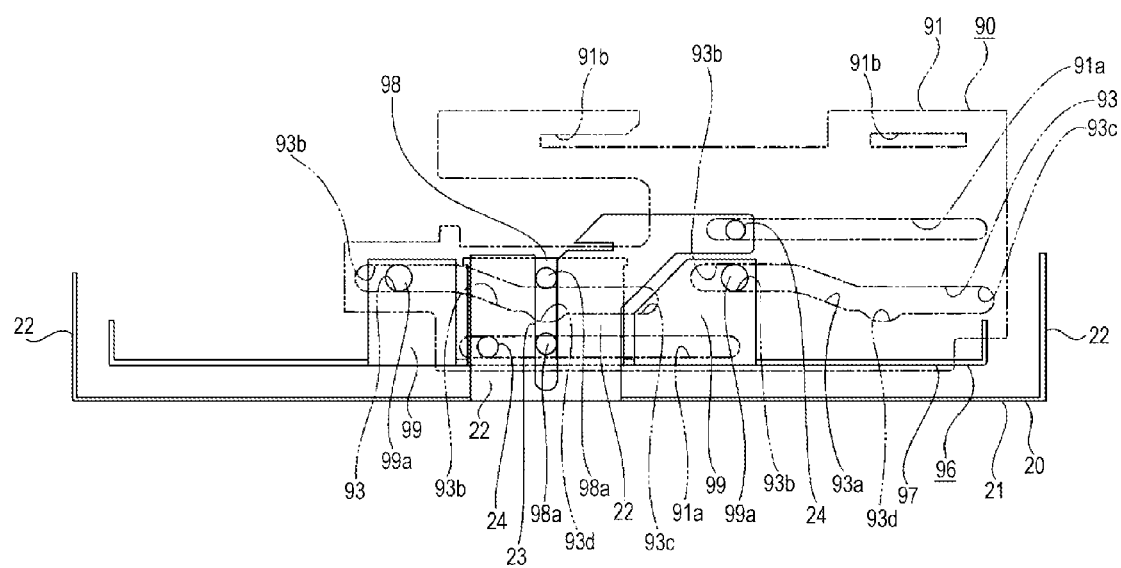
FIG. 55 is schematic side view illustrating a state wherein the unit plate has been moved to the upper moving edge.

Also, at this time, simultaneously, the side sliders 90 are moved toward the rear together with the movement toward the rear of the first main slider 73 and second main slider 85, and the guide receiving pins 99a of the unit plate 96 are each moved from the sloping cam portions 93a of the elevator cam holes 93 to the front side cam portions 93b (see FIG. 55). Accordingly, the unit plate 96 and the base unit disposed on the unit plate 96 are moved to the upper moving edge. In the state that the base unit is moved to the upper moving edge, a portion of the base unit is disposed in the base unit disposing hole 27 formed on the base plate portion 26 of the base plate 25.

Upon the base unit being moved to the upper moving edge, the chucking pulley 66 is attracted and held to the disc table, the disc-shaped recording medium 200 is held between the disc table and chucking pulley 66, and loading of the disc-shaped recording medium 200 is completed.

When the side sliders 90 are moved toward the rear, as described above, the first rail 104 and second rail 123 are moved toward positions that are farthest separated, and the inserting pin 105 of the first rail 104 and the inserting pin 124 of the second rail 123 are each inserted in the cam sliding holes 94 formed in the guide portions 92 of the side sliders 90.

The inserting pins 105 and 124 are inserted into the front side sliding portions 94c via the rear side sliding portions 94a and sloping sliding portions 94b of the cam sliding holes 94. Accordingly, the first rail 104 and second rail 123 are held in positions that are separated the farthest.

The first main slider 73 and sub slider 79 and the second main slider 85 are moved to the rear moving edge and stopped. Upon the first main slider 73 and sub slider 79 and the second main slider 85 having been moved to the rear moving edge, the driving of the driving motor 52 is stopped and rotation of the driving gear 57 is stopped.

Upon the disc-shaped recording medium 200 being chucked by the disc table and chucking pulley 66, the disc table is rotated, driving of an optical pickup is started, and recording or playing of the information signals as to the disc-shaped recording medium 200 is performed.

Upon the recording or playing of the information signals ending, rotation of the disc table is stopped and driving of the optical pickup is ended.

Ejecting Operation

Upon the recording or playing of the information signals as to the disc-shaped recording medium 200 ending, ejecting operations such as described below are performed by the disc conveying device 19 (see FIGS. 56 through 77).

An ejecting operation is started by the driving motor 52 being rotated in the opposite direction from the rotation direction of the loading operations.

Figure 56:
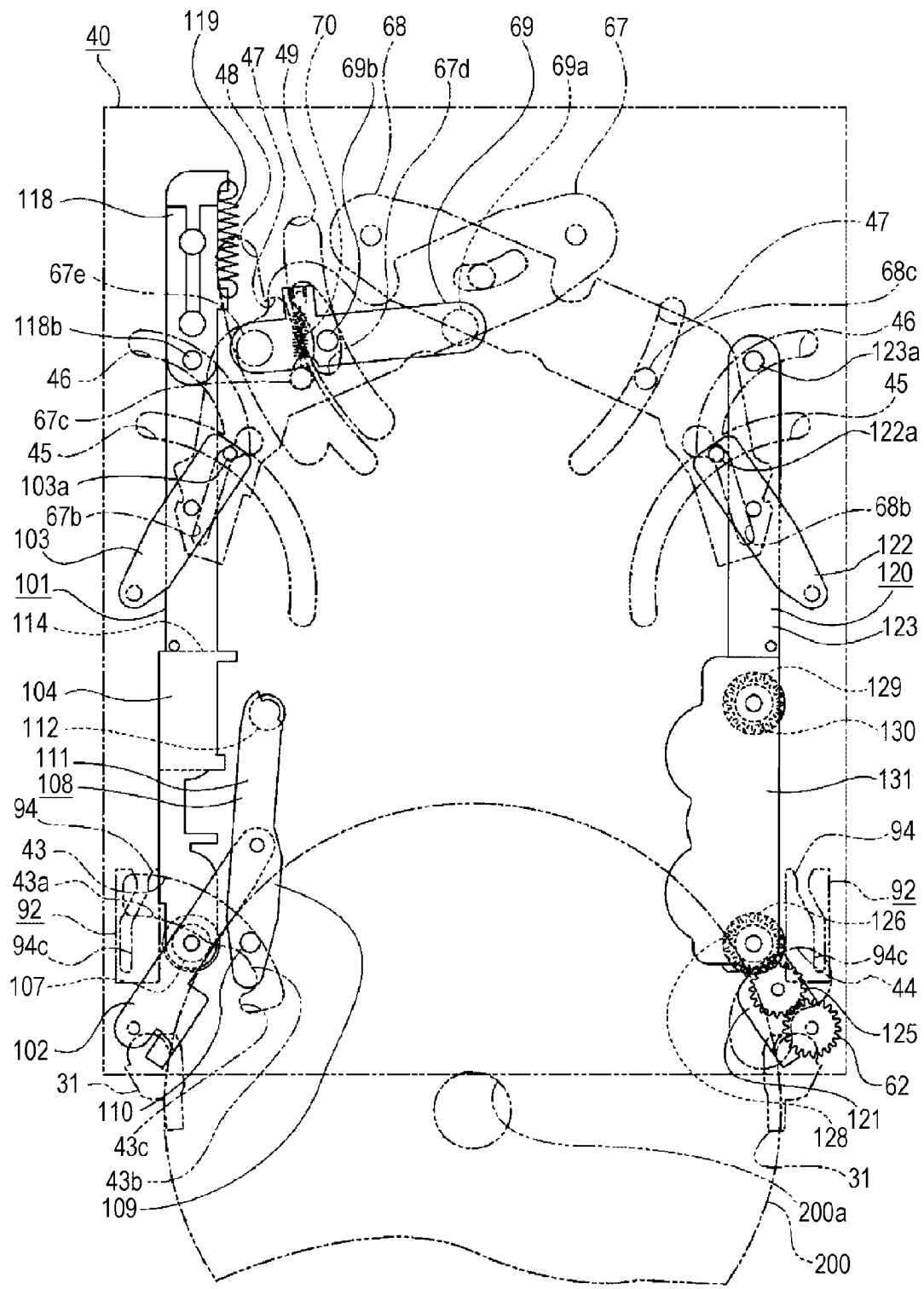
FIG. 56 is a schematic plan view illustrating a state wherein an ejecting operation has started, and the disc-shaped storage medium is conveyed toward the disc cartridge.
Figure 57:
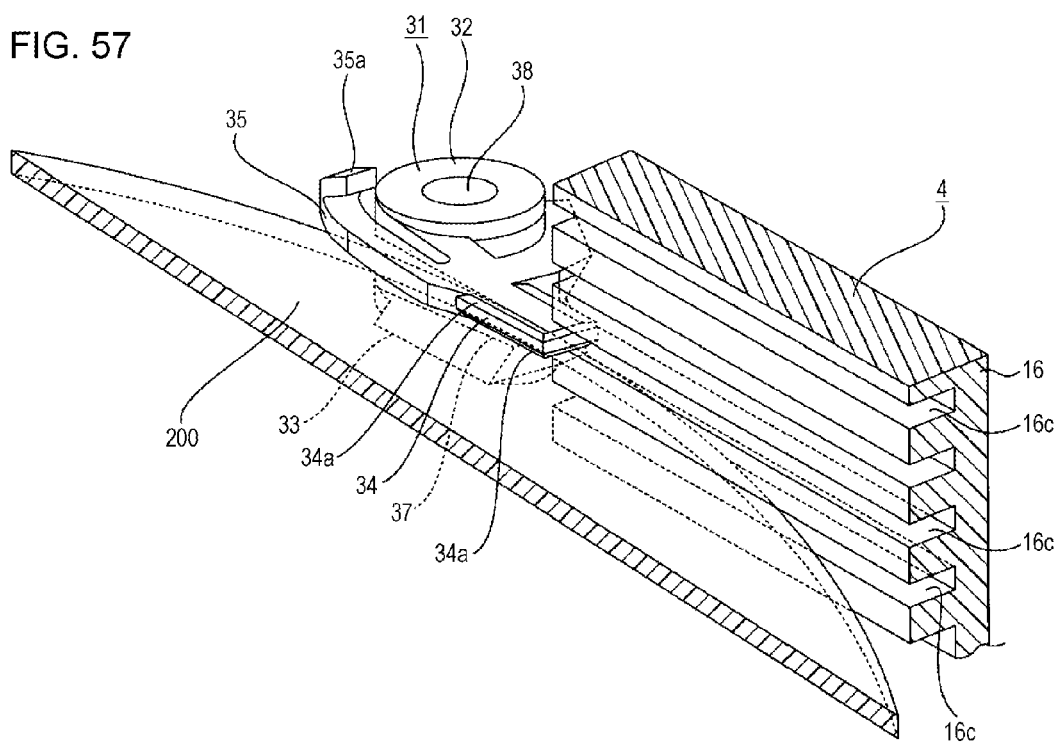
FIG. 57 is an enlarged perspective view illustrating a state wherein the route adjuster is turned, and the positioning protrusion is inserted into a holding groove in the disc cartridge and the position thereof determined.
Figure 58:
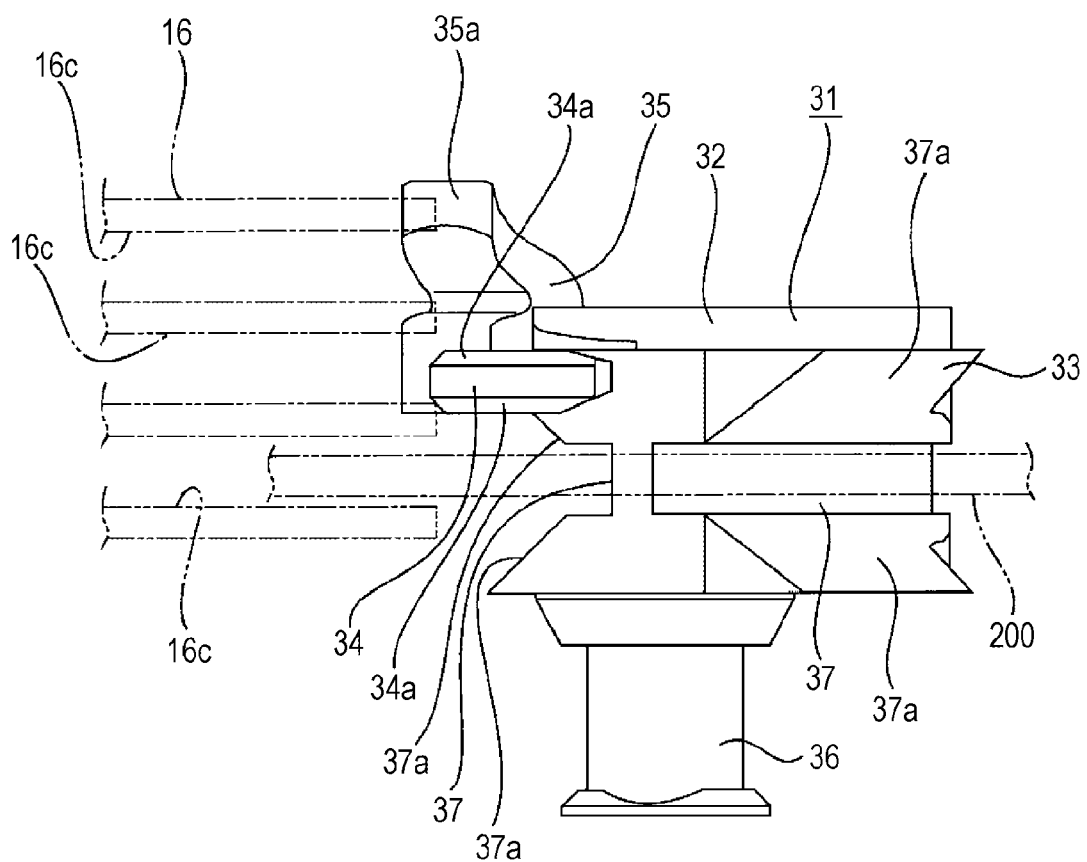
FIG. 58 is an enlarged side view illustrating a state wherein the route adjuster is turned, and the positioning protrusion is inserted into a holding groove in the disc cartridge and the position thereof determined.

Upon the driving motor 52 being rotated, the disc-shaped recording medium 200 is conveyed toward the front (in the ejecting direction) toward the disc cartridge 1 by an operation that is opposite from the various operations in the above-described loading operations, and the disc-shaped recording medium 200 is ejected from the disc conveying device 19 (see FIG. 56). At this time the first main slider 73 and sub slider 79 integrally moves toward the front by the driving force of the driving motor 52.

The first main slider 73 and second main slider 85 are moved toward the front, whereby the slave shaft 118b of the limit lever 118 is moved from the second straight line portion 76d in the cam hole 76 of the first main slider 73 to a position near the left edge of the waiting portion 76a via the sloping portion 76c and the first straight line portion 76b. Also, the slave shaft 123a of the second rail 123 is moved from the second straight line portion 88d in the cam hole 88 of the second main slider 85 to the waiting portion 88a, via the sloping portion 88c and the first straight line portion 88b. At this time the sliding pin 58c of the gear supporting plate 58 is moved from the front side sliding portion 89c of the cam sliding hole 89 of the second main slider 85 to the rear side sliding portion 89a via the sloping sliding portion 89b, and the switching gear 60 and second transmitting gear 61 are meshed again.

Also, slave pin 63d of the first pulley holder 63 is moved from the front side portion 77c in the cam supporting hole 77 of the first main slider 73 to the rear side portion 77a via the intermediate portion 77b, and the chucking pulley 66 is held by the first pulley holder 63 and second pulley holder 64 again. The unit plate 96 and the base unit disposed on the unit plate 96 are lowered by the movement toward the front of the side sliders 90 together with the movement toward the front of the first main slider 73 and second main slider 85, and the guide receiving pins 99a are each held in the holding recesses 93d of the elevator cam holes 93 again.

The disc-shaped recording medium 200 is conveyed to a position of touching the driving roller 128 and fixed roller 107 and wherein roughly half of the disc-shaped recording medium 200 protrudes forward from the disc conveying device 19.

Upon the disc-shaped recording medium 200 being conveyed toward the disc cartridge 1, the route adjusters 31 are pressed forward by the disc-shaped recording medium 200. Positioning grooves 37 are formed on the route adjusters 31, and the peripheral portion of the disc-shaped recording medium 200 is guided by the guiding faces 37a and inserted into the positioning grooves 37.

The route adjusters 31 pressed by the disc-shaped recording medium 200 are turned counter to the biasing force of the return springs 39 in a state of having positioned the disc-shaped recording medium 200. At this time the positioning protrusions 34 of the route adjusters 31 are inserted into the holding grooves 16c which are separated and positioned left and right of the disc cartridge 1 (see FIG. 57). The positioning protrusions 34 of the route adjusters 31 are inserted into the holding grooves 16c which are, for example, one level above the holding grooves 16c in which the disc-shaped recording medium 200 is inserted (see FIG. 57 and FIG. 58).

When the positioning protrusion 34 is inserted into the holding groove 16c, the positioning protrusion 34 is positioned in the holding groove 16c, the guided face 34a on the upper side or the guided face 34a on the lower side formed on both upper and lower edges having been slid to the rear side opening edge of the holding groove 16c. In the disc conveying device 19, when the positioning protrusion 34 is inserted into the holding groove 16c, for example the guided face 34a on the lower side is slid to the rear side opening edge and set so as to be positioned in the holding groove 16c.

Accordingly, the positioning protrusions 34 of the route adjusters 31 are positioned in a state of being pressed to the lower face on which the holding grooves 16c, which are one level above the holding grooves 16c in which the disc-shaped recording medium 200 is inserted, are formed.

The first rail 104 and second rail 123 are moved in parallel in the direction of being mutually closer, as the disc-shaped recording medium 200 is ejected from the disc conveying device 19, and the first front side link arm 102, first rear side link arm 103, second front side link arm 121, and second rear side link arm 122 are turned inward. At this time the ejecting lever 108 is also turned inward together with the turning operation of the first front side link arm 102, and the roller supporting face portion 111 and pressing roller 112 are protruded toward the right from the storage 114.

The first main slider 73 and the sub slider 79 are stopped in a non-meshed position which is a position wherein the non-rack portion 74c is positioned facing the driving gear 57 and a non-meshed position which is a position wherein the non-rack portion 79c is positioned facing the driving gear 57, respectively. Also, the first main slider 73 and the second main slider 85 are synchronously moved toward the front with the first main slider 73, at predetermined positions.

Figure 59:
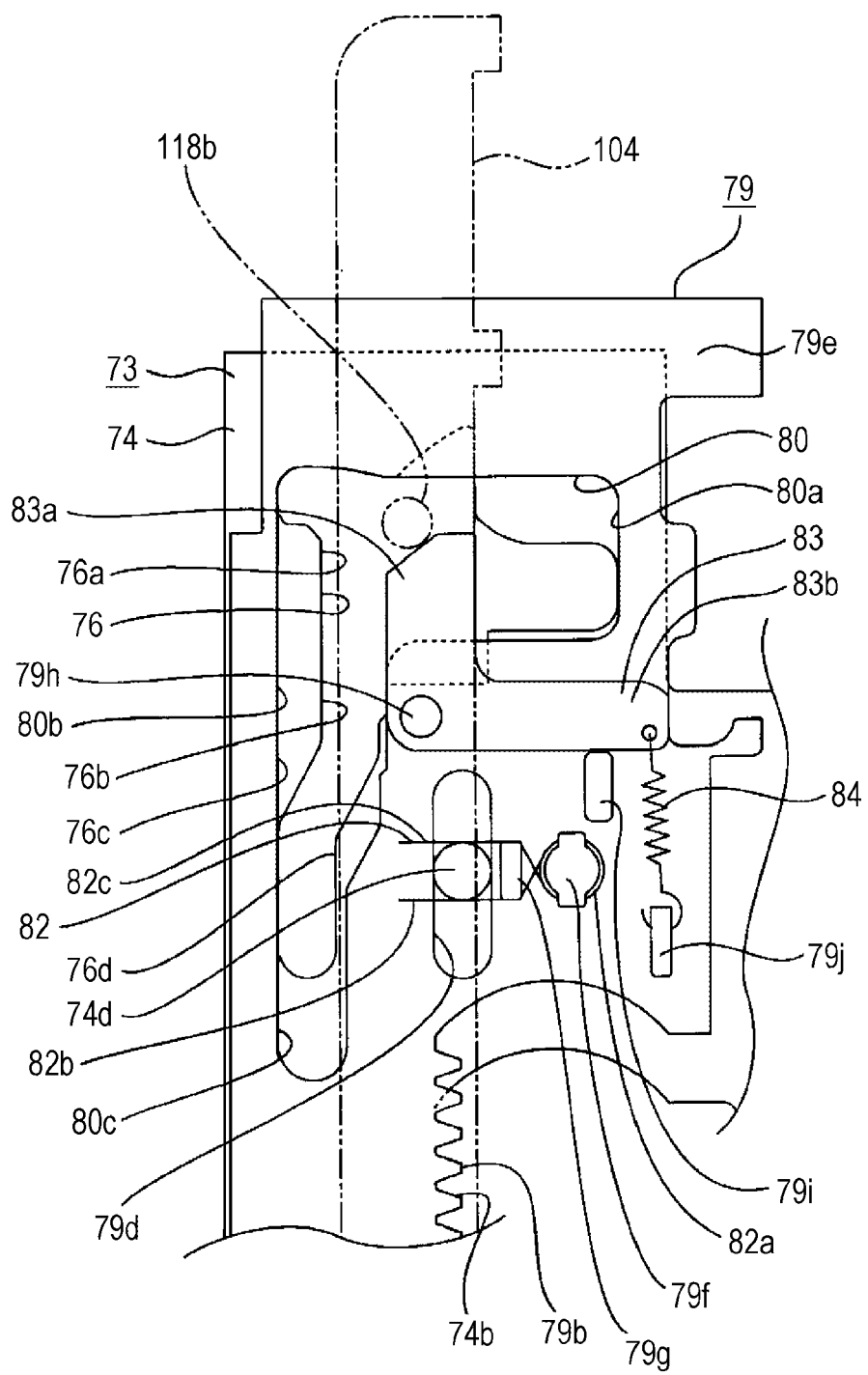
FIG. 59 is a schematic enlarged plan view illustrating a state wherein an operating lever is pressed by the slave shaft of the limit lever, and movement of the sub slider towards the front has begun.

By the conveying toward the front of the disc-shaped recording medium 200, upon the first rail 104 and second rail 123 being moved in parallel in the direction of being mutually closer, the first portion 83a of the operating lever 83 supported by the sub slider 79 is pressed toward the right by the slave shaft 118b of the limit lever 118 (see FIG. 59).

Accordingly, the turn restricting protrusion 79i is pressed toward the front by the operating lever 83, and the sub slider 79 is moved toward the front from the non-meshed position as to the first main slider 73.

Figure 60:
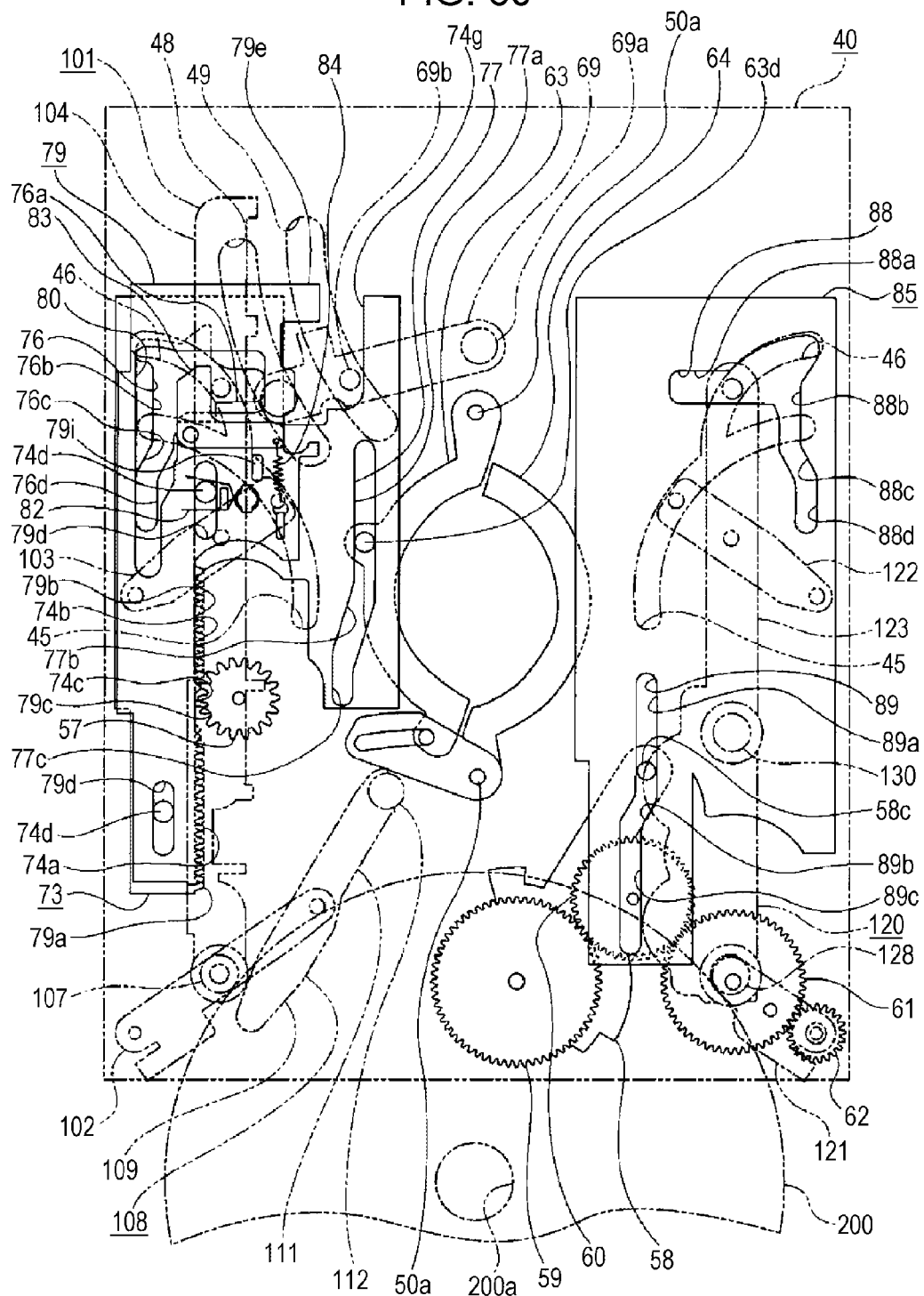
FIG. 60 is a schematic enlarged plan view illustrating a state wherein the slave shaft of the limit layer is moved so as to pass the operating lever.

Upon the first rail 104 and second rail 123 being moved in parallel in the direction of being mutually closer, and the sub slider 79 moved toward the front, the slave shaft 118b of the limit lever 118 is moved towards the right so as to cross over the first portion 83a of the operating lever 83, from the upper side, of the waiting portion 76a of the cam hole 76 (see FIG. 60).

At this time, by the sub slider 79 being moved from the non-meshed position toward the front as to the first main slider 73, the other edge portion 82c of the position control spring 82 is pressed relatively toward the rear by the supporting pin 74d of the first main slider 73, and moving force is applied by the position control spring 82 to the sub slider 79 toward the rear.

Figure 61:
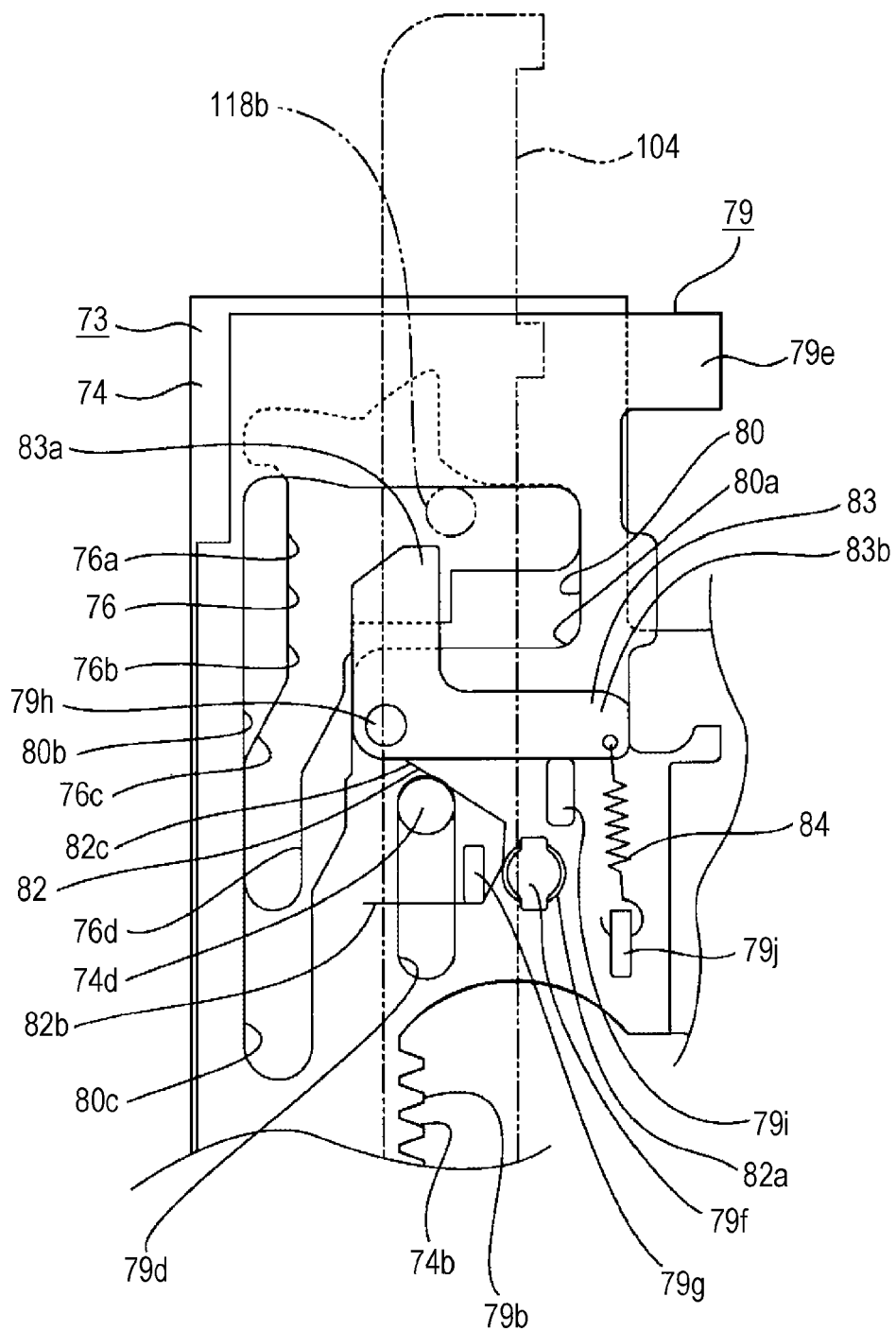
FIG. 61 is a schematic enlarged plan view illustrating a state wherein the slave shaft of the limit lever is pressed by the first main slider and movement of the first rail towards the front has begun.
Figure 62:
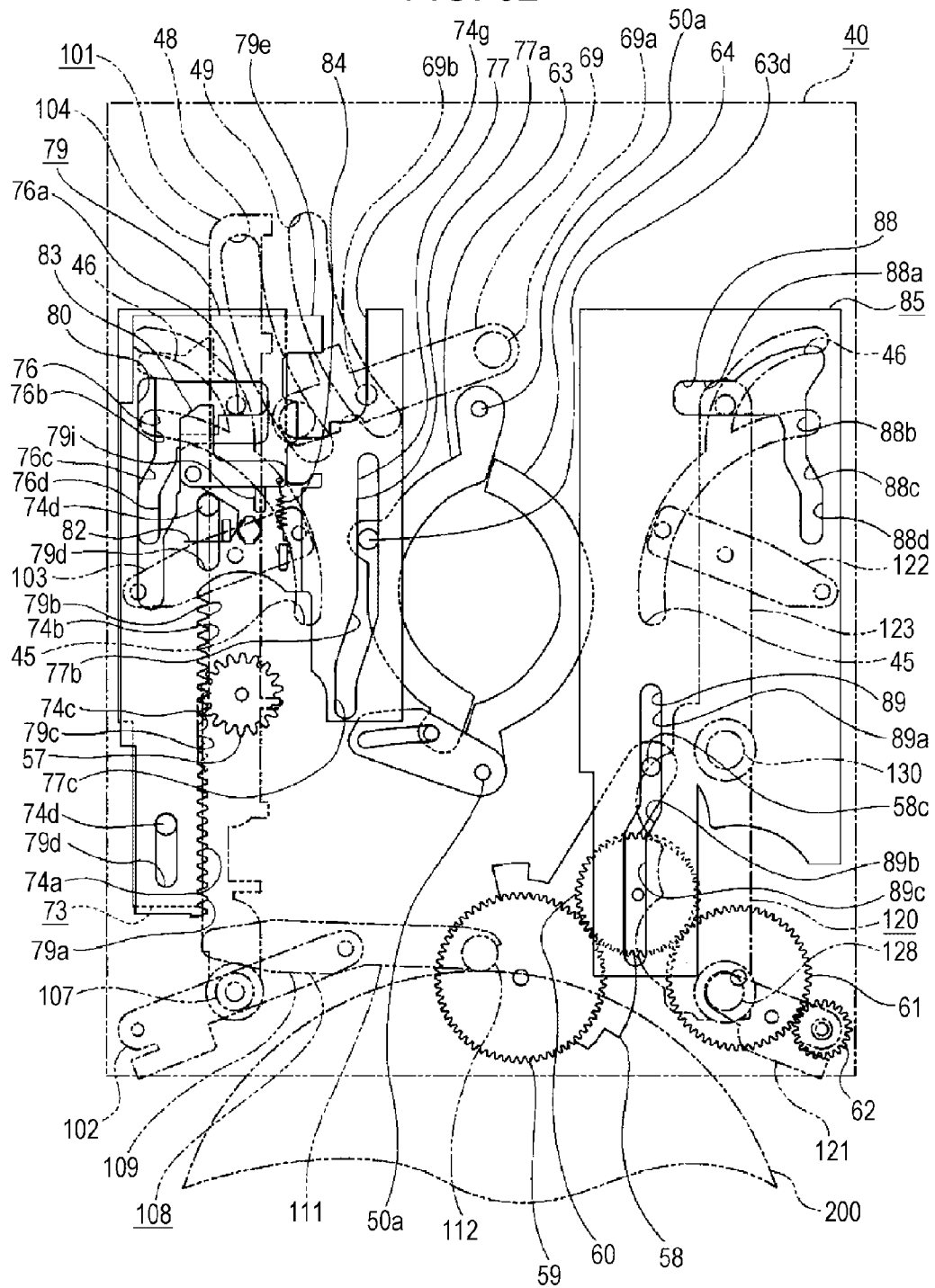
FIG. 62 is a schematic plan view illustrating a state of the first main slider and sub slider are integrated and moved toward the front from a non-meshed position.

Also, since the sub slide 79 moves toward the front, the rear side opening edge of the cam hole 76a of the slave shaft 118b of the limit lever 118 is touched from behind, and the first rail 104 moves forward together with the movement of the sub slider 79 (see FIG. 61). When the first rail 104 is moved toward the front, the second rail 123 is moved toward the front, synchronously with the first rail 104. By the sub slider 79 moving toward the front, the second sub rack portion 79b is meshed with the driving gear 57 (see FIG. 62).

Upon the second sub rack portion 79b being meshed with the driving gear 57, the sub slider 79 is moved toward the front by the driving force of the driving motor 52. Upon the sub slider 79 being moved forward, the rear side opening edges of the support receiving holes 79d each touch the supporting pins 74d of the first main slider 73.

Figure 63:
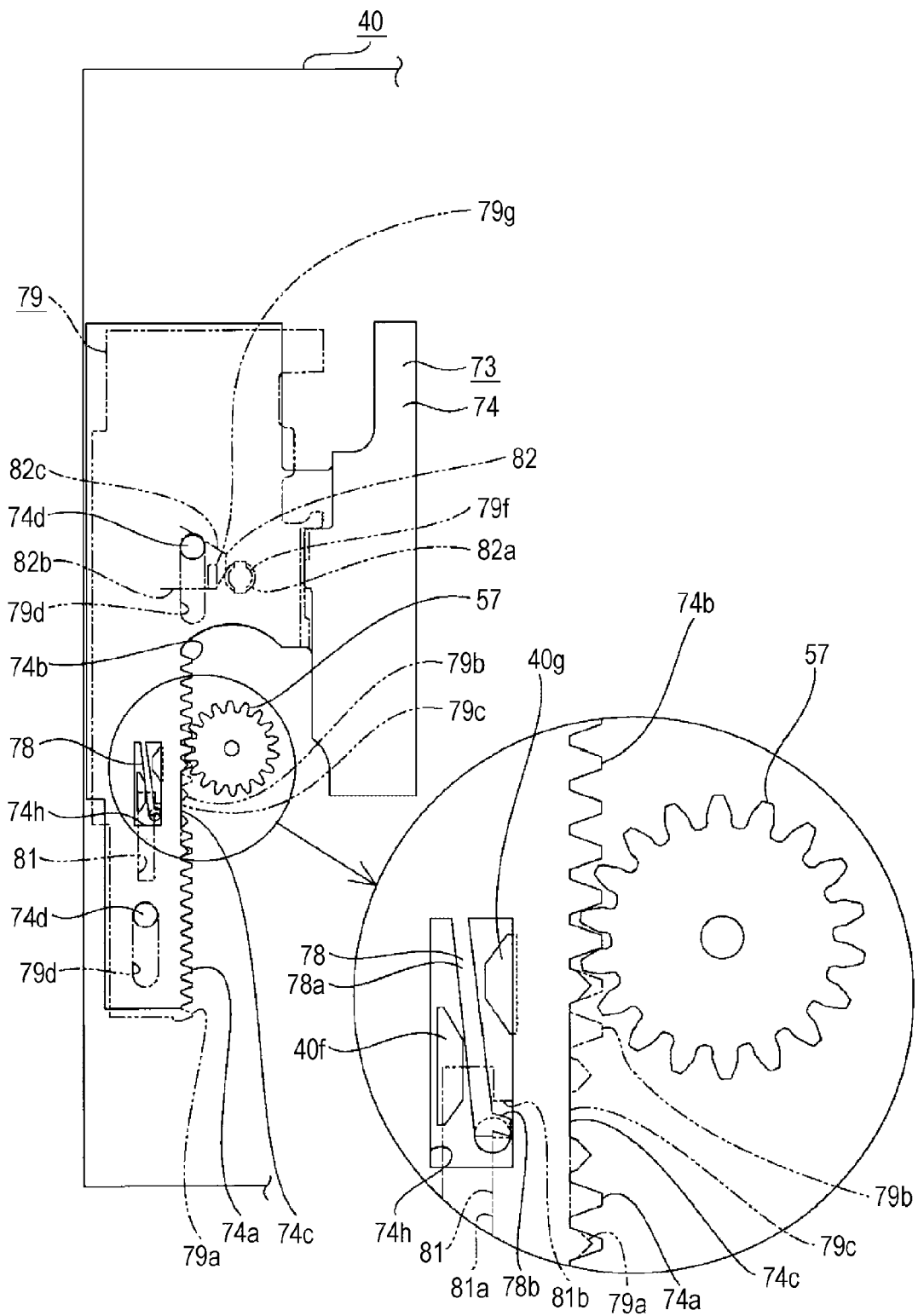
FIG. 63 is a schematic enlarged plan view illustrating a state wherein the first main slider and sub slider are integrated and moved toward the front from a non-meshed position, and the sub slider is locked as to the first main slider by a locking lever.

As the sub slider 79 continues to be moved toward the front in the state wherein the rear side opening edges of the support receiving holes 79d touch the support pins 74d of the first main slider 73, the support pins 74d are each pressed toward the front by the rear side opening edges of the support receiving holes 79d, and the first main slider 73 and sub slider 79 are integrally moved toward the front (see FIG. 63). Accordingly, the second main rack portion 74b of the first main slider 73 is meshed with the driving gear 57, and the second main rack portion 74b and the second sub rack portion 79b of the sub slider 79 are also meshed with the driving gear 57.

The first main slider 73 is integrally moved toward the front with the sub slider 79, whereby the second main slider 85 is also moved toward the front, synchronously with the first main slider 73.

When the first main slider 73 and sub slider 79 are integrally moved toward the front in the state of the second main rack portion 74b and second sub rack portion 79b being meshed with the driving gear 57, the elastic deformation portion 78a of the locking lever 78, which is attached to the first main slider 73 by the locking action protrusion 40f provided to the base chassis 40, is elastically deformed (see FIG. 63). Upon the elastic deformation portion 78a becoming elastically deformed, the locking portion 78b is inserted into the lever engaging portion 81b of the lever inserting hole 81 formed on the sub slider 79, and the sub slider 79 is locked by the locking lever 78 as to the first main slider 73. Accordingly, the first main slider 73 and sub slider 79 are moved toward the front in a locked state.

Figure 64:
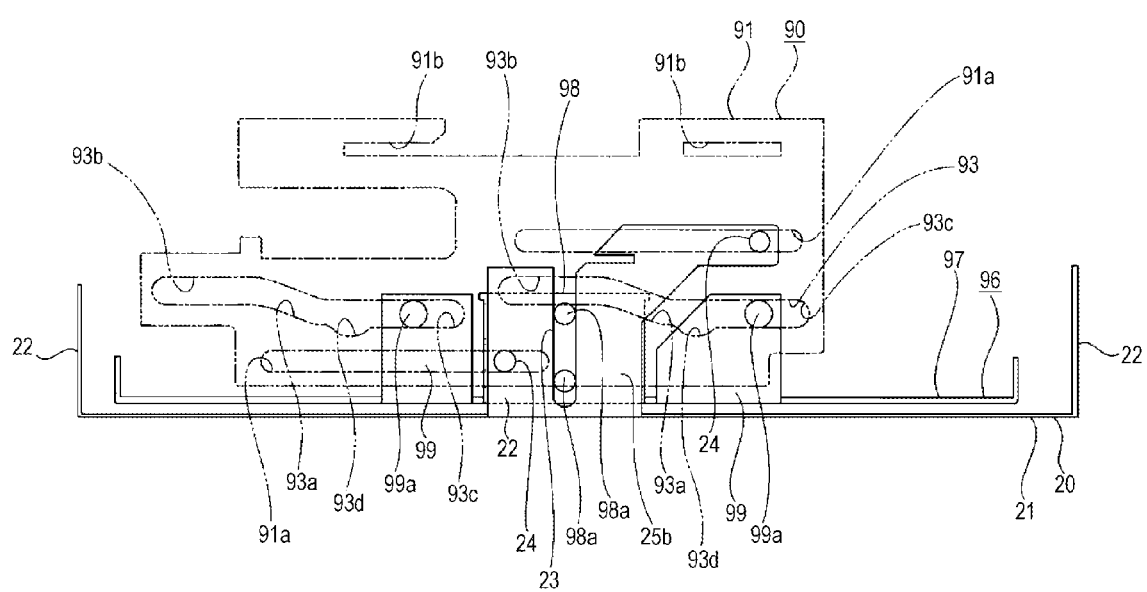
FIG. 64 is a schematic side view illustrating a state of the unit plate when the side slider is moved towards the front.

At this time, on the unit plate 96, the side sliders 90 are moved toward the front together with the movement of the first main slider 73 and second main slider 85 toward the front, whereby the guide receiving pins 99a move the rear side cam portions 93c of the elevator cam holes 93 (see FIG. 64).

The disc-shaped recording medium 200 is conveyed toward the front by the driving roller 128 and fixed roller 107, but when the disc-shaped recording medium 200 is in a protruded state forward a predetermined amount from the disc conveying device 19, conveying the disc-shaped recording medium 200 by the driving roller 128 and fixed roller 107 becomes difficult.

Figure 65:
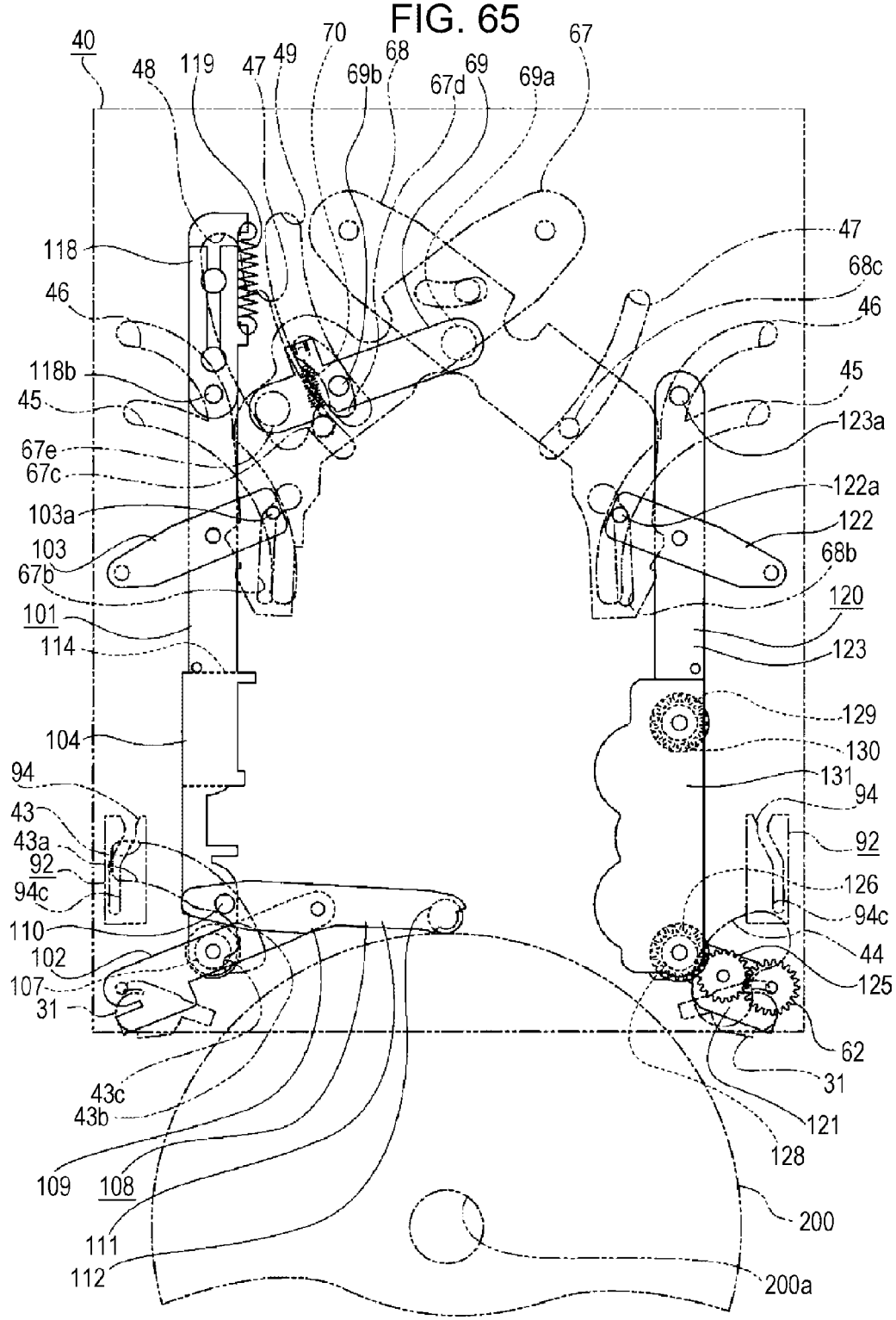
FIG. 65 is a schematic plan view illustrating a state wherein the disc-shaped recording medium has pressed by a pressing roller and is conveyed towards the disc cartridge.
Figure 66:
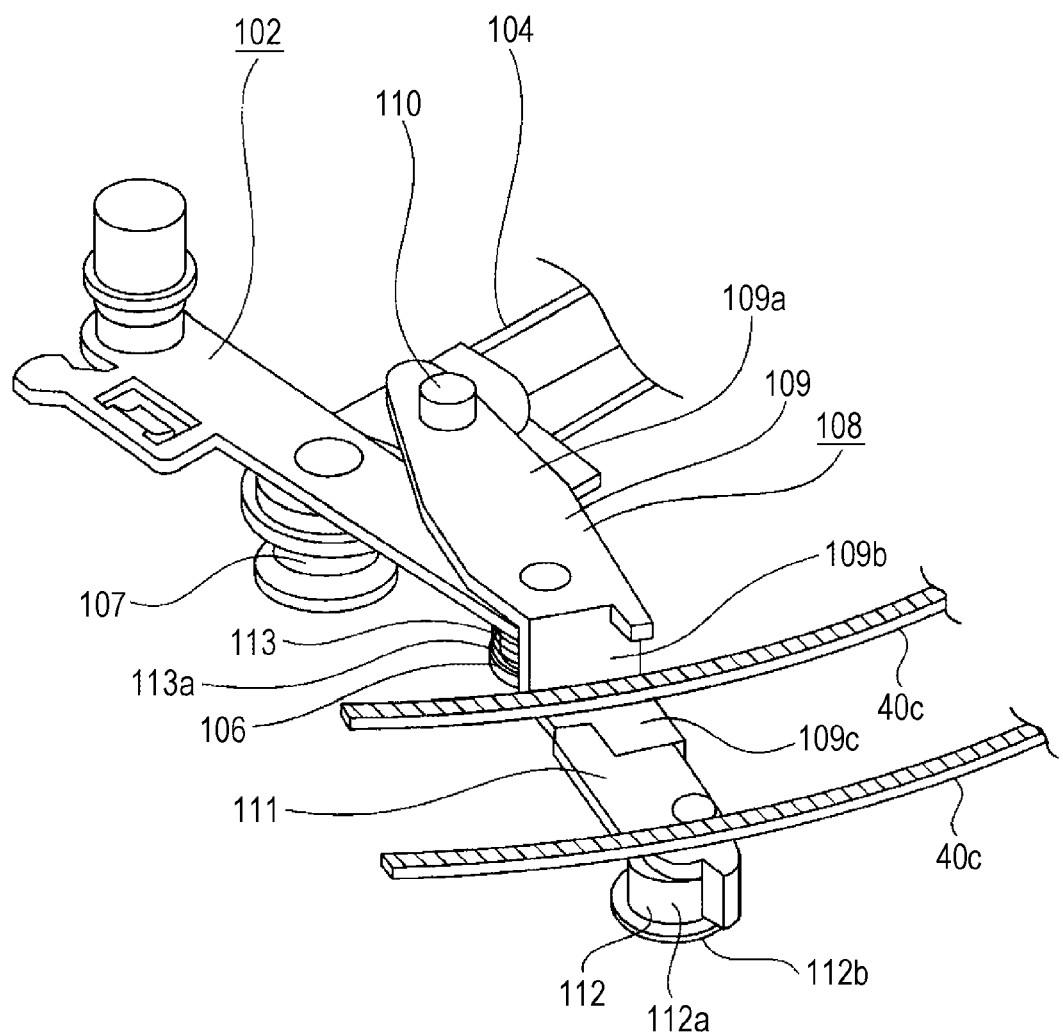
FIG. 66 is a perspective view illustrating a state wherein an ejecting lever is slid by a sliding protrusion and the pressing roller is moved downwards.
Figure 67:
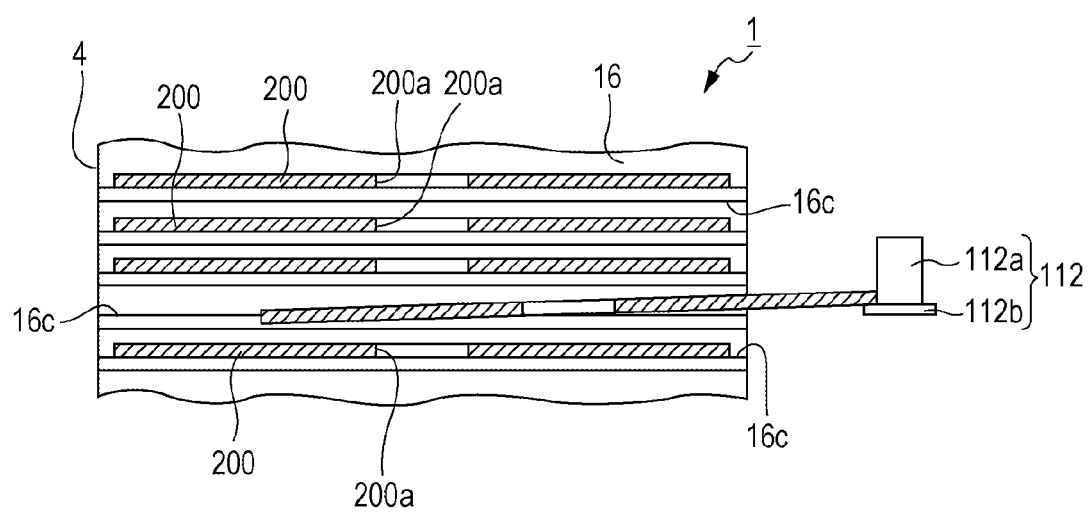
FIG. 67 is a schematic side view illustrating a state wherein the disc-shaped recording medium is pressed by the pressing roller and stored in the disc cartridge.

As the slave shaft 118b of the limit lever 118 is pressed by the sub slider 79 and the first rail 104 is moved toward the front, by the movement of the sub slider 79 toward the front, contact between the route adjusters 31 and the disc-shaped recording medium 200 is disengaged, and the route adjusters 31 are turned to a neutral position by the biasing force of the return springs 39 (see FIG. 65). At this time the ejecting lever 108 is turned widely in the direction of the ejecting lever 108 to move roughly toward the front by the first rail 104 moving toward the front, and the disc-shaped recording medium 200 continues to be conveyed toward the front by the ejecting lever 108, by the conveying by the driving roller 128 and fixed roller 107.

The disc-shaped recording medium 200 is conveyed toward the front by the peripheral face thereof being pressed by the pressing roller 112.

At this time, the roller supporting face 111 of the ejecting lever 108 is slid to the sliding protrusions 40c provided on the lower face of the base chassis 40 (see FIG. 66), and the pressing roller 112 is positioned lower than the state wherein the pressing roller 112 is stored in the storage 114. Upward moving force is applied to the ejecting lever 108 by the biasing spring 113, as described above, whereby the roller supporting face portion 111 is pressed to the sliding protrusions 40c, and the position of the pressing roller 112 is stabilized.

Upon the ejecting lever 108 being further turned together with the movement of the first rail 108 toward the front and the roller supporting face portion 111 being positioned to the front of the sliding protrusions 40c, the pressing roller 112 is moved somewhat upwards by the biasing force of the biasing spring 113, along with the ejecting lever 108. Accordingly, the rear edge portion of the disc-shaped recording medium 200 is held up somewhat upwards by the flange portion 112b of the pressing roller 112, and the disc-shaped recording medium 200 is sloped downwards in front as to the horizontal direction (see FIG. 67). At this time a portion of the disc-shaped recording medium 200 is inserted into the disc cartridge 1, and the disc-shaped recording medium 200 is stored in a state of sloping downwards in front in the holding grooves 16c of the disc cartridge 1.

When the ejecting lever 108 is turned together with the movement of the first rail 104 toward the front, the cam engaging portion 110 is slid against the operating cam portion 43 formed on the base chassis 40. The cam engaging portion 110 of the ejecting lever 108 is engaged with the front edge portion of the second cam portion 43b on the operating cam portion 43 of the base chassis 40.

Figure 68:
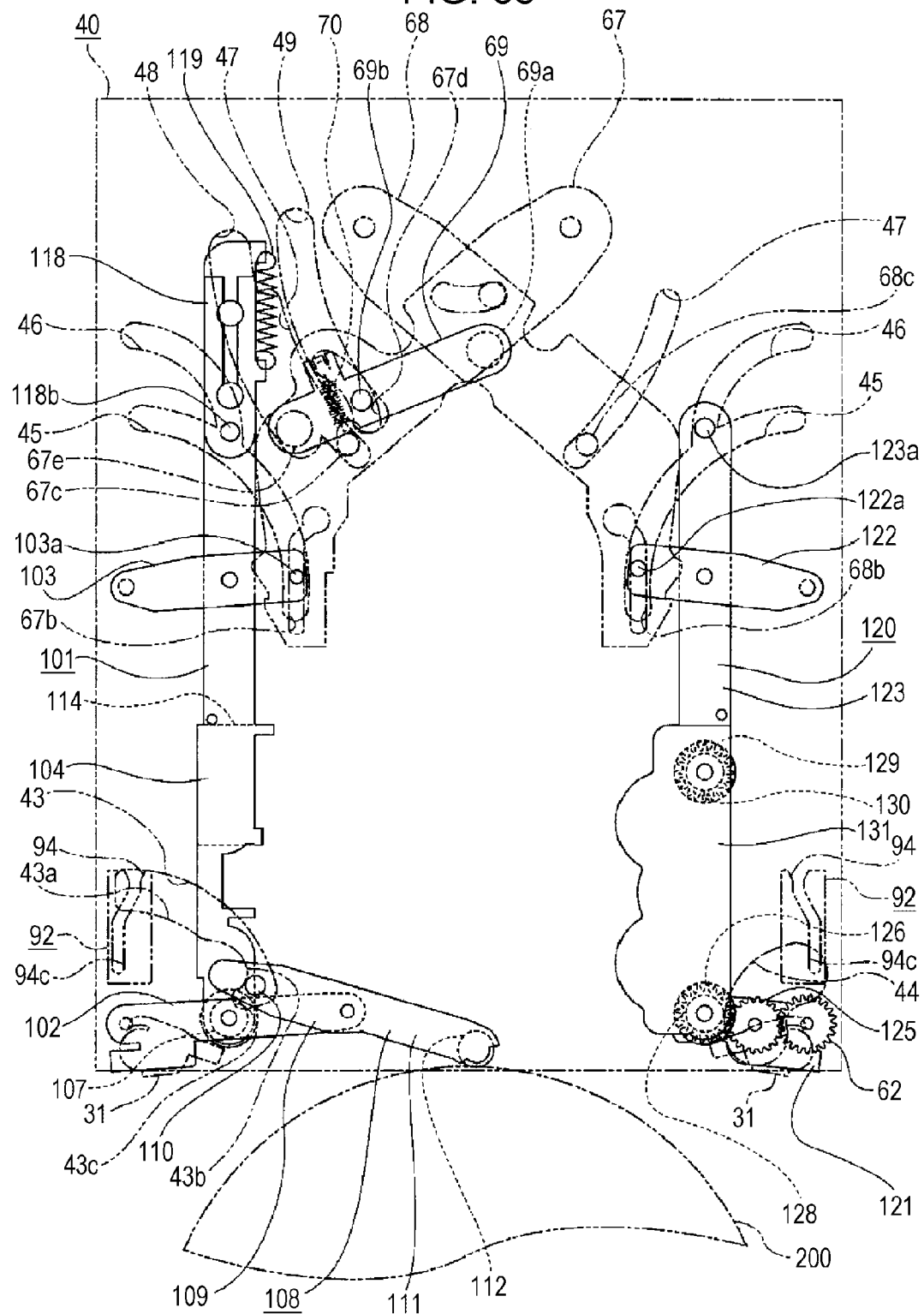
FIG. 68 is a schematic plan view illustrating a state wherein the disc-shaped recording medium continues to be pressed by the pressing roller and is conveyed toward the disc cartridge.
Figure 69:
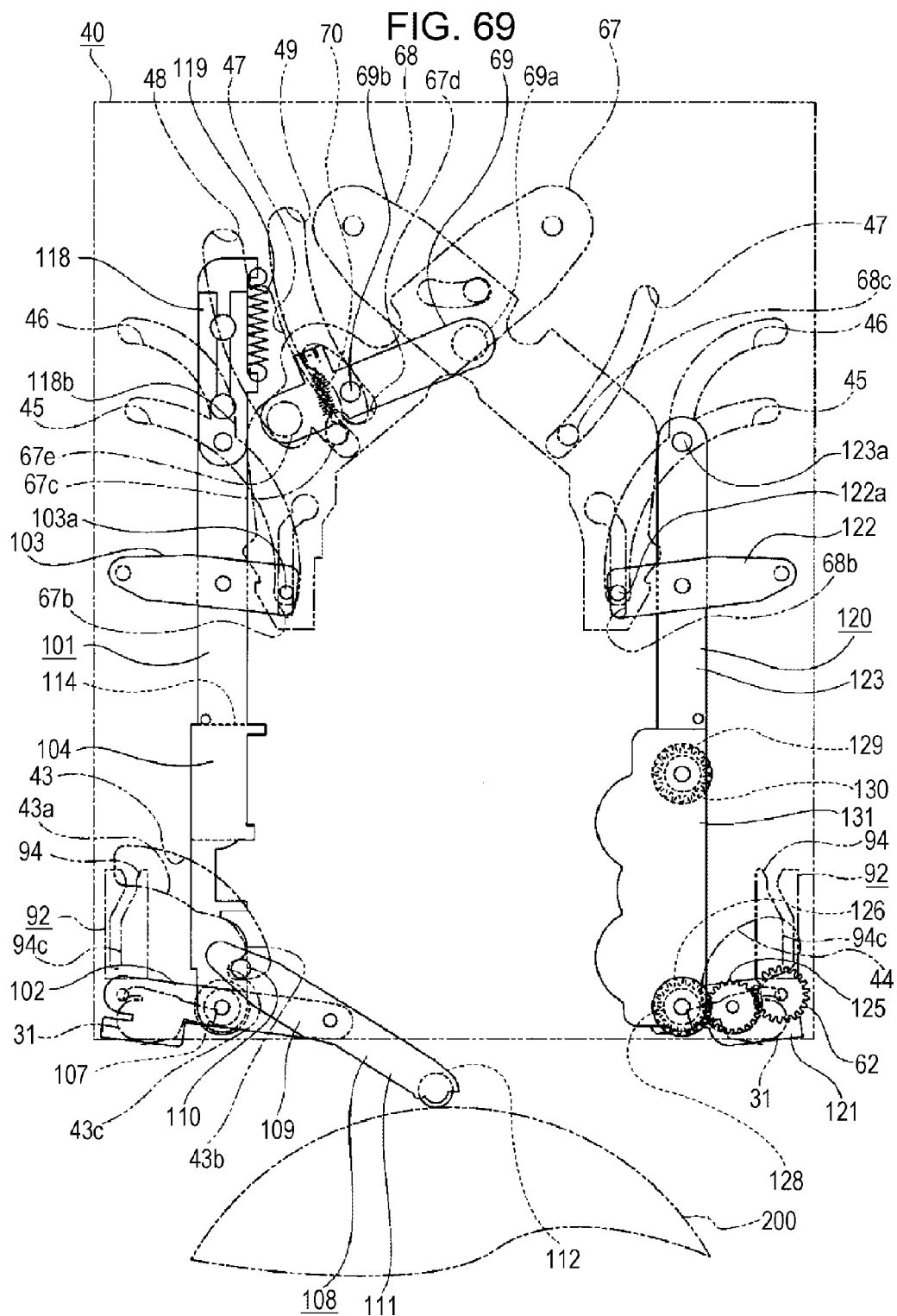
FIG. 69 is a schematic plan view illustrating a state wherein the disc-shaped recording medium continues to be pressed by the pressing roller and is stored in the disc cartridge.

Upon the ejecting lever being further turning together with the movement of the first rail 104 toward the front, the disc-shaped recording medium 200 is further pressed toward the front by the pressing roller 112 and stored in the disc cartridge 1 (see FIG. 68).

Figure 70:
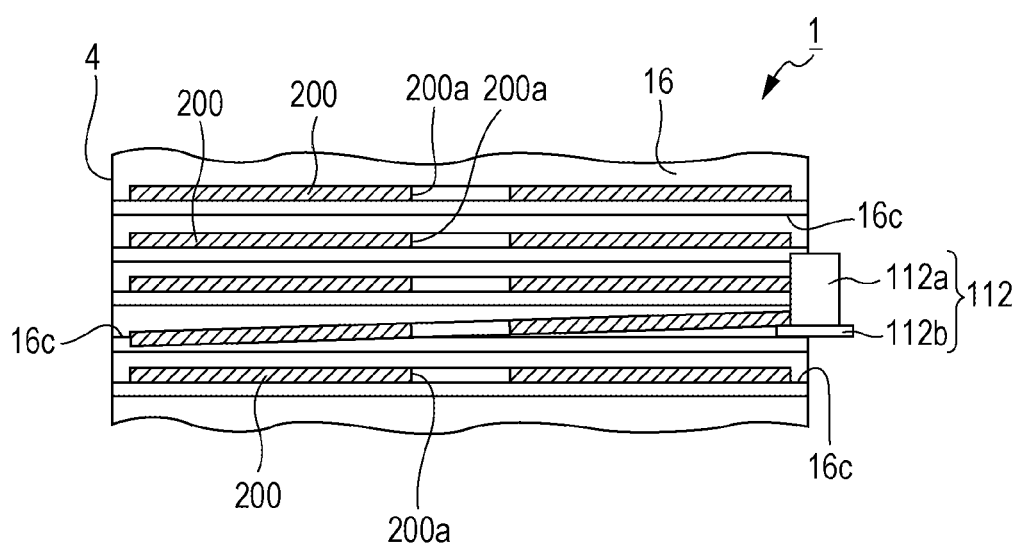
FIG. 70 is a schematic side view illustrating a state wherein the disc-shaped recording medium is pressed by the pressing roller and stored in the disc cartridge.
Figure 71:
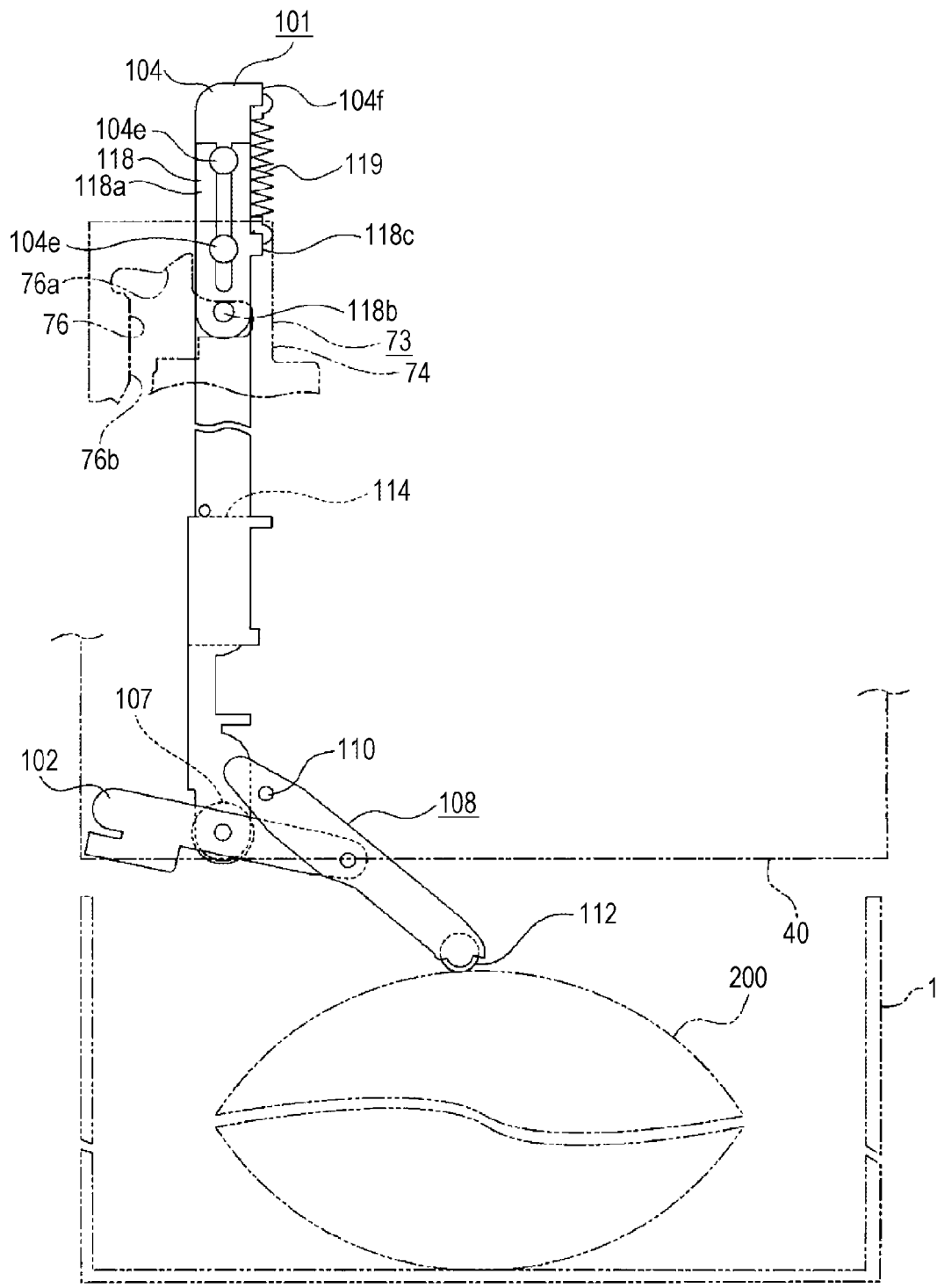
FIG. 71 is a schematic plan view illustrating an tension spring supported between the limit lever and first rail is extended in the event that the disc-shaped recording medium is pressed forward excessively by the pressing roller.

When the ejecting lever 108 is further turned together with the movement of the first rail 104 toward the front, the cam engaging portion 110 of the ejecting lever 108 is inserted into the third cam portion 43c from the second cam portion 43b on the operating cam portion 43 of the base chassis 40 (see FIG. 70). Upon the cam engaging portion 110 being inserted into the third cam portion 43c, the pressing roller 112 is turned in the direction of moving roughly towards the front as to the first front side link arm 102, having the cam engaging portion 110 as the fulcrum of the ejecting lever 108, and the pressing roller 112 is inserted into the disc cartridge 1 (see FIG. 71).

Upon the pressing roller 112 being inserted into the disc cartridge 1, the entire disc-shaped recording medium 200 is stored in the disc cartridge 1. At this time, the first main slider 73, sub slider 79, and second main slider 85 are moved to the front moving edge and stopped, the driving of the driving motor 52 is stopped, and the rotation of the driving gear 57 is temporarily stopped.

At this time, depending on the stopping position of the first rail 104 where the slave shaft 118b of the limit lever 118 is pressed and moved by the first main slider 72, the disc-shaped recording medium 200 may be excessively pressed toward the front by the pressing roller 112 and the front edge of the disc-shaped recording medium 200 may be pressed against the front face portion of the disc cartridge 1, whereby scratching or damage can occur to the disc-shaped recording medium 200.

Figure 72:
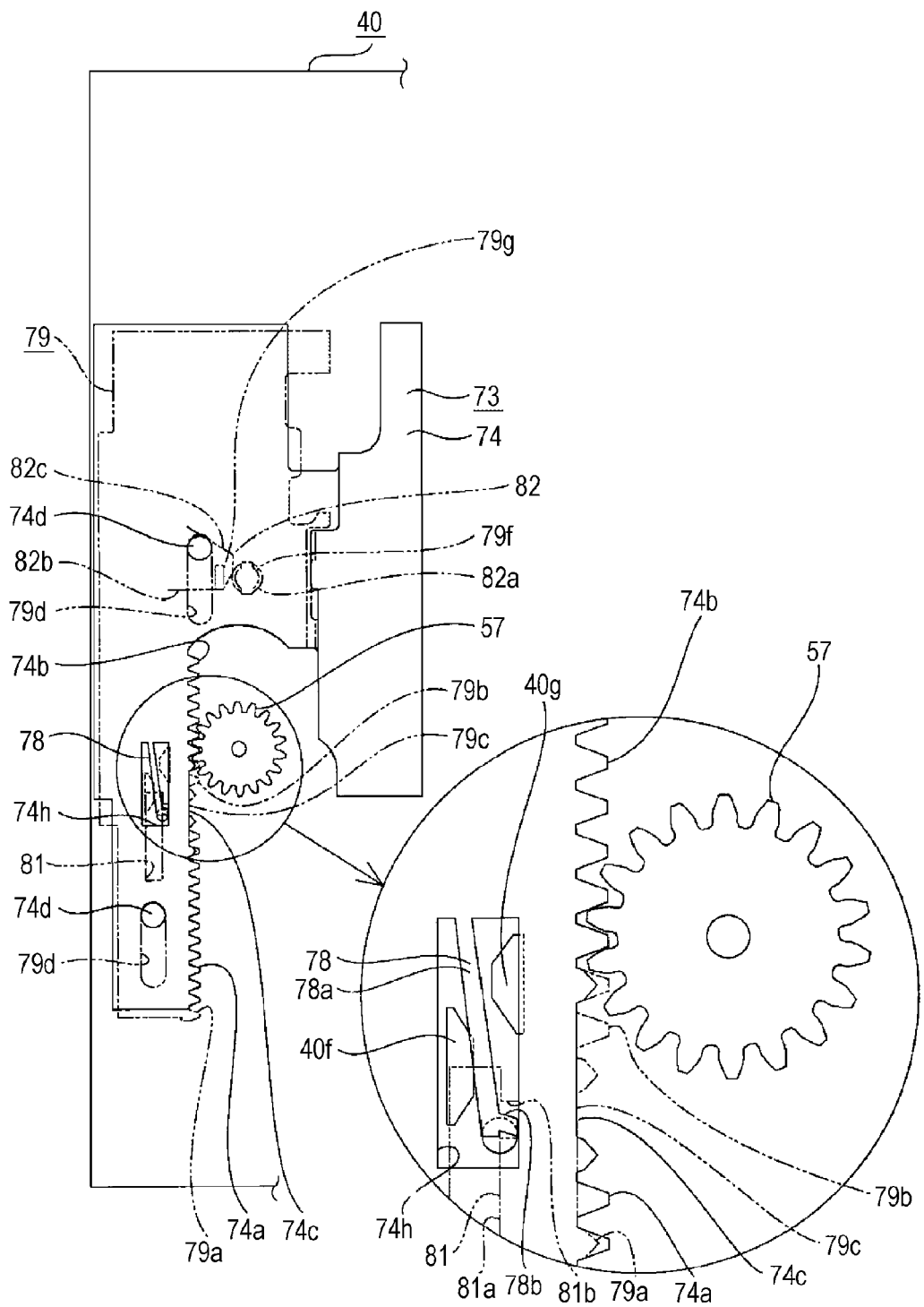
FIG. 72 is a schematic enlarged plan view illustrating a state immediately following the first main slider and sub slider having been moved from the forward moving edge to a non-meshed position, and illustrates the operations of the locking lever and so forth when the first main slider and sub slider are moved from the forward moving edge toward the non-meshed position in the rear, together with FIGS. 73 and 75.

However, when the disc-shaped recording medium 200 is excessively pressed toward the front by the pressing roller 112 and the front edge of the disc-shaped recording medium 200 touches the front face portion, upon the slave shaft 118b of the limit lever 118 being further pressed to the first main slider 72, the tension spring 119 supported between the limit lever 118 and the first rail 104 is extended (see FIG. 72).

Accordingly, the limit lever 118 is moved toward the front as to the first main slider 72 and the first main slider 72 is not moved, and excessive moving force toward the front is not applied to the disc-shaped recording medium 200, whereby scratching or damage to the disc-shaped recording medium 200 can be suppressed.

Also, the driving motor 52 is rotated in the opposite direction from the rotating direction in the ejecting operation, and operations opposite from the operations to store the disc-shaped recording medium 200 in the disc cartage 1 is performed, whereby the various parts return to the initial state thereof. Upon the various parts returning to the initial state, the rotation of the driving motor 52 is stopped by the detecting operation of the sensor 53a mounted on the sensor board 53.

When the driving motor 52 is rotated in the opposite direction from the rotation direction in the ejecting operation and the various parts return to the initial state, the ejecting lever 108 is turns and the pressing roller 112 is separated from the disc-shaped recording medium 200 toward the rear side. Accordingly, the flange portion 112b of the pressing roller 112 is moved from the lower face side of the disc-shaped recording medium 200 toward the rear, whereby the disc-shaped recording medium 200 that has been sloped as to the horizontal direction is caused to be in a horizontal state, and held at an appropriate position in the holding grooves 16c of the disc cartridge 1.

When the various parts return to the initial state, the first main slider 73, sub slider 79, and second main slider 85 are moved toward the rear, the first rail 104 and second rail 123 are moved toward the rear, the first front side link arm 102, first rear side link arm 103, second front side link arm 121, and second rear side link arm 122 are turned to a direction extending in the front/back direction, and the ejecting lever 108 is turned in the direction for the pressing roller 112 to be stored in the storage 114.

In the disc conveying device 19, as described above, a pressing roller 112 that presses the peripheral face of the disc-shaped recording medium 200 is disposed on the ejecting lever 108, whereby the pressing roller 112 can be slid along the peripheral face of the disc-shaped recording medium 200 and smooth conveying operations of the disc-shaped recording medium 200 can be secured.

Also, the ejecting lever 108 is turnably supported to the first front side link arm 102, whereby the first front side link arm 102 and ejecting lever 108 are turnable as to the first rail 104, and the freedom of the turning path of the ejecting lever 108 can be improved in that amount, whereby the ejecting amount of disc-shaped recording mediums 200 from the disc conveying device 19 can be increased.

Further, a cam engaging portion 110 is provided to the ejecting lever 108, the cam engaging portion 110 is slidably engaged with the base chassis 40, and an operating cam portion 43 that turns the ejecting lever 108 with a predetermined path is formed. Accordingly, the freedom of the ejecting lever 108 turning path can be improved.

Further, the first rail 104 and second rail 123 are synchronized and moved in parallel toward the direction of mutually separating, whereby the disc-shaped recording medium 200 can be conveyed in a straight line path, and conveying operations of the disc-shaped recording medium 200 can be readily performed, while shortening the conveying distance of the disc-shaped recording medium 200 and miniaturizing the disc conveying device 19.

Operations of Locking Lever, Etc

Next, specific operations of the locking lever 78 and so forth, when the storage of the disc-shaped recording medium 200 to the disc cartridge 1 is ended and the first main slider 73 and sub slider 79 are moved from the front moving edge toward the rear to the non-meshed position, will be described (see FIGS. 72 through 75).

Note that the first main slider 73 has a function to transmit the driving force of the driving motor 52 to predetermined various parts by being moved in the front/back direction by the driving motor 52. The predetermined parts are provided as a driving transmitting unit, and for example various parts of the first link mechanism 101, various parts of the second link mechanism, and various parts that operate synchronously with the first main slider 73 such as the side sliders 90, are included in a driving transmitting unit.

Upon storage of the disc-shaped recording medium 200 in the disc cartridge 1 by the ejecting lever 108 ending, as described above, the driving motor 52 is rotated in the opposite direction as the rotating direction in the ejecting operations, and the first main slider 73 and sub slider 79 are integrally moved toward the rear by the rotation of the driving gear 57 (see FIG. 72).

At this time, as described above, the sub slider 79 is locked as to the first main slider 73 by the locking lever 78, and moving force towards the rear as to the first main slider 73 is applied to the sub slider by the position control spring 82.

Figure 73:
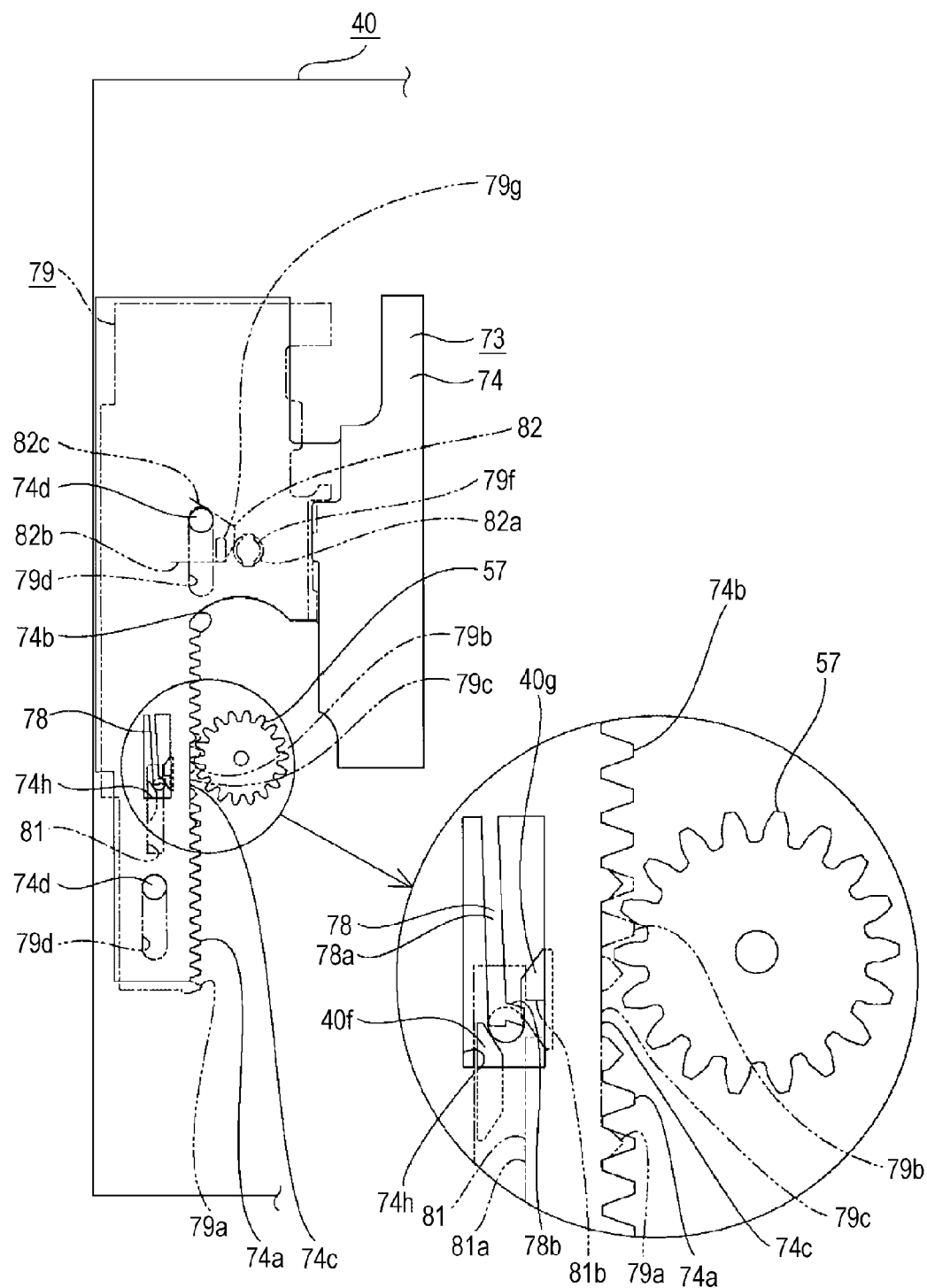
FIG. 73 is a schematic enlarged plan view illustrating a state wherein the first main slider and sub slider continue to be moved toward the rear, and the sub slider lock is disengaged by the locking lever when the meshing of the second main rack portion and driving gear of the first main slider is disengaged.

Further, as the first main slider 73 and sub slider 79 are moved toward the rear by the driving force of the driving motor 52, the meshing of the first main slider 73 and second main rack portion and the driving gear 75 is disengaged (see FIG. 73). At this time, the elastic deformation portion 78a of the locking lever 78 is slid to the lock disengaging action protrusion 40g, the elastic deformation portion 78a is elastically deformed, and the locking portion 78b is extracted from the lever engaging portion 81b of the lever inserting hole 81 formed on the sub slider 79. Accordingly, the lock is disengaged by the locking lever 78 as to the first main slider 73 of the sub slider 79, and the first main slider 73 is stopped at a non-meshed position.

Figure 74:
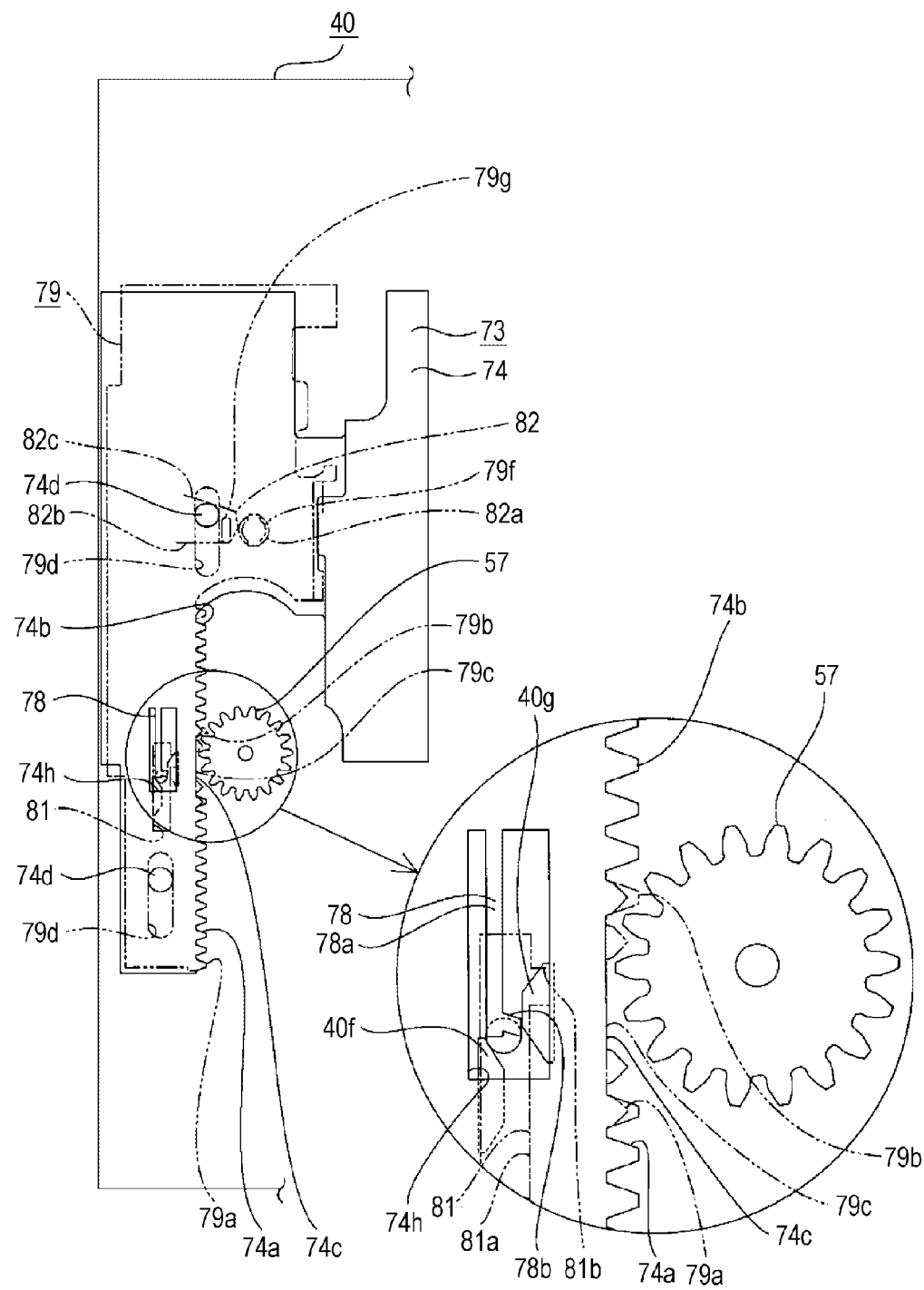
FIG. 74 is a schematic enlarged plan view illustrating a state wherein the first main slider and sub slider continue to be moved toward the rear, and the meshing of the second sub rack portion and driving gear of the sub slider is disengaged.
Figure 75:
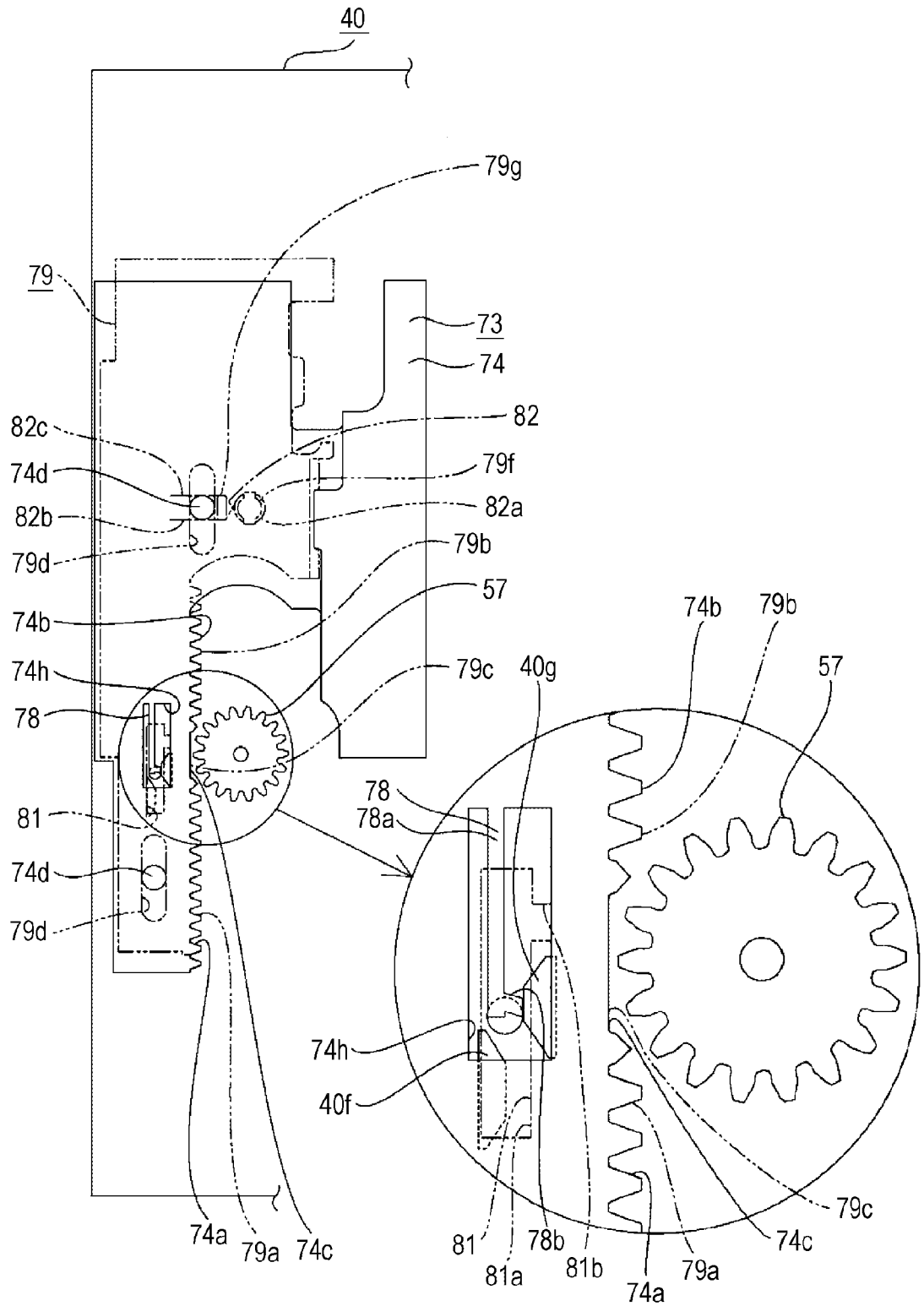
FIG. 75 is a schematic enlarged plan view illustrating a state wherein the sub slider has been moved to a non-meshed position.

The sub slider 79 is continuously moved slightly toward the rear by the driving force of the driving motor 52 (see FIG. 74). Upon the sub slider 79 being moved slightly toward the rear by the driving force of the driving motor 52, the meshing of the driving gear 57 and the second sub rack portion 79b of the sub slider 79 is disengaged, and the movement of the sub slider 79 by the driving force of the driving motor is stopped. At this time, movement force (biasing force) toward the rear as to the first main slider 73 is applied to the sub slider 79 by the position control spring 82, whereby the sub slider 79 is moved slightly towards the rear as to the first main slider 73 by the biasing force of the position control spring 82 and is stopped in a non-meshed position (see FIG. 75).

Conclusion

As described above, the disc conveying device 19 has an ejecting lever 108 that is turnable as to the first rail 104, presses the peripheral face of the disc-shaped recording medium 200 by turning, and conveys the disc-shaped recording medium 200 toward the ejecting direction.

Accordingly, the disc-shaped recording medium 200 is conveyed by the ejecting lever 108 that is turnable as to the first rail 104, whereby a dedicated mechanism for conveying the disc-shaped recording medium 200 does not have to be provided, and the ejected amount of disc-shaped recording mediums 200 can be increased while ensuring simplification of the mechanism.

Also, the disc-shaped recording medium 200 can be stored in the disc cartridge 1 without having to provide a dedicated mechanism, whereby amount of space thereof can be saved in the disc conveying device 19, and sufficient disposing space for other members can be secured.

Further, the disc-shaped recording medium 200 is conveyed by the ejecting lever 108 that is turned synchronously with the first rail 104, whereby the conveying time of the disc-shaped recording medium 200 can be shortened.

Note that the disc conveying device 19 uses what is generally referred to as a four-bar linkage wherein a pair of the first front side link arm 102 and first rear side link arm 103, and a pair of the second front side link arm 121 and second rear side link arm 122, are moved in parallel along the first rail 104 and second rail 123.

Accordingly, the space between the first rail 104 and second rail 123 can be effectively used, and for example, the base unit can be separated front to back, and two or more optical pick-ups disposed, thereby improving the functionality of the disc conveying device 19.

Also, since the space between the first rail 104 and second rail 123 can be effectively used, various types of mechanisms can be disposed between the first rail 104 and second rail 123, and the conveying path of the disc-shaped recording medium 200 can be shortened in the amount thereof by the effective use of space.

Further, modifications to the conveying distance can be made by disposing a number of various types of rollers that convey the disc-shaped recording medium 200, according to the change of the conveying distance, whereby significant modification to the mechanism does not have to be made.

Present Technology

The present technology can be configured as described below.

(1) A disc conveying device including a pair of rails positioned on opposite sides, sandwiching a disc-shaped recording medium transported in the lead-in direction or ejecting direction in a direction orthogonal to a center axis direction, and extending in the direction of the conveyed disc-shaped recording medium; multiple link arms that are turnably supported to a base chassis, are turnable as to the pair of rails, and move in parallel in a direction of separating the pair or rails from the peripheral face of the disc-shaped recording medium; conveying rollers that convey the disc-shaped recording medium by being supported by the rails, and touch the peripheral face of the disc-shaped recording medium with at least one conveying roller rotating; and an ejecting lever that is turnable as to at least one of the rails, by which turning the peripheral face of the disc-shaped recording medium is pressed, and the disc-shaped recording medium is conveyed.

(2) The disc conveying device according to (1), the ejecting lever further including a pressing roller that presses the peripheral face of the disc-shaped recording medium.

(3) The disc conveying device according to either (1) or (2), further including a storage to retract and store the ejecting lever from the conveying path of the disc-shaped recording medium, when the ejecting lever is not pressing the disc-shaped recording medium.

(4) The disc conveying device according to (3), wherein, in a state of the ejecting lever being stored in the storage, the pressing roller functions as the conveying roller to convey the disc-shaped recording medium.

(5) The disc conveying device according to either (3) or (4), wherein the storage is attached to the rail.

(6) The disc conveying device according to any one of (3) through (5), the storage further including a lever guiding face that guides the stored ejecting lever; and a disc guiding face that guides the conveyed disc-shaped recording medium.

(7) The disc conveying device according to any one of (3) through (6), further including a biasing spring that biases the ejecting lever in the direction to be stored in the storage.

(8) The disc conveying device according to any one of (1) through (7), wherein the ejecting lever is turnably supported by the link arm.

(9) The disc conveying device according to (8), further including a cam engaging portion on the ejecting lever; and an operating cam portion wherein a cam engaging portion of the ejecting lever is slidably engaged with the base chassis and the ejecting lever is turned on a predetermined path.

(10) The disc conveying device according to any one of (1) through (9), further including a spring member that biases the pair of rails so that the conveying roller approaches the peripheral face of the disc-shaped recording medium.

(11) The disc conveying device according to any one of (1) through (10), wherein the pair of rails synchronously are moved in parallel in the direction of mutually separating.

(12) The disc conveying device according to any one of (1) through (11), further including stoppers each touching a respective rail of the pair of rails moved in the direction of separating from the peripheral face of the disc-shaped recording medium, and restricting the movement of the pair of rails.

(13) The disc conveying device according to any one of (1) through (12), further including side sliders that move in the same direction as the conveying direction of the disc-shaped recording medium, according to the conveying position of the disc-shaped recording medium; the side sliders further including the stoppers.

(14) The disc conveying device according to (13), further including multiple stopper engaging pieces on the rails that touch the stoppers according to the movement position of the side sliders.

(15) The disc conveying device according to (14), wherein the contact positions of the stopper engaging pieces and the stopper are different positions in the moving direction of the rails.

The specific forms and configurations of the various parts described according to the embodiments described above are have only been illustrated exemplarily regarding carrying out the present technology, and should not be interpreted restrictively as to the technical scope of the present technology.

The present disclosure contains subject matter related to that disclosed in Japanese Priority Patent Application JP 2011-195520 filed in the Japan Patent Office on Sep. 7, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc conveying device comprising:
   a pair of rails
      positioned on opposite sides across a disc-shaped recording medium transported in the lead-in direction or ejecting direction in a direction orthogonal to a center axis direction, and
      extending in the direction of the conveyed disc-shaped recording medium;
   a plurality of link arms that
      are turnably supported to a base chassis,
      are turnable as to said pair of rails, and
      move in parallel in a direction of separating the pair or rails from the peripheral face of said disc-shaped recording medium;
   conveying rollers that
      convey said disc-shaped recording medium by being supported by said rails, and
      touch the peripheral face of said disc-shaped recording medium with at least one conveying roller rotating; and
   an ejecting lever that
      is turnable as to at least one of said rails, by which turning the peripheral face of said disc-shaped recording medium is pressed, and said disc-shaped recording medium is conveyed.

2. The disc conveying device according to claim 1, said ejecting lever further comprising:
   a pressing roller that presses the peripheral face of said disc-shaped recording medium.

3. The disc conveying device according to claim 1, further comprising:
   a storage to retract and store said ejecting lever from the conveying path of said disc-shaped recording medium, when said ejecting lever is not pressing said disc-shaped recording medium.

4. The disc conveying device according to claim 3, wherein, in a state of said ejecting lever being stored in said storage, said pressing roller functions as said conveying roller to convey said disc-shaped recording medium.

5. The disc conveying device according to claim 3, wherein said storage is attached to said rail.

6. The disc conveying device according to claim 3, said storage further comprising:
   a lever guiding face that guides said stored ejecting lever; and
   a disc guiding face that guides said conveyed disc-shaped recording medium.

7. The disc conveying device according to claim 3, further comprising:
   a biasing spring that biases said ejecting lever in the direction to be stored in said storage.

8. The disc conveying device according to claim 1, wherein said ejecting lever is turnably supported by said link arm.

9. The disc conveying device according to claim 8, further comprising:
   a cam engaging portion on said ejecting lever; and
   an operating cam portion wherein
      a cam engaging portion of said ejecting lever is slidably engaged with said base chassis and
      said ejecting lever is turned on a predetermined path.

10. The disc conveying device according to claim 1, further comprising:
    a spring member that biases said pair of rails so that said conveying roller approaches the peripheral face of the disc-shaped recording medium.

11. The disc conveying device according to claim 1, wherein said pair of rails synchronously are moved in parallel in the direction of mutually separating.

12. The disc conveying device according to claim 1, further comprising:
    stoppers, each touching a respective rail of said pair of rails moved in the direction of separating from the peripheral face of said disc-shaped recording medium, thereby restricting the movement of said pair of rails.

13. The disc conveying device according to claim 1, further comprising:
    side sliders that move in the same direction as the conveying direction of said disc-shaped recording medium, according to the conveying position of said disc-shaped recording medium;
    said side sliders further including said stoppers.

14. The disc conveying device according to claim 13, further comprising:
    a plurality of stopper engaging pieces on said rails that touch said stoppers according to the movement position of said side sliders.

15. The disc conveying device according to claim 14, wherein the contact positions of said stopper engaging pieces and said stopper are different positions in the moving direction of said rails.

* * * * *